(12) United States Patent
Radford et al.

(10) Patent No.: US 12,505,317 B2
(45) Date of Patent: *Dec. 23, 2025

(54) MULTI-TASK AUTOMATIC SPEECH RECOGNITION SYSTEM

(71) Applicant: OpenAI Opco, LLC, San Francisco, CA (US)

(72) Inventors: Alec Radford, San Francisco, CA (US); Jong Wook Kim, San Francisco, CA (US); Tao Xu, San Francisco, CA (US); Greg Brockman, San Francisco, CA (US); Christine McLeavey-Payne, San Francisco, CA (US); Ilya Sutskever, San Francisco, CA (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,621

(22) Filed: Jun. 7, 2024

(65) Prior Publication Data

US 2024/0354521 A1 Oct. 24, 2024

Related U.S. Application Data

(63) Continuation of application No. 18/302,289, filed on Apr. 18, 2023, now Pat. No. 12,079,587.

(51) Int. Cl.
*G06F 40/58* (2020.01)
(52) U.S. Cl.
CPC .................... *G06F 40/58* (2020.01)
(58) Field of Classification Search
CPC ..................................... G06F 40/58
See application file for complete search history.

(56) References Cited

U.S. PATENT DOCUMENTS 7,630,892 B2 * 12/2009 Wu ................... G06F 40/151
704/251
10,146,789 B1 12/2018 Lakshmanan et al.
(Continued)

FOREIGN PATENT DOCUMENTS

CA 3089001 A1 * 2/2021 ............ G06F 40/211
CA 3239059 A1 * 3/2024 ........... G06N 3/0455
(Continued)

OTHER PUBLICATIONS

Le, Hang, et al. "Dual-decoder transformer for joint automatic speech recognition and multilingual speech translation." arXiv preprint arXiv:2011.00747 (2020). (Year: 2020).*

(Continued)

*Primary Examiner* — Anne L Thomas-Homescu
(74) *Attorney, Agent, or Firm* — Finnegan, Henderson, Farabow, Garrett & Dunner, LLP

(57) ABSTRACT

Disclosed herein are methods, systems, and computer-readable media for generating an output transcript from an input audio segment using a multi-task transformer model. In some embodiments, the transformer model can be trained to transcribe or translate audio data in multiple languages using labeled audio data. The labeled audio data can include first audio segments associated with first same-language transcripts of the first audio segments and second audio segments associated with second different-language transcripts of the second audio segments. In some embodiments, a vocabulary of the model can include special purpose and time stamp tokens. The special purpose tokens can specify tasks for the model to perform.

18 Claims, 17 Drawing Sheets

(56) References Cited

U.S. PATENT DOCUMENTS

| | | | |
|---|---|---|---|
| 10,747,962 | B1 | 8/2020 | Fuerstenau et al. |
| 10,949,230 | B2 | 3/2021 | Hawkins et al. |
| 11,107,462 | B1 | 8/2021 | Fuegen et al. |
| 11,315,569 | B1 | 4/2022 | Talieh et al. |
| 11,367,433 | B2 | 6/2022 | Sypniewski et al. |
| 11,482,214 | B1 | 10/2022 | Arieli et al. |
| 11,545,134 | B1 | 1/2023 | Federico et al. |
| 11,741,298 | B1* | 8/2023 | Polavaram ............ G06F 40/216 715/727 |
| 2009/0157385 | A1 | 6/2009 | Tian |
| 2009/0193013 | A1 | 7/2009 | Hazlewood et al. |
| 2010/0318356 | A1 | 12/2010 | Hamaker et al. |
| 2014/0067374 | A1 | 3/2014 | Wilkins et al. |
| 2015/0067459 | A1 | 3/2015 | Lester |
| 2015/0154185 | A1* | 6/2015 | Waibel .................. G10L 15/005 704/2 |
| 2018/0174576 | A1 | 6/2018 | Soltau et al. |
| 2020/0211530 | A1 | 7/2020 | Zass et al. |
| 2020/0213680 | A1* | 7/2020 | Ingel .................. H04N 21/8106 |
| 2020/0226327 | A1 | 7/2020 | Matusov et al. |
| 2020/0243094 | A1 | 7/2020 | Thomson et al. |
| 2020/0410045 | A1 | 12/2020 | Vozila et al. |
| 2021/0056162 | A1 | 2/2021 | Dehghani et al. |
| 2021/0056956 | A1 | 2/2021 | Dimitriadis et al. |
| 2021/0165973 | A1 | 6/2021 | Kofman et al. |
| 2021/0192140 | A1 | 6/2021 | Galley et al. |
| 2021/0312944 | A1 | 10/2021 | Yamada et al. |
| 2021/0334299 | A1 | 10/2021 | Sonntag et al. |
| 2021/0375291 | A1 | 12/2021 | Zeng et al. |
| 2022/0084273 | A1 | 3/2022 | Pan et al. |
| 2022/0108688 | A1 | 4/2022 | Wang et al. |
| 2022/0115006 | A1 | 4/2022 | Hori et al. |
| 2022/0122586 | A1* | 4/2022 | Yu .......................... G10L 15/30 |
| 2022/0254331 | A1 | 8/2022 | Jafari |
| 2022/0301543 | A1 | 9/2022 | Elias et al. |
| 2022/0343894 | A1 | 10/2022 | Doutre et al. |
| 2022/0343898 | A1 | 10/2022 | Fu |
| 2022/0366157 | A1 | 11/2022 | Lee et al. |
| 2022/0366898 | A1 | 11/2022 | Qian et al. |
| 2022/0382999 | A1 | 12/2022 | Gunasekara et al. |
| 2023/0089902 | A1* | 3/2023 | Arkhangorodsky .... G06F 40/58 704/277 |
| 2023/0094511 | A1 | 3/2023 | Guha et al. |
| 2023/0104228 | A1 | 4/2023 | Li et al. |
| 2023/0114834 | A1 | 4/2023 | Chadwick et al. |
| 2023/0154172 | A1 | 5/2023 | Wasnik et al. |
| 2023/0169281 | A1 | 6/2023 | Zheng et al. |
| 2023/0177282 | A1* | 6/2023 | Emelyanenko ....... G06F 40/166 704/2 |
| 2023/0237990 | A1 | 7/2023 | Wu et al. |
| 2023/0245649 | A1 | 8/2023 | Singh et al. |
| 2023/0260531 | A1 | 8/2023 | Srivastava et al. |
| 2023/0274096 | A1 | 8/2023 | Bohra et al. |
| 2023/0281248 | A1 | 9/2023 | Schalkwyk et al. |
| 2023/0289536 | A1 | 9/2023 | Guar et al. |
| 2023/0289538 | A1 | 9/2023 | Goel et al. |
| 2024/0256793 | A1* | 8/2024 | Maschmeyer .......... G06F 40/40 |
| 2024/0256795 | A1* | 8/2024 | Ross ....................... G06F 40/58 |
| 2024/0320444 | A1* | 9/2024 | Maschmeyer ...... G06F 3/04845 |
| 2024/0330579 | A1* | 10/2024 | Saxena ................ G06F 40/106 |

FOREIGN PATENT DOCUMENTS

| | | |
|---|---|---|
| CN | 111081259 B | 4/2022 |
| CN | 115101050 A | 9/2022 |

OTHER PUBLICATIONS

Woodward, Alejandro, et al. "Confidence Measures in Encoder-Decoder Models for Speech Recognition." Interspeech. 2020. (Year: 2020).*

Alcorn, M. A. et al., "Strike With a (Pose): Neural Networks are Easily Fooled by Strange Poses of Familiar Objects", 2019 IEEE/CVF Conference on Computer Vision and Patter Recognition (CVPR), IEEE Computer Society, (2019), pp. 4840-4849.

Amodei, D. et al., "Deep Speech 2: End-to-End Speech Recognition in English and Mandarin", arxiv. arXivpreprint arXiv: 1512.02595, (2015), 28 pages.

Ardila, R. et al., "Common Voice: A Massively-Multilingual Speech Corpus", arXiv preprint arXiv: 1912.06670v2, (2020), 5 pages.

Babu, A. et al., "XLS-R: Self-Supervised Cross-Lingual Speed Representation Learning to Scale", arXiv preprint arXiv:2111.09296v3, (2021), 23 pages.

Baevski, A. et al., "Unsupervised Speech Recognition", Advances in Neural Information Processing Systems, 35$^{th}$ Conference on Neural Information Processing Systems (NeurIPS 2021), vol. 34, (2021), 14 pages.

Baevski, A. et al., "wav2vec 2.0: A Framework for Self-Supervised Learning of Speech Representations", arXiv preprint arXiv:2006.11477v3, (2020), 19 pages.

Bapna, A. et al., "mSLAM: Massively Multilingual joint pre-training for speech and text", arXiv preprint arXiv:2206.01374v1, (2022), 15 pages.

Barbu, A. et al., "ObjectNet: A Large-Scale Bias-Controlled Dataset for Pushing the Limits of Object Recognition Models", Advances in Neural Information Processing Systems, vol. 32, (2019), 11 pages.

Caruana, R., "Multitask Learning", Machine Learning, Kluwer Academic Publishers, vol. 28, No. 1, (1997), pp. 41-75.

Chan, W. et al., "SpeechStew: Simply Mix All Available Speech Recognition data to Train One Large Neural Network", arXiv preprint arXiv:2104.02133v3, (2021), 5 pages.

Chen, S. et al., "UNISPEECH-SAT: Universal Speech Representation Learning with Speaker Aware Pre-Training", In ICASSP 2022-2022 IEEE International Conference on Acoustics, Speech and Signal Procesing (ICASSP), IEEE, (2022), pp. 6152-6156.

Chen, T. et al., "Training Deep Nets with Sublinear Memory Cost", arXiv preprint arXiv:1604.06174v2, (2016), 12 pages.

Chen, Z. et al., "MAESTRO: Matched Speech Text Representations Through Modality Matching", arXiv preprint arXiv:2204.03409v2, (2022), 5 pages.

Child, R. et al., "Generating Long Sequences with Sparse Transformers", arXiv preprint arXiv:1904.10509v1, (2019), 10 pages.

Collobert, R. et al., "Natural Language Processing (Almost) From Scratch", Journal of Machine Learning Research, vol. 12, (2011), pp. 2493-2537.

Conneau, A. et al., "FLEURS: Few-shot Learning Evaluation of Universal Representations of Speech", arXiv preprint arXiv:2205.12446v1, (2022), 10 pages.

Del Rio, M. et al., "Earnings-21: A Practical Benchmark for ASR in the Wild", arXiv preprint arXiv:2104.11348v3, (2021), 5 pages.

Galvez, D. et al., "The People's Speech: A Large-Scale Diverse English Speech Recognition Datasheet for Commercial Usage", arXiv preprint arXiv:2111.09344v1, (2021), 12 pages.

Geirhos, R. et al., "Shortcut Learning in Deep Neural Networks", Nature Machine Intelligence, vol. 2, (2020), pp. 665-673.

Ghorbani, B. et al., "Scaling Laws for Neural Machine Translation", arXiv preprint arXiv:2109.07740v1, (2021), 31 pages.

Griewank, A. et al., "Algorithm 799: Revolve: An Implementation of Checkpointing for the Reverse or Adjoint Mode of Computational Differentiation", ACM Transactions of Mathematical Software (TOMS), vol. 26, No. 1, (Mar. 2000), pp. 19-45.

Gunter, K. et al., "Contextualizing /s/ retraction: Sibilant variation and change in Washington, D.C. African American Language", Language Variation and Change, vol. 33, (2021), pp. 331-357.

Harris, C. R. et al., "Array Programming with NumPy", Nature, vol. 585, (2020), pp. 357-362.

Hendrycks, D. et al., "Bridging Nonlinearities and Stochastic Regularizers with Gaussian Error Linear Units", arXiv preprint arXiv:1606.08415v1, (2016), 6 pages.

Hendrycks, D. et al., "Pretrained Transformers Improve Out-of-Distribution Robustness", arXiv preprint arXiv:2004.06100v2, (2020), 11 pages.

Hernandez, F. et al., "TED-LIUM 3: Twice as Much Data and Corpus Repartition for Experiments on Speaker Adaptation", In SPECOM, Springer, Nature Switzerland AG, (2018), 198-208.

(56) References Cited

OTHER PUBLICATIONS

Hsu, W.-N., et al., HuBERT: Self-Supervised Speech Representation Learning by Masked Prediction of Hidden Units, IEEE/ACM Transactions on Audio, Speech and Language Processing, vol. 29, (2021), pp. 3451-3460.
Hsu, W.-N., et al., "Robust wav2vec 2.0: Analyzing Domain Shift in Self-Supervised Pre- Training", arXiv preprint arXiv:2104.01027v2, (2021), 9 pages.
Huang, G. et al., "Deep Networks with Stochastic Depth", In European Conference on Computer Vision, Springer International Publishing AG, (2016), pp. 646-661.
Jia, R. et al., "Adversarial Examples for Evaluating Reading Comprehension Systems", arXiv preprint arXiv:1707.07328v1, (2017), 11 pages.
Johnson, M. et al., Google's Multilingual Neural Machine Translation System: Enabling Zero-Shot Translation, Transactions of The Association for Computational Linguistics, vol. 5, (2017), pp. 339-351.
Kendall, T. et al., "The Corpus of Regional African American Language", Version Jul. 2021, The Online Resources for African American Language Project, Eugene, Oregon, [Retrieved from the Internet—Feb. 23, 2024], agon.edu/coraal, (2021), 3 pages.
Koenecke, A. et al., Racial Disparities in Automated Speech Recognition, Proceedings of the National Academy of Sciences, vol. 117, No. 14, (2020), pp. 7684-7689.
Kolesnikov, A. et al., "Big Transfer (BiT): General Visual Representation Learning", In European Conference on Computer Vision, Springer Nature Switzerland AG, (2020), pp. 491-507.
Kuchaiev, O. et al., "NeMo: a toolkit for building AI applications using Neural Modules", arXiv preprint arXiv:1909.09577v1, (2019), 8 pages.
Lake, B. M. et al., "Building Machines that Learn and Think Like People", Behavioral and Brain Sciences, Cambridge University Press, vol. 40, (2017), 72 pages.
Liao, H. et al., "Large Scale Deep Neural Network Acoustic Modeling with Semi-Supervised Training Data for YouTube Video Transcription", In 2013 IEEE Workshop on Automatic Speech Recognition and Understanding, IEEE, (2013), pp. 368-373.
Likhomanenko, T. et al., "Rethinking Evaluation in ASR: Are Our Models Robust Enough?", arXiv preprint arXiv:2010.11745v3, (2020), 11 pages.
Loshchilov, I. et al., "Decoupled Weight Decay Regularization", arXiv preprint arXiv:1711.05101v3, (2019), 19 pages.
Luong, M.-T. et al., "Multi-Task Sequence to Sequence Learning", arXiv preprint arXi:1511.06114v4, Published as a conference paper at ICLR 2016, (2016), 10 pages.
Mahajan, D. et al., "Exploring the Limits of Weakly Supervised Pretraining", In Proceedings of the European Conference on Computer Vision (EVVC), Springer Nature Switzerland AG, (2018), pp. 185-201.
Mauch, M. et al., "The Audio Degradation Toolbox and its Application to Robustness Evaluation", In Proceedings of the 14th International Society for Music Information Retrieval Conference (ISMIR 2013), Curitiba, Brazil, (2013), accepted, 6 pages.
McCann, B et al., "The Natural Language Decathlon: Multitask Learning as Question Answering", arXiv preprint arXiv:1806.08730v1, (2018), 23 pages.
Meyer, J. et al., "Artie Bias Corpus: An Open Dataset For Detecting Demographic Bias in Speech Applications", In Proceedings of the 12th Language Resources and Evaluation Conference, European Language Resources Association, Marseille, France, (May 2020), pp. 6462-6468.
Miller, J. et al., "The Effect of Natural Distribution Shift on Question Answering Models", In ICML, arXiv:2004.14444v1, (2020), 73 pages.
Mohamed, A.-r. et al., "Deep Belief Networks for Phone Recognition", In Nips Workshop on Deep Learning for Speech Recognition and Related Applications, vol. 1, (2009), 9 pages.
Narayanan, A. et al., "Toward Domain-Invariant Speech Recognition Via Large Scale Training", In 2018 IEEE Spoken Language Technology Workshop (SLT), IEEE, (2018), pp. 441-447.
Panayotov, V. et al., "LIBRISPEECH: An ASR Corpus Based on Public Domain Audio Books", In 2015 IEEE International Conference on Acoustics, Speech and Signal Processing (ICASSP), IEEE, (2015), pp. 5206-5210.
Pandas Development Team, T. pandas-dev/pandas: Pandas, [Retrieved from the Internet Feb. 22, 2024], Published Apr. 3, 2023 URL https://doi.org/10.5281/zenodo.350914, 5 pages.
Park, D. S. et al., "SpecAugment: A simple data augmentation method for automatic speech recognition", arXiv preprint arXiv:1904.08779v3, (2019), 6 pages.
Pascanu, R. et al., "On the Difficulty of Training Recurrent Neural Networks", In International Conference on Machine Learning, PMLR, (2013), pp. 1310-1318.
Paszke, A. et al., "PyTorch: An Imperative Style, High-Performance Deep Learning Library", In Advances in Neural Information Processing Systems, vol. 32, (2019), pp. 8024-8035.
Pedregosa, F. et al., Scikit-learn: Machine Learning in Python, Journal of Machine Learning Research, vol. 12, (2011), pp. 2825-2830.
Polyak, B. T. et al., "Acceleration of Stochastic Approximation by Averaging", SIAM Journal on Control and Optimization, vol. 30, No. 4, (Jul. 1992), pp. 838-855.
Pratap, V. et al., "Massively multilingual ASR: 50 Languages, 1 Model, 1 Billion Parameters", ArXiv, abs/2007.03001v2, (2020), 5 pages.
Pratap, V. et al., "Mls: A Large-Scale Multilingual Dataset for Speech Research", arXiv preprint arXiv:2012.03411v2, (2020), 10 pages.
Press, O. et al., "Using the Output Embedding to Improve Language Models", In Proceedings of the 15th Conference of the European Chapter of the Association for Computational Linguistics: vol. 2, Short Papers, Valencia, Spain, (Apr. 2017), pp. 157-163.
Provilko, I. et al., "BPE-Dropout: Simple and Effective Subword regularization", arXiv preprint arXiv:1910.13267v2, (2019), 11 pages.
Radford, A. et al., "Language Models are Unsupervised Multitask Learners", (2019), 24 pages.
Radford, A. et al., "Learning Transferable Visual Models from Natural Language Supervision", arXiv preprint arXiv:2103.00020v1, (2021), 48 pages.
Raffel, C. et al., "Exploring the Limits of Transfer Learning with a Unified Text-to-Text Transformer," J. Mach. Learn. Res., vol. 21, No. 140, (2020), pp. 1-67.
Ravanelli, M. et al., "SpeechBrain: A general-purpose speech toolkit", arXiv:2106.04624, (2021).
Recht, B. et al., "Do ImageNet Classifiers Generalize to ImageNet?", Proceedings of the 36th International Conference on Machine Learning, vol. 97 of Proceedings of Machine Learning Research, PMLR, (Jun. 9-15, 2019), pp. 5389-5400.
Russakovsky, O. et al., "Imagenet Large Scale Visual Recognition Challenge", International Journal of Computer Vision, vol. 115, (2015), pp. 211-252.
Seide, F. et al., Feature Engineering in Context-Dependent Deep Neural Networks of Conversational Speech Transcription, In 2011 IEEE Workshop on Automatic Speech Recognition and Understanding, IEEE, (2011), pp. 24-29.
Sennrich, R. et al., "Neural Machine Translation or Rare Words with Subword Units", arXiv preprint arXiv:1508.07909v1, (2015), 11 pages.
Speer, R., "ftfy: fixes text for you". Zenodo, [Retrieved from the Internet Feb. 23, 2024] URL https://doi.org/10.5281/zenodo.2591652, Version 5.5., (2019), 3 pages.
Sutskever, I. et al., "Sequence to Sequence Learning with Neural Networks", Advances in Neural Information Processing Systems, vol. 27, (2014), 9 pages.
Taori, R. et al., "Measuring Robustness to Natural Distribution Shifts in Image Classification", Advances in Neural Information Processing Systems, vol. 33, pp. 18583-18599.
Torralba, A. et al., "Unbiased Look at Dataset Bias", CVPR 2011, (2011), pp. 1521-1528.

(56) References Cited

OTHER PUBLICATIONS

Toshniwal, S., "Multilingual Speech Recognition with a Single End-to-End Model", 2018 IEEE International Conference on Acoustics, Speech, and Signal Processing (ICASSP), (2018), pp. 4904-4908.

Valk, J. et al., "Voxlingual107: A Dataset for Spoken Language Recognition", In 2021 Spoken Language Technology Workshop (SLT), IEEE, (2021), pp. 652-658.

Vaswani, A. et al., "Attention is All You Need", In Advances in Neural Information Processing Systems, 31st Conference on Neural Information Processing Systems, Long Beach, CA, (2017), 11 pages.

Virtanen, P. et al., "SciPy 1.0: fundamental algorithms for scientific computing in python", Nature Methods, vol. 17, (2020), pp. 261-272.

Wang, C. et al., "CoVoST 2 and Massively Multilingual Speech-to-Text Translation", arXiv preprint arXiv:2007.10310v3, (2020), 6 pages.

Wang, C. et al., "VoxPopuli: A Large-Scale Multilingual Speech Corpus for Representation Learning, Semi-Supervised Learning and Interpretation", arXiv preprint arXiv:2101.00390v2, (2021). 11 pages.

Wang, P. et al., "Multitask Training with Text Data for End-to-End Speech Recognition", arXiv preprint arXiv:2010.14318v2, (2020), 5 pages.

Watanabe, S. et al., "CMiME-6 Challenge: Tackling Multispeaker Speech Recognition for Unsegmented Recordings", arXiv preprint arXiv:2004.09249v2, (2020), 7 pages.

Xu, Q. et al., "Self-Training and Pre-Training are Complementary for Speech Recognition", In ICASSP 2021-2021 IEEE International Conference on Acoustics, Speech and Signal Processing (ICASSP), IEEE, (2021), pp. 3030-3034.

Zhang, Y. et al., "Pushing the Limits of Semi-Supervised Learning for Automatic Speech Recognition", arXiv preprint arXiv:2010.10504v21, (2020), 11 pages.

Zhang, Y. et al., "BigSSL: Exploring the Frontier of Large-Scale Semi-Supervised Learning for Automatic Speech Recognition", arXiv preprint arXiv:2109.13226v3, (2021), 14 pages.

Chen, Guoguo, et al. "Gigaspeech: An evolving, multi-domain asr corpus with 10,000 hours of transcribed audio." arXiv preprint arXiv:2106.06909 (2021). (Year: 2021).

Chorowski, Jan, and Navdeep Jaitly. "Towards better decoding and language model integration in sequence to sequence models." arXiv preprint arXiv:1612.02695 (2016). (Year: 2016).

Wicks, Rachel, and Kevin Duh. "The Effects of Language Token Prefixing for Multilingual Machine Translation." Proceedings of the 2nd Conference of the Asia-Pacific Chapter of the Association for Computational Linguistics and the 12th International Joint Conference on Natural Language Processing. 2022. (Year: 2022).

\* cited by examiner

MULTI-TASK AUTOMATIC SPEECH RECOGNITION SYSTEM

CROSS REFERENCE TO RELATED APPLICATIONS

This application is a continuation of U.S. application Ser. No. 18/302,289, filed on Apr. 18, 2023, the contents of which are hereby incorporated by reference in their entirety.

FIELD OF DISCLOSURE

The disclosed embodiments generally relate to systems, devices, methods, and computer readable media for multi-task automatic speech recognition using transformer models.

BACKGROUND

A fully featured speech recognition system can involve many additional components such as voice activity detection, speaker diarization, and inverse text normalization. These components are often handled separately, resulting in a relatively complex system around the core speech recognition model. Furthermore, this complexity extends to the interface for the core speech recognition system. There are many different tasks that can be performed on the same input audio signal: transcription, such as translation, voice activity detection, time alignment, and language identification.

Furthermore, while unsupervised pre-training techniques have been used to train audio encoders from unlabeled speech, there is a lack of lack an equivalently performant decoders mapping those representations to usable output. This limits the usefulness and robustness of such techniques, and can prevent conventional speech recognition systems from working reliably "out of the box" in a broad range of environments, without requiring supervised fine-tuning of a decoder for every deployment distribution.

SUMMARY

Embodiments of the present disclosure present technological improvements as solutions to one or more of the above-mentioned technical problems recognized by the inventors in conventional systems. For example, in an embodiment, a non-transitory computer-readable medium may include instructions that are executable by one or more processors to perform operations for generating an output transcript from an input audio segment using a transformer model including an encoder and a decoder, the transformer model trained to transcribe or translate audio data.

The disclosed embodiments include a method for multi-language, multi-task speech recognition. The method includes operations. The operations can include obtaining a transformer model including an encoder and a decoder. The transformer model can be trained to transcribe or translate audio data in multiple languages using labeled audio data. The labeled audio data can include first audio segments associated with first same-language transcripts of the first audio segments and second audio segments associated with second different-language transcripts of the second audio segments. The operations can include generating an output transcript from an input audio segment using the transformer model. Generation can include configuring the decoder input with a language token corresponding to a first language; and configuring the decoder input with a task token.

In some embodiments, the task token can be a transcribe token or a translate token associated with a second language differing from the first language. In some embodiments, the task token can be a translate token; and generation can further include autoregressively configuring the decoder input with a textual token predicted using the translate token, the textual token associated with the second language. In some embodiments, the decoder can be configured with a vocabulary including timestamp tokens. In some embodiments, the task token can be a timestamp generation token; and generation can further include: autoregressively configuring the decoder input with a first timestamp token predicted by the decoder using the timestamp generation token. In some embodiments, generation can further include autoregressively configuring the decoder input with a predicted no speech token followed by an end of transcript token. In some embodiments, the transformer model can be configured to perform inverse text normalization. In some embodiments, generation can further include: applying a first subsegment of the input audio segment to generate one or more predicted timestamps for the first subsegment; and generating a second subsegment of the input audio segment using the one or more predicted timestamps for the first subsegment. In some embodiments, generation can further include performing a beam search using an output softmax temperature dependent on at least one of: log probabilities of previously generated tokens of the output transcript; or a gzip compression rate of the previously generated tokens of the output transcript; or performing a beam search conditioned on an output transcript for a preceding input audio segment.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1A:
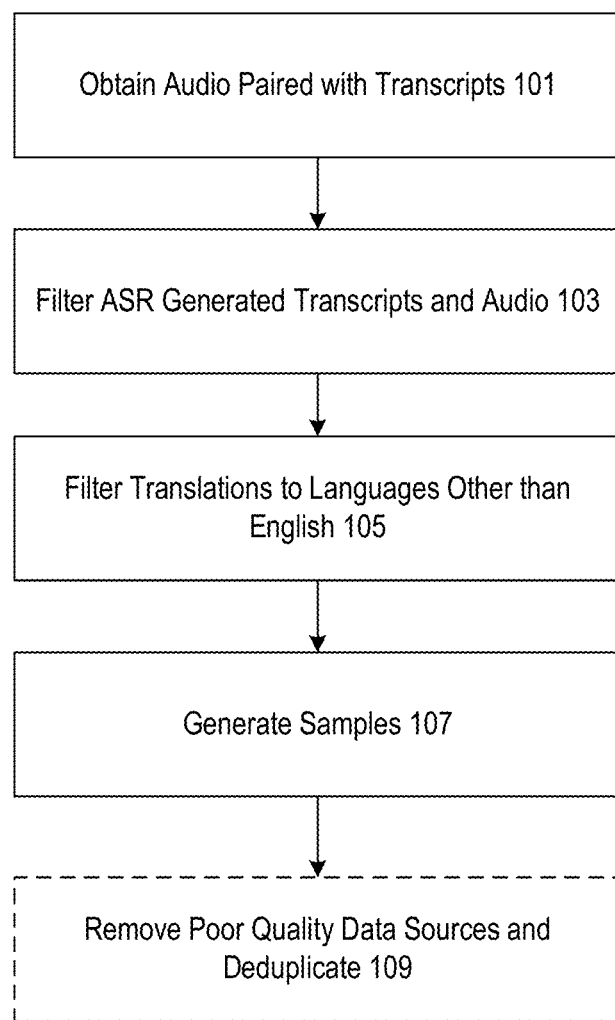
FIG. 1A depicts a process for generating a dataset for training an automatic speech recognition model, consistent with disclosed embodiments.

Exemplary embodiments are described with reference to the accompanying drawings In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments. Furthermore, a non-patent literature document, "Robust Speech Recognition via Large-Scale Weak Supervision" by Radford et al. (citation number arXiv: 2212.04356v1), is incorporated herein by reference in its entirety.

This disclosure may be described in the general context of customized hardware capable of executing customized pre-loaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

Speech recognition models using unsupervised pre-training techniques can learn directly from raw audio without the need for human labels. Such models can use large datasets of unlabeled speech and have been quickly scaled up to 1,000,000 hours of training data, far more than the 1,000 or so hours typical of an academic supervised dataset. When fine-tuned on standard benchmarks, such models can demonstrate improved results as compared to prior, supervised techniques, particularly in a low-data setting.

Such pre-trained audio encoders can learn representations of speech. But because they are purely unsupervised, they lack an equivalently performant decoder mapping those representations to usable outputs. Such audio encoders can therefore require finetuning to perform speech recognition, or other tasks. This requirement can limit their usefulness and impact, as fine-tuning can be a complex process requiring a skilled practitioner.

Furthermore, models fine-tuned on a particular dataset may exhibit inferior performance on other datasets. Machine learning methods are exceedingly adept at finding patterns within a training dataset which boost performance on held-out data from the same dataset. However, some of these patterns are brittle and spurious and don't generalize to other datasets and distributions. A model may achieve "superhuman" performance when fine-tuned on a dataset, but may still make basic errors when evaluated on another dataset (possibly because the model is reliant on dataset-specific quirks that are imperceptible to humans).

Accordingly, conventional approaches to unsupervised pre-training may not support speech recognition systems that work reliably "out of the box" in a broad range of environments, without requiring supervised fine-tuning of a decoder for every deployment distribution.

Conventional approaches to supervised pre-training can generate speech recognition systems that exhibit higher robustness and generalize better to held-out datasets than systems trained on a single dataset. Such approaches are reliant on existing high-quality speech recognition datasets. However, such high-quality speech recognition datasets can be of limited size (e.g., SpeechStew combines 7 pre-existing datasets totaling 5,140 hours of supervision, as compared to the 1,000,000 hours of unlabeled speech data utilized in unsupervised training of existing encoders). Automated pipelines can be used to scale weakly supervised speech recognition datasets to 10,000 and 30,000 hours of noisier training data. However, these new datasets are only a few times larger than the sum of existing high-quality datasets and still much smaller than the dataset used in the unsupervised training of existing encoders.

The disclosed embodiments include automatic speech recognition models generated using weakly supervised training on order-of-magnitude larger labeled audio datasets (e.g., 680,000 hours of labeled audio data) than conventional models. As disclosed herein, the disclosed embodiments perform well on existing datasets zeroshot, removing the need for any dataset-specific fine-tuning. Furthermore, the disclosed embodiments are trained to be both multilingual and multitask. As disclosed herein, the disclosed embodiments appear to benefit from such joint multilingual and multitask training. Illustrative embodiments of the present disclosure are described below.

Training Dataset Generation

FIG. 1A depicts a process 100 for generating a dataset for training an automatic speech recognition model (e.g., the "model"), consistent with disclosed embodiments. In some embodiments, the model can be a multi-language and/or multi-task model. For convenience of description, process 100 is described herein as being performed using a training system that includes one or more computing devices (e.g., laptops, desktops, workstations, computing clusters, cloud computing platforms, or other suitable devices). As may be appreciated, the disclosed embodiments are not limited to such an implementation. In various embodiments, multiple separate training systems can be used. The steps illustrated in FIG. 1A are exemplary and steps may be added, merged, divided, duplicated, repeated (e.g., as part of a machine learning process), modified, performed sequentially, performed in parallel, and/or deleted in some embodiments.

Consistent with disclosed embodiments, the model can be trained to map between utterances and the transcribed form of the utterances. In this manner, the speech recognition pipeline can be simplified, as inverse text normalization can be performed directly by the model.

In step 101 of process 100, the training system can obtain audio paired with transcripts, consistent with disclosed embodiments. In some embodiments, a user can interact with the training system to provide the audio. For example, the user interact with the training system to store the audio and corresponding transcripts in suitable location(s) accessible to the training system. Appendix A includes a list of datasets usable to generate the model, consistent with disclosed embodiments. The disclosed embodiments are not limited to any particular method or format for obtaining the audio data and corresponding transcripts. In some embodiments, for example, the audio data can be received or retrieved over one or more communications networks, such as the Internet.

As may be appreciated, given the diversity of data sources, the transcripts can be of varying quality. In some embodiments, one or more filtering steps can be performed on the obtained audio data and transcripts. The filtering steps can include identified and removal of machine-generated transcripts and transcripts representing the translation of audio into a language other than English. Additionally, following initial training of the model, training samples from poor-quality transcripts can be removed. These filtering steps can be performed automatically (e.g., using the training system), manually (e.g., by a user) or through a combination of automatic and manual actions (e.g., flagging audio for deletion using the training system, with manual confirmation by a user).

In step 103 of process 100, the audio and transcripts can be filtered to identify and remove transcripts that are not human-generated, consistent with disclosed embodiments. Audio corresponding to the removed transcripts can also be removed from the training datasets. As may be appreciated, training on datasets of mixed human and machine-generated data can often significantly impair the performance of translation systems. In order to avoid learning the stylistic imperfections exhibited by conventional transcription models, heuristics may be used to detect and remove machine-generated transcripts from the training dataset. Such heuristics relied upon characteristic deficiencies of existing automatic speech recognition systems. For example, many existing ASR systems output only a limited subset of written language which removes or normalizes away aspects that are difficult to predict from only audio signals such as complex punctuation (exclamation points, commas, and question marks), formatting whitespace such as paragraphs, or stylistic aspects such as capitalization. Such normalization can be used to identify and discard transcripts generated by such systems. As an additional example, an all-uppercase or all-lowercase transcript is very unlikely to be human generated. Similarly, while many ASR systems include some level of inverse text normalization, it is often simple or rule-based and still detectable from other unhandled aspects (e.g., the absence of commas or other punctuation in the transcript).

In step 105 of process 100, the audio and transcripts can be filtered to identify and remove transcripts that do not match the language of the corresponding audio, consistent with disclosed embodiments. Audio corresponding to the removed transcripts can also be removed from the training datasets. Consistent with disclosed embodiments, languages can be identified using an audio language detector. In some embodiments, the audio language detector can be created by fine-tuning a prototype model trained on a prototype version of the dataset on VoxLingua107. The audio language detector can be used to determine whether the spoken language matches the language of the transcript according to CLD2.

When training a model to perform translation into English, an exception can made for audio in a non-English language and corresponding transcripts in English. The non-English audio-English language transcript pairs can be included in the training dataset as speech translation to English training examples. As may be appreciated, when training a model to perform translation into other languages, similar exceptions can be made for transcripts into those languages. When training a model to only perform transcription in a single language, audio data in other languages can be removed (together with the corresponding transcripts) from the training dataset.

In step 107 of process 100, training samples can be generated from the obtained audio and transcripts. In some embodiments, training samples can be generated by selecting segments of the obtained audio. The selected segments can be associated with corresponding portions of the transcripts. The corresponding portion of a transcripts can be the subset of the transcript that occurs within the selected segment of the obtained audio. For example, a first segment of a first audio item can include the time period 1:15.200 (one minute, fifteen seconds, and two hundred milliseconds) to 1:45.200 (one minute, forty five seconds, and two hundred milliseconds). This first segment can be paired with a corresponding subset of the transcript for the first audio item. This subset can include the text identified in the transcript as occurring within the time period 1:15.200 to 1:45.200. As may be appreciated, in some embodiments, other overlapping segments can be generated from the first audio item. For example, a second segment can include the time period 0:49.727 to 1:19.727 in the first audio item. This second segment can be associated with a corresponding subset of the transcript for the first audio item.

In some embodiments, the training samples can have the same duration. In various embodiments, this duration can be between 10 and 60 seconds, or between 20 and 40 seconds (e.g., seconds). In some embodiments, this duration can be longer (e.g., 120 seconds, 180 seconds, or longer). In some embodiments, the training system can be configured to train the model both on training samples that include speech and training samples that do not include speech. In some embodiments, training samples that do not include speech can be selected for training with a lower probability than training samples that include speech. In some embodiments, training samples that do not include speech can be used as training data for voice activity detection.

In optional step 107 of process 100, training samples corresponding to poor quality data sources can be removed from the training dataset, consistent with disclosed embodiments. For example, as an additional filtering pass, after training an initial model, information about the error rate of the initial model can be compared across the data sources used to generate the training samples. Data sources that associated with high error rate and data source size can be manually inspected. Such inspection can reveal deficiencies in these data sources, such as partially transcribed transcripts, poorly aligned (or misaligned) transcripts, or low-quality, machine-generated captions. Training samples generated from these deficient sources can then be removed from the training dataset.

In some embodiments, deduplication or fuzzy deduplication can be performed on transcripts. Audio corresponding to identified duplicate transcripts can be removed. In some embodiments, such deduplication can be performed between a training portion of the training dataset and an evaluation portion of the training dataset.

In some embodiments, the training dataset can be generated without significant standardization of the transcripts. In some embodiments, process 100 can include performing standardization as described in Appendix C.

Model Design

Figure 1B:
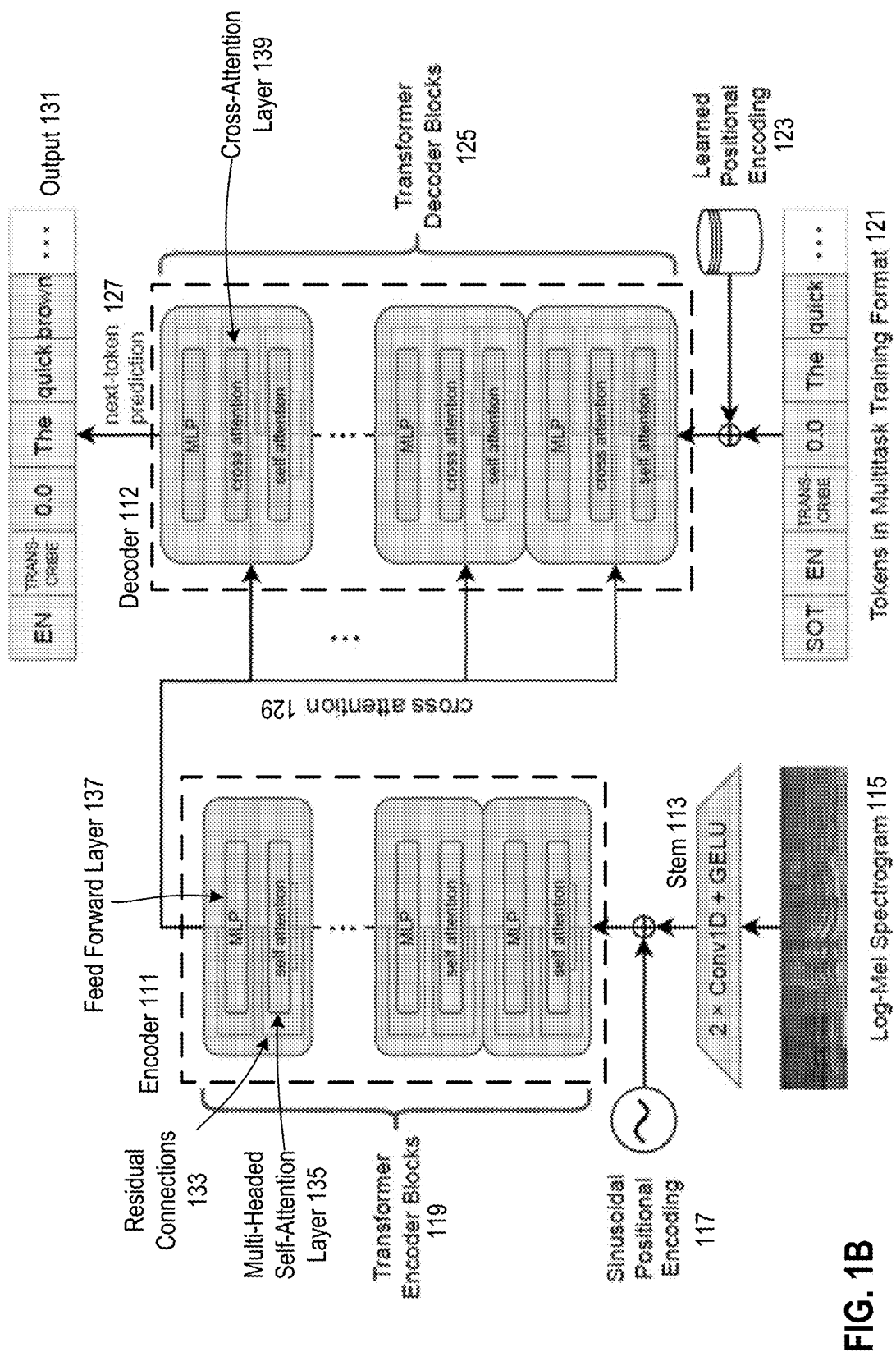
FIG. 1B depicts an exemplary architecture for an automatic speech recognition model, consistent with disclosed embodiments.

FIG. 1B depicts an exemplary architecture for an automatic speech recognition model (e.g., the "model") 110, consistent with disclosed embodiments. In some embodiments, the model can be a multi-language and/or multi-task model. Consistent with disclosed embodiments, the general architecture of model 110 can resemble the encoder-decoder transformer model described in "Attention Is All You Need" by Vaswani et al. Model 110 can include an encoder 111 and a decoder 112. Encoder 111 can be configured to generate a representation of a speech input and decoder 112 can be configured to autoregressively generate a corresponding textual output, given a cross attention input from the encoder and a task specification. Consistent with disclosed embodiments, encoder 111 and decoder 112 can have the same width and the same number of transformer blocks.

As may be appreciated, a fully featured speech recognition system can involve many additional components such as voice activity detection, speaker diarization, and inverse text normalization. Conventional techniques can handle these functions separately, resulting in a relatively complex system around the core speech recognition model. In some embodiments, model 110 can perform these functions. As may be appreciated, different tasks that can be performed on the same input audio signal: transcription, translation, voice activity detection, alignment, and language identification are some examples.

Consistent with disclosed embodiments, model 110 can jointly represent the different tasks described herein as a sequence of tokens to be predicted by the decoder, allowing for a single model to replace many distinct stages of a traditional speech processing pipeline. In some embodiments, a multitask training format can use a set of special tokens that serve as task specifiers or classification targets. A token may be or include a data value (e.g., an index into a vocabulary of the model, or the like), an instance of an object (e.g., a vocabulary object, or the like), an encoding of any of the forgoing (e.g., a one-hot encoding of an index into a vocabulary of the model, a hash of a vocabulary object, or the like), or any other suitable signifier or indication of textual data (e.g., a sequence of one or more Unicode characters, or the like), timestamp data, or metadata (e.g., start-of-transcript, end-of-transcript, tasks such as translate or transcribe, notimestamp, language, nospeech, previous transcript, or any other suitable metadata). The task specification can be used to identify which task (or tasks) the model is to perform in a particular instance. This task specification can also be used in training the model. In some embodiments, conditioning information (e.g., prompts or custom vocabulary) can also be specified as a sequence of input tokens to the decoder.

Consistent with disclosed embodiments, the vocabulary for model 110 can include textual tokens, timestamp tokens, and special tokens. In some embodiments, special tokens can specify metadata, such as prompts or custom vocabulary (e.g., when adding context to the current prediction), start of the transcript, the end of the transcript, or the like. In multi-task embodiments, special tokens can specify tasks, such as whether to perform transcription (speech to text in the same language) or translation (speech in a first language other than English to text in English). In multi-language embodiments, special tokens can indicate the predicted language of the output text (or of the input speech). In some embodiments, special tokens (e.g., a "no-speech" token) can specify whether speech is occurring in the audio portion of the training example. In some embodiments, special tokens can specify whether to predict timestamps for use in generating a time-aligned transcription (e.g., for closed captions, or the like).

Consistent with disclosed embodiments, timestamp tokens can predict the time associated with one or more textual tokens. In some embodiments, timestamp tokens can be predicted before and/or after each sequence of textual tokens. Timestamp tokens can indicate the time relative to the start of the audio portion of the training sample. The timestamp tokens can indicate times with a resolution chosen based on the time resolution of the whisper models (e.g., the inter-sample times, or the like). In some embodiments, the resolution can be 20 milliseconds (e.g., 0 ms, 20 ms, 40 ms, . . . , 29980 ms, or the like) or other suitable values (e.g., 10 ms, 30 ms, 50 ms, 100 ms, 200 ms, 300 ms, 500 ms, 1 s, or the like). Textual tokens can indicate textual data (e.g., a sequence of one or more Unicode characters, or the like).

In some embodiments, when in timestamp mode, model 110 can be configured to predict only a start time token for a transcript segment only partially included in the current audio portion. In this manner, model 110 can indicate that subsequent decoding should be performed on an audio window aligned with that time. Alternatively, the audio corresponding to the transcript segment can be truncated or discarded.

The textual tokens can be generated using a BPE text tokenizer (e.g., the byte-level BPE text tokenizer used for GPT-2, or the like). The BPE text tokenizer can generate the textual tokens comprising the vocabulary based on the tokens present in the multi-language transcripts in the training dataset. Such refitting can be performed to avoid excess fragmentation of the vocabulary. In some embodiments, the number of textual tokens generated for the vocabulary can be the same as the number of textual tokens used in the GPT-2 vocabulary. However, as may be appreciated, the disclosed embodiments can also use vocabularies including more or fewer tokens.

Consistent with disclosed embodiments, model 110 can be configured to accept an audio input (e.g., the audio segment of a training sample, or the like). The audio input can be of a specified duration (e.g., 30 seconds, or some other suitable value). The audio input can be converted (e.g., using resampling) to a particular sampling frequency (e.g., 16,000 Hz, or another suitable sampling frequency for speech). The audio input can be converted to a spectrogram (e.g., log-mel spectrogram 115, or the like). The dependent axis of the spectrogram can be scaled to reflect the perceptibility of sound (e.g., a mel spectrogram or log-mel spectrogram). The spectrogram can include multiple channels of frequency data (e.g., 80 channels or another suitable value). The spectrogram can be generated using windows of the resampled audio input. Each window can be used to generate the frequency channel values for a particular time. The windows can be specified in terms of a duration (e.g., 25 ms windows, or another suitable value) or a number of samples (e.g., 400 samples, or another suitable value). The spectrogram can generate overlapping windows. The amount of the overlap can be specified in terms of a duration (e.g., 10 ms or another suitable value) or a number of samples (e.g., 160 samples, or another suitable value).

Consistent with disclosed embodiments, the spectrogram corresponding to the audio segment can be normalized. The spectrogram can be scaled to be within the range −1 and 1 and with approximately zero mean across the training samples in the training dataset.

Consistent with disclosed embodiments, features for the encoder can be generated using a stem network. The stem network can accept as input the normalized spectrogram and can provide one or more output channels to the encoder. The disclosed embodiments are not limited to any particular stem network architecture. In some embodiments, the stem network can include two convolutional layers. As may be appreciated, the configuration of the convolutional layers can depend on parameters such as kernel sizes, padding, activation function, stride, and the like. In some embodiments, the convolutional layers can have kernels of filter width 3 (or another suitable filter width). In some embodiments, the convolutional layers can have Gaussian Error Linear Unit (GELU) activation functions. In some embodiments, the second convolutional layer can have a stride of 2.

Consistent with disclosed embodiments, positional encodings (e.g., sinusoidal positional encoding 117) can be combined with the output of the stem network. In some embodiments, the positional encodings can be added to the outputs of the stem network. The positional encodings can impose a temporal ordering on the outputs of the stem network. In some embodiments, the positional encodings can be predetermined (e.g., generated using trigonometric function(s), or other suitable type(s) of function(s)). In some embodiments, the positional encodings can be learned during training.

Consistent with disclosed embodiments, the combined stem output and positional encodings can be input to encoder 111. Encoder 111 can include multiple transformer blocks 119. Each transformer block can include sub-layers. In some embodiments, one or more of the sublayers can include a multi-headed self-attention layer (e.g., multi-headed self-attention layer 135) and a feed-forward layer (e.g., feed forward layer 137). In some embodiments, one or more of the sublayers can include normalization layers. For example, an addition and normalization layer can follow each of the multi-headed self-attention layer and the feed-forward layer. In some embodiments, one or more of the transformers can use pre-activation residual blocks. A residual connection (e.g., residual connection 133) can connect the input of the multi-headed self-attention layer to the addition and normalization layer following the multi-headed self-attention layer. Similarly, in some embodiments, a residual connection can connect the input of the feed-forward layer to the addition and normalization layer following the feed-forward layer. In some embodiments, a final layer normalization can be applied to the encoder output. Consistent with disclosed embodiments, the output of encoder 111 can be or include cross attention 129.

Consistent with disclosed embodiments, decoder 112 can be configured to accept as input a sequence of tokens (e.g., tokens in multitask training format 121). Decoder 112 can be configured to predict the next token in the sequence. In this manner, decoder 112 can autoregressively predict the output sequence of tokens (e.g., output 131). In some embodiments, the sequence input to the decoder can be shifted one token to the right. For example, the first token in the input sequence can be a start-of-transcript token.

In some embodiments, the input sequence of tokens can be applied to an embedding layer to generate output embeddings. In some embodiments, the output embeddings can be combined with a positional encoding (e.g., learned positional encoding 123, or the like). In some embodiments, the output embeddings can be added to the positional encoding. In some embodiments, the positional encodings can be predetermined (e.g., generated using trigonometric function(s), or other suitable type(s) of function(s)). In some embodiments, the positional encodings can be learned during training.

In some embodiments, an encoding of the input sequence of tokens (e.g., a one-hot encoding, or the like) can be combined with the positional encoding.

Consistent with disclosed embodiments, the combined output embeddings and positional encodings (or combined input sequence encoding and positional encoding) can be input to decoder 112. Decoder 112 can include transformer blocks 125. Each transformer block can include multiple sub-layers. In some embodiments, one or more of the sublayers can include a multi-headed self-attention layer, a feed-forward layer, and a cross attention layer (e.g., cross-attention layer 139). In some embodiments, one or more of the sublayers can include normalization layers. For example, an addition and normalization layer can follow each of the multi-headed self-attention layer and the feed-forward layer. In some embodiments, one or more of the transformers can use pre-activation residual blocks. A residual connection can connect the input of the multi-headed self-attention layer to the addition and normalization layer following the multi-headed self-attention layer. Similarly, in some embodiments, a residual connection can connect the input of the feed-forward layer to the addition and normalization layer following the feed-forward layer. Similarly, in some embodiments, a residual connection can connect the input of the cross-attention layer to the addition and normalization layer following the cross-attention layer. In some embodiments, one or more additional layers (e.g., feed forward layers, or another suitable layer architecture) can map from the output of the decoder to a vector of activation values (e.g., logits) for the vocabulary of model 110 (or a subset thereof, such as the text and timestamp tokens; or the text, timestamp, and language special tokens; or other suitable subsets). In some embodiments, another layer (e.g., a softmax layer) can convert these activation values into probabilities. The computing device(s) implementing model 110 can be configured to select the next token (e.g., next-token prediction 127) according to these probabilities. The selected token can then be added to the input sequence for the decoder (e.g., input tokens 121).

Consistent with disclosed embodiments, model 110 can be implemented using a breadth-first search, such as a beam search. The disclosed embodiments are not limited to any particular implementation of a beam search. In some embodiments, in a first iteration, n sequences of tokens are generated by drawing n final tokens from the vocabulary according to first corresponding probabilities calculated by the decoder. In the second iteration, the decoder calculates n sets of second corresponding probabilities based on (e.g., using) the n sequences of tokens. For each set of second corresponding probabilities, n sequences of tokens are generated by drawing n final tokens from the vocabulary according to the set of second corresponding probabilities and appending them to the corresponding sequence of tokens. A score may be calculated for each of the resulting $n^2$ sequences of tokens. The best n sequences of tokens are retained. In the third iteration, the decoder calculates probabilities based on (e.g., using) the n retained sequences of tokens. This process repeats until end-of-transcription tokens have been predicted for all of the sequences. The sequence with the best score can then be output. As may be appreciated, other suitable variations of the beam search can be used.

In some embodiments, the decoder can be configured to mask self-attention to prevent the self-attention layers from attending to subsequent positions in the input sequence.

Figure 2A:
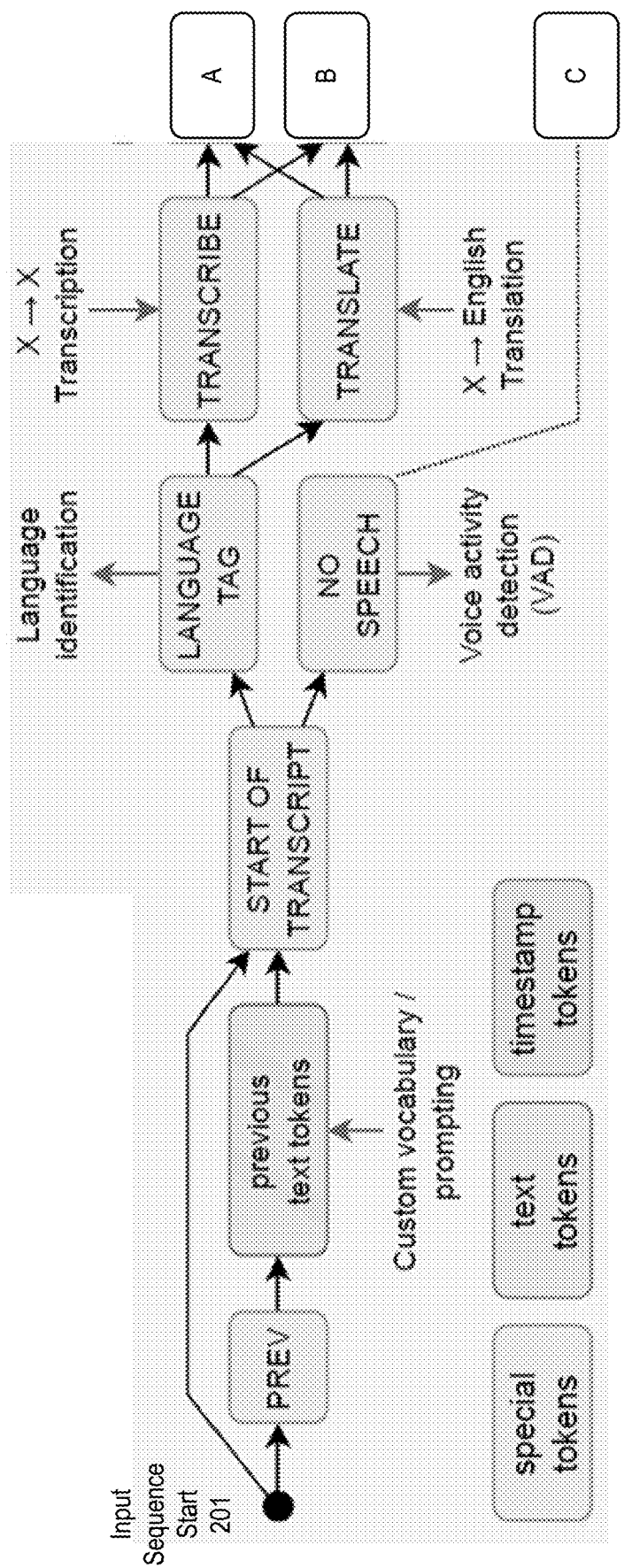
FIGS. 2A and 2B depict an exemplary input sequence used to train an automatic speech recognition model for multi-language, multi-task operation, consistent with disclosed embodiments.
Figure 2B:
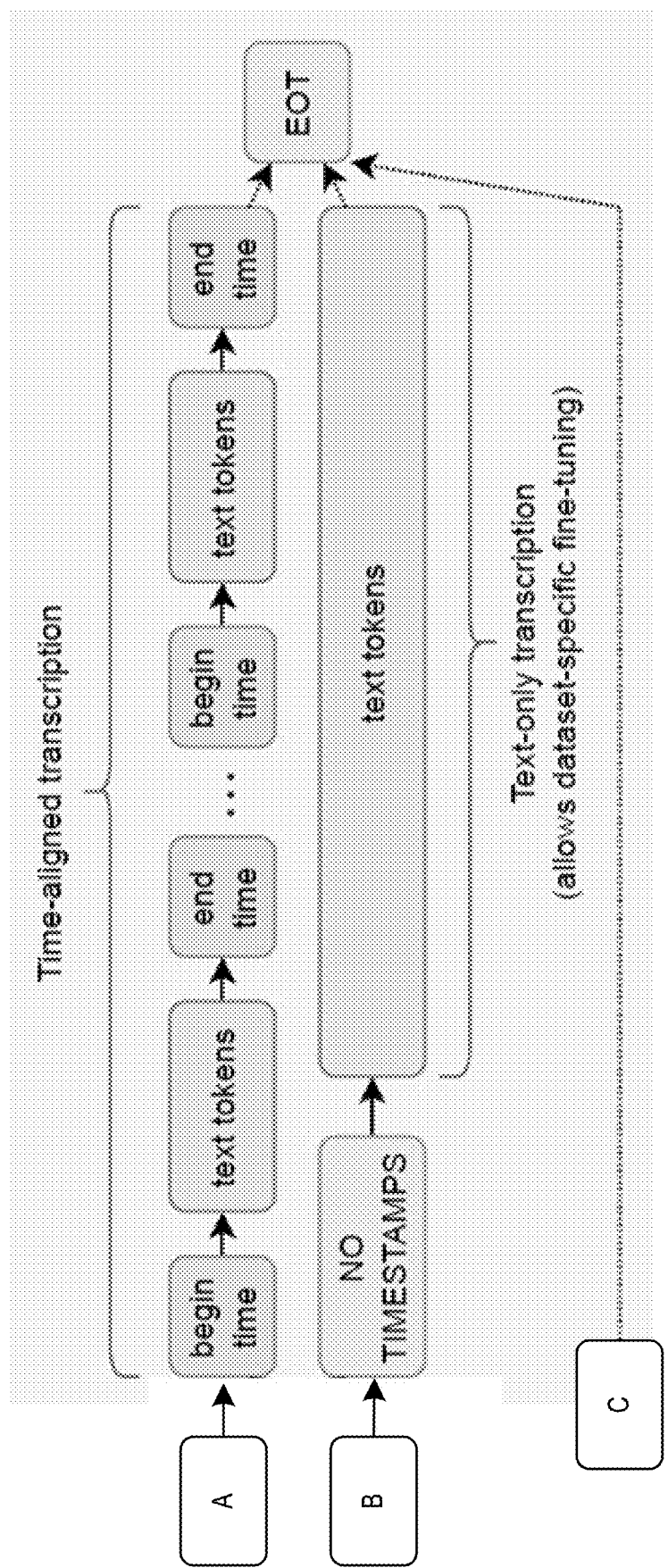

FIGS. 2A and 2B depict an exemplary input sequence used to train model 110 for multi-language, multi-task operation, consistent with disclosed embodiments. In some instances, after input start sequence 201, the input sequence can be configured with a "previous" special token and contextual tokens (which can include timestamp and/or textual tokens). In some instances, after input start sequence 201, the input sequence can be configured with a "start of transcript" special token. In some embodiments, the decoder can be configured to mask training loss over the previous context text (e.g., the tokens preceding the "start of transcript" special token). Model 110 can then be trained to predict the remaining tokens (e.g., the tokens following the start of transcript token).

Consistent with disclosed embodiments, a "language" special token can be specified for the input sequence based on a detected language of the training sample. As may be appreciated, in some mono-lingual embodiments, the language special token may not be used. The detected language can be determined by a VoxLingua107 model (or other suitable model). Alternatively, a "nospeech" special token can be specified for the input sequence when there is no speech in the training sample. An input sequence including the "nospeech" special token can follow this special token with the "end of transcript" special token (Option C in FIG. 2A).

Consistent with disclosed embodiments, a "transcribe" or "translate" special token can be included to specify whether model 110 is to transcribe or translate the input speech. A "translate" special token can be specified when the training sample is drawn from the translation training samples generated when creating the training dataset. Otherwise, the "transcribe" special token may be included.

Consistent with disclosed embodiments, a "notimestamp" special token can be included to cause model 110 not to predict timestamps (Option A in FIG. 2A). Otherwise, model 110 can be configured to predict timestamps (Option B in FIG. 2A). In some embodiments, a ground truth can be determined for the prediction of timestamps using timestamps provided in a transcript used for training (e.g., with the timestamp values in the transcript subject to rounding, quantization, or the like). In some embodiments, timestamps in a subset of a transcript used for training can be mapped to timestamp tokens in the vocabulary of model 110. Model 110 can be configured to generate tokens (e.g., during training) using an audio segment corresponding to the subset of the transcript. The tokens generated by model 110 can be compared to the subset of the transcript (including the mapped timestamp tokens) to generate a loss for training model 110.

As depicted in FIG. 2B, depending on whether the "notimestamp" special token is included, the input sequence can be configured to include a block of textual tokens or sets of timestamp tokens bracketing sequences of textual tokens. The input sequence can conclude with an "end of transcript" special token.

Consistent with disclosed embodiments, such input sequences can be constructed for training samples selected during training of the model. In some embodiments, a transcript including timestamps can be used to generate a training sample including timestamp tokens (or a training sample lacking timestamp tokens). Such a training sample can be used when training model 110 to predict transcripts including timestamp tokens (e.g., when the special token "notimestamp" is absent from the input sequence, or the like). Additionally or alternatively, a transcript including timestamps can be used to generate a training sample lacking timestamp tokens. Such a training sample can be used when training model 110 to predict transcripts lacking timestamp tokens (e.g., when the special token "notimestamp" is present in the input sequence, or the like).

Training

As shown in Table 1, the disclosed embodiments can include models having different sizes.

TABLE 1

Architecture details of the Whisper model family. Layers is the number of transformer layers in the input and the output. Width is the width of the transformer layers. Heads is the number of heads in the multi-head attention layers.

| Model  | Layers | Width | Heads | Parameters |
|--------|--------|-------|-------|------------|
| Tiny   | 4      | 384   | 6     | 39M        |
| Base   | 6      | 512   | 8     | 74M        |
| Small  | 12     | 768   | 12    | 244M       |
| Medium | 24     | 1024  | 16    | 769M       |
| Large  | 32     | 1280  | 20    | 1550M      |

Models consistent with the disclosed embodiments were trained as follows and evaluated as described herein. As may be appreciated, the disclosed embodiments are not limited to training based on the following hyperparameters or training configurations. Instead, any suitable hyperparameters and/or training configurations can be used.

Consistent with disclosed embodiments, models consistent with disclosed embodiments were trained with data parallelism across accelerators using half precision floating point numbers (FP16) with dynamic loss scaling and activation checkpointing. Models were trained with AdamW and gradient norm clipping with a linear learning rate decay to zero after a warmup over the first 2048 updates. A batch size of 256 segments was used, and the models were trained for 220 updates (in this instance, between two and three passes over the dataset). In these instances, due to only training for a few epochs, over-fitting was not a large concern. Accordingly, data augmentation or regularization was not used. Instead, training relied on the diversity contained within such a large dataset to encourage generalization and robustness.

Furthermore, an additional large model (denoted V2) was trained for 2.5× more epochs while adding SpecAugment, Stochastic Depth, and BPE Dropout for regularization. Results described herein concern this improved model unless otherwise specified.

To avoid attempts to name of the person who is speaking, the models were fine-tuned briefly on the subset of transcripts that do not include speaker annotations, which removed this behavior.

As may be appreciated, the disclosed embodiments are not limited to such hyperparameters and/or training configurations. Other suitable training approaches may be used without departing from the scope of the disclosed embodiments.

Figure 3:
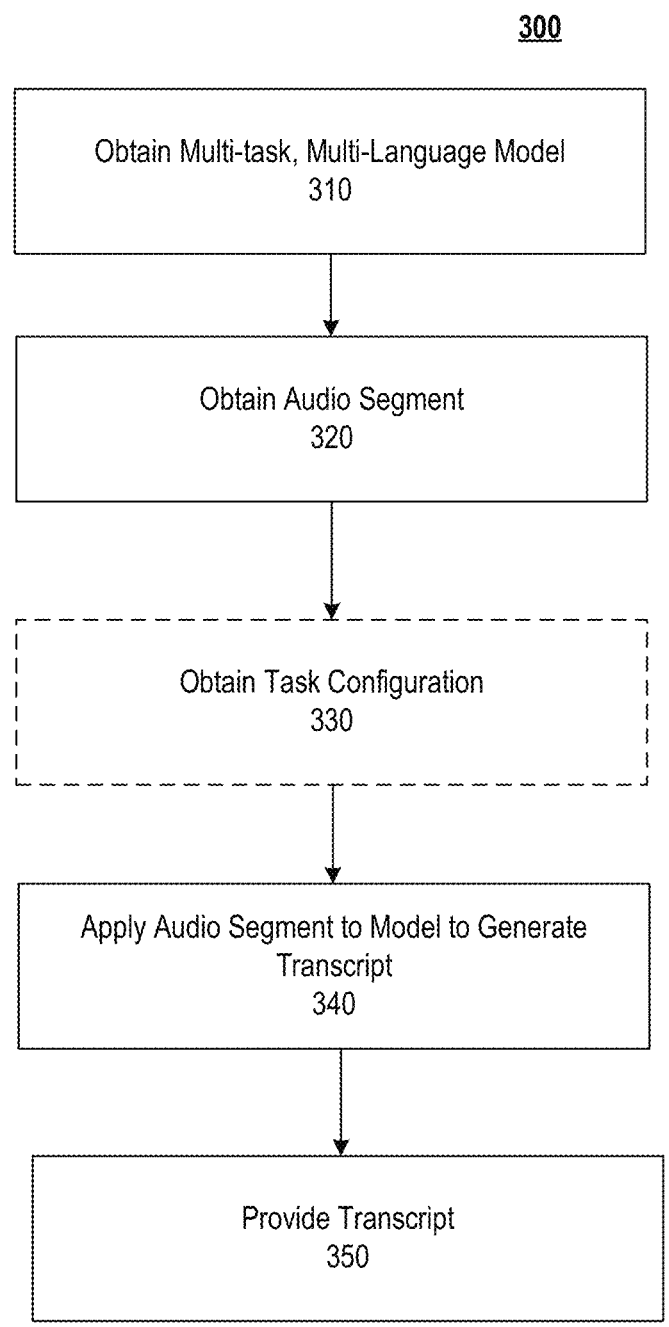
FIG. 3 depicts a method for generating an output transcript from an input audio segment, consistent with disclosed embodiments.

FIG. 3 depicts a method 300 for generating an output transcript from an input audio segment, consistent with disclosed embodiments. The steps illustrated in FIG. 3 are exemplary and steps may be added, merged, divided, duplicated, repeated (e.g., as part of a machine learning process), modified, performed sequentially, performed in parallel, and/or deleted in some embodiments. Method 300 can be implemented using an operating environment (e.g., operating environment 1400, or the like). The operating environment may include a computing device (e.g., computing device 1402, or the like). The operation environment can implement a machine learning platform, such as machine learning platform 1500. In some embodiments, datasets can be obtained from data source(s) (e.g., data source(s) 1502, or the like). In some embodiments, data can be obtained from the data source(s) using a data input engine (e.g., data input engine 1510, or the like). In some embodiments, the obtained data can be prepared for inference using a featurization engine (e.g., featurization engine 1520, or the like).

In some embodiments, a machine learning modeling engine (e.g., machine learning modeling engine 1530, or the like) can be configured to obtain a model consistent with disclosed embodiments from a repository (e.g., ML algorithms database 1590, or the like). In some embodiments, the machine learning modeling engine (or another component, such as predictive output generation engine 1540, or the like), can be configured to apply the obtained data to the obtained model to generate an output transcript. As may be appreciated, the foregoing architecture is exemplary.

Other architectures can be used to perform method 300, without departing from the envisioned embodiments. For convenience of description, the steps of method 300 are attributed to the machine learning platform. However, the disclosed embodiments are not so limited. As may be appreciated, inference can require substantially fewer computational resources than training. In various embodiments, method 300 can be performed by a mobile device (e.g., a smartwatch, smartphone, laptop, or the like), a desktop, workstation, or other suitable computing device.

In step 310 of process 300, the machine learning platform can obtain a multi-task, multi-language model. The model can have an architecture similar to the model described above with regards to FIG. 1B. For example, the model can be a transformer model. The transformer model can include an encoder and a decoder. The model may have been trained as described herein. For example, the model may be a multi-task, multi-language model trained to transcribe (or to transcribe and translate) audio data in multiple languages based on (e.g., using) labeled audio data. The labeled audio data may have included first audio segments associated with first same-language transcripts of the first audio segments and second audio segments associated with second different-language transcripts of the second audio segment. The training may have been performed using input sequences as described with regard to FIGS. 2A and 2B.

Alternatively, the model may be a single-language model trained to transcribe (or to transcribe and translate) audio data in a single language based on (e.g., using) labeled audio data. Alternatively, the model may be a single-task, multi-language (or single language) model trained to transcribe audio data in multiple languages (or a single language) based on (e.g., using) labeled audio data. In some embodiments, the model can be configured to automatically perform inverse text normalization. For example, the model can be trained on normalized transcripts and therefore can generate tokens that automatically incorporate that normalization.

In some instances, the machine learning platform can obtain (e.g., request, access, and/or receive) the model from another computing system, a storage location accessible to the machine learning platform, or a computer readably medium (e.g., a pen drive provided by a user). In various embodiments, the machine learning platform can obtain a training dataset, such as the training dataset described herein, and train a suitable model.

In step 320 of process 300, the machine learning platform can obtain an audio segment. In some embodiments, the machine learning platform can receive or retrieve the audio segment from another system (or multiple other systems, such as by accessing digital audio material across one or more networks, such as the internet). In various embodiments, the machine learning platform can generate the audio segment. For example, the machine learning platform (or another computing device implementing method 300, such as a smartphone) can record an audio segment. The audio segment can include speech in a language that the model was trained on. In some embodiments, an audio segment may be a configured to be input for the model (i.e., may be an input audio segment). In some embodiments, an audio segment may be re-configured (e.g., filtered, trimmed, volume-adjusted) prior to being input to the model.

In optional step 320 of process 300, the machine learning platform can obtain a task configuration. The task configuration can specify the tasks that the model is supposed to perform on the audio segment (e.g., transcription, translation and transcription, speech detection, language identification, whether or not to generate timestamps, or the like). In some embodiments, the task configuration can be multi-part. For example, the choice between transcription or translation can be specified independently of the choice between timestamps or no timestamps. In some embodiments, the machine learning platform can receive or retrieve at least a part of the task configuration (e.g., transcription versus translation, whether or not to include timestamps, or the like) from another system. In various embodiments, the machine learning platform can generate at least a part of the task configuration. For example, the machine learning platform can be configured with default values for configuration parameters. As an additional example, the machine learning platform can be configured to receive (e.g., through a user interface) user selections of the configuration parameters. In some embodiments, such user selections can be expressed through a textual prompt entered by the user (e.g., "Generate a time-aligned, English-language transcript of this audio file.") In some embodiments, such user selections can be expressed through selections of controls (e.g., toggles, radio buttons, or the like) in a user interface (such as a graphical user interface) provided by the machine learning platform.

In step 340 of process 300, the machine learning platform can generate a transcript (e.g., an output transcript) from the audio segment (e.g., an input audio segment) using the model. Consistent with disclosed embodiments, generating the transcript (or a portion thereof) can include autoregressively generating the transcript using the decoder. The transcript can be iteratively generated from a decoder input. Consistent with disclosed embodiments, the decoder input can be configured with special tokens (e.g., a language token, a task token, a notimestamp token, or the like) prior to predicting textual tokens (or timestamp tokens).

In some embodiments, the machine learning platform can prepend contextual tokens to the decoder input based on the task configuration received in step 330, thereby configuring the decoder input.

In some embodiments, configuring the decoder input with the special tokens can include using the decoder to autoregressively generate the special tokens. For example, the decoder can predict a language token, a task token, or a notimestamp token. A language token may be or include a data value (e.g., an index into a vocabulary of the model, or the like), an instance of an object (e.g., a vocabulary object, or the like), an encoding of any of the forgoing (e.g., a one-hot encoding of an index into a vocabulary of the model, a hash of a vocabulary object, or the like), or any other suitable signifier or indication of a language. A task token may be or include a data value (e.g., an index into a vocabulary of the model, or the like), an instance of an object (e.g., a vocabulary object, or the like), an encoding of any of the forgoing (e.g., a one-hot encoding of an index into a vocabulary of the model, a hash of a vocabulary object, or the like), or any other suitable signifier or indication of a task (e.g., transcribing, translating, or another suitable task). A task token may be or include a data value (e.g., an index into a vocabulary of the model, or the like), an instance of an object (e.g., a vocabulary object, or the like), an encoding of any of the forgoing (e.g., a one-hot encoding of an index into a vocabulary of the model, a hash of a vocabulary object, or the like), or any other suitable signifier or indication that the model should not generate timestamps when creating the transcript. A textual token may be or include a data value (e.g., an index into a vocabulary of the model, or the like), an instance of an object (e.g., a vocabulary object, or the like), an encoding of any of the forgoing (e.g., a one-hot encoding of an index into a vocabulary of the model, a hash of a vocabulary object, or the like), or any other suitable signifier or indication of textual data. The decoder can predict a language token given a start of transcription token and the cross-attention from the encoder. The decoder can predict a task token (or a notimestamp token) given contextual tokens prepended to the decoder input, a start of transcription token, and the cross-attention from the encoder. A special token predicted by the decoder in an iteration (e.g., included in decoder output 131) can included in the decoder input (e.g., decoder input 121) in the next iteration, thereby configuring the decoder input.

In some instances, the machine learning platform can update the decoder input to include one or more of the special tokens (e.g., the decoder may not generate these special tokens). For example, machine learning platform can assign one or more of a language token, a transcript (or translate) token, and a notimestamp token to a position in the decoder input. In some embodiments, the assigned position can follow the start-of-transcript token. In some embodiments, the machine learning platform can place these tokens into the input of the decoder based on the task configuration obtained in step 330.

In some instances, the decoder input can include at least two of the following: prepended contextual tokens, autoregressively generated special tokens (e.g., a predicted language token), or assigned special tokens (e.g., a transcript or translate token, or a notimestamp token).

In some embodiments, the model can be configured to translate from many languages into many languages. In such embodiments, a language token can be associated with a first language (the language from which to translate), and a translate token can be associated with a second language (the language into which to translate). For example, the language token can specify the first language and the translate token can specify the second language.

As described herein, the decoder can autoregressively generate output tokens based on (e.g., using) previously generated output tokens in the decoder input and cross-attention from the encoder. The generated output tokens can therefore depend on the task configuration specified in decoder input. For example, the model may be configured to generate textual tokens associated with the second language when the decoder input is configured with a translate token associated with the second language (e.g., the decoder input includes translate token associated with the second language). As an additional example, the model may be configured to generate timestamp tokens when the decoder input is not configured with a notimestamp token (e.g., the decoder input does not include the notimestamp token). Alternatively, the model may be configured to generate timestamp tokens when the decoder input is configured with a timestamp token (e.g., the decoder input includes a timestamp token). As an additional example, the model may be configured to generate textual tokens associated with a language when the decoder input is configured with a language token associated with the language, but not a translate token associated with another language (e.g., the decoder input includes the language token but does not include the translate token). As a further example, the model may be configured to generate textual tokens for the language when the decoder input is configured with a language token associated with the language and a transcribe token associated with the language (e.g., the decoder input includes the language token and includes the transcribe token). As an additional example, the model may be configured to generate the end-of-transcript token when the decoder input is configured with the nospeech token. The decoder input can therefore include the nospeech token followed by the end-of-transcript token.

In some instances, the duration of the audio segment can exceed a maximum duration associated with the encoder. In such instances, the machine learning platform can process subsegments of the audio segment to generate transcript portions that can be combined to form the transcript. For example, the machine learning platform can generate a first subsegment of the audio segment. The machine learning platform can then apply the first subsegment to the model to generate a first transcript portion including one or more predicted timestamp tokens for the first subsegment. The machine learning platform can then generate a second subsegment of the audio segment based on (e.g., using) the one or more predicted timestamp tokens. For example, when the first subsegment begins at a time $t_s$ in the audio segment and the last predicted timestamp token for the first subsegment is associated with time $t_f$ in the first subsegment, the second subsegment of the audio segment can begin at time $t_s+t_f$ in the audio segment. The machine learning platform can then apply the second subsegment to the model to generate a second transcript portion including one or more predicted timestamp tokens for the second subsegment. The machine learning platform can repeat this process until the entire audio segment has been applied to the model. The machine learning platform can then combine the generated transcript portions for each subsegment to form the output transcript.

In some embodiments, the machine learning platform can generate the transcript using a beam search, as described herein. When performing the beam search, an output softmax temperature for the decoder can be adjusted based on the generated output, as described herein. In some embodiments, the output softmax temperature can depend on at least one of: log probabilities of previously generated tokens of the output transcript; or a gzip compression rate of the previously generated tokens of the output transcript.

As described herein, generated output tokens can depend on the task configuration specified in decoder input. In some embodiments, a transcript generated for a preceding input audio segment (e.g., a preceding sub-segment of the audio segment received in step 320, when a duration of that segment exceeds the segment duration accepted by the encoder, or an audio segment received in a prior iteration of process 300, or the like) can be prepended to the decoder input (e.g., similar to the "previous text tokens" depicted in FIG. 2A). In this manner, information contained in the transcript of the preceding input audio segment can be used to generate the transcript of the current input audio segment.

In step 360 of process 300, the machine learning platform can provide the output transcript. The disclosed embodiments are not limited to any particular manner of providing the output transcript. In some embodiments, the output transcript can be provided to another system (e.g., a storage system, a text-to-speech system, or the like). In some embodiments, the output transcript can be displayed (e.g., on a screen associated with the machine learning platform or other system).

Experimental Results

Below, several experimental results are discussed. These results demonstrate the capabilities of models consistent with disclosed embodiments. However, the disclosed embodiments are not limited to models that can achieve these particular results.
Zero Shot Evaluation Existing speech processing datasets were used to validate that disclosed embodiments generalize well across domains, tasks, and languages. Models consistent with disclosed embodiments were validated in a zero-shot setting without using any of the training data for each of these datasets. In this manner, the ability of the disclosed embodiments to generalize was evaluated.
Evaluation Metrics Speech recognition research typically evaluates and compares systems based on the word error rate (WER) metric. However, WER, which is based on string edit distance, penalizes all differences between the model's output and the reference transcript, including innocuous differences in transcript style. As a result, systems that output transcripts that would be judged as correct by humans can still have a large WER due to minor formatting differences. While this poses a problem for all transcribers, it is particularly acute for zero-shot models like the disclosed embodiments, which do not observe any examples of specific datasets transcript formats.

To obtain the presented results, extensive standardization of transcripts before the WER calculation was performed to minimize penalization of non-semantic differences. The standardization of the transcripts was performed as described in Appendix C. For several of the tested datasets, WER drops of up to 50 percent were obtained, usually due to a quirk such as a dataset's reference transcripts separating contractions from words with whitespace.
English Speech Evaluation As known in the art, conventional automatic speech recognition models exceed human performance on held-out but in-distribution data (e.g., held-out data from the same dataset used in training). However, such models exhibit error rates far about human error rates when used in other settings.

The inventors appreciate that this disparity may arise from conflating different capabilities measured by human and machine performance on a test set. Humans are often asked to perform a task given little to no supervision on the specific data distribution being studied. Human performance is therefore a measure of out-of-distribution generalization. But machine learning models are usually evaluated after training on a large amount of supervision from the evaluation distribution, meaning that machine performance is therefore a measure of in-distribution generalization. While both humans and machines are being evaluated on the same test data, two quite different abilities are being measured due to a difference in training data.

Models consistent with disclosed embodiments were compared with both human performance and standard fine-tuned conventional models. This comparison was quantified in terms of overall robustness, that is average performance across many distributions/datasets, and effective robustness, which measures the difference in expected performance between a reference dataset, which is usually in-distribution, and one or more out-of-distribution datasets. A model with high effective robustness does better than expected on out-of-distribution datasets as a function of its performance on the reference dataset and approaches the ideal of equal performance on all datasets. LibriSpeech was used as the reference dataset due to its central role in modern speech recognition research and the availability of many released models trained on it, which allows for characterizing robustness behaviors. A suite of 12 other academic speech recognition datasets to study out-of-distribution behaviors (See Appendix A).

Figure 4:
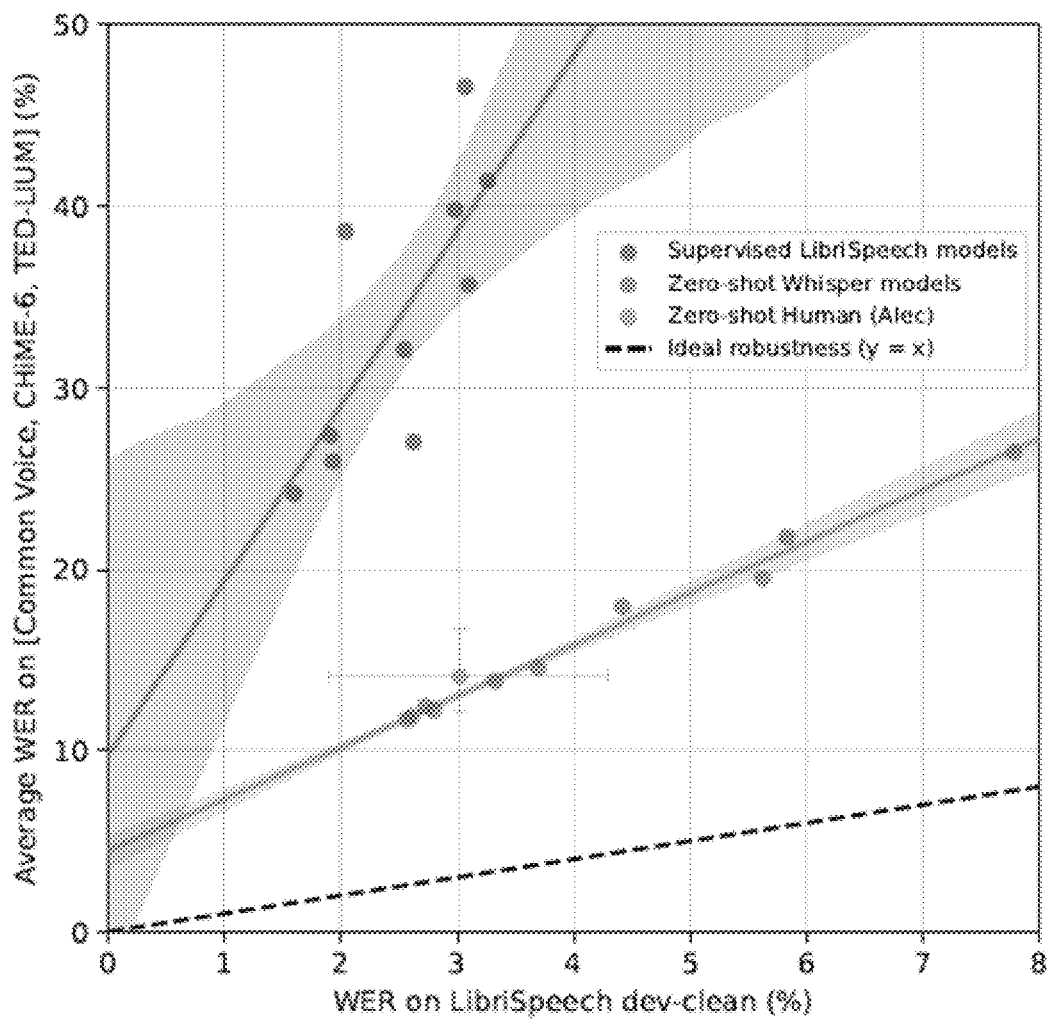
FIG. 4 depicts the comparative performance of models consistent with disclosed embodiments, conventional supervised models trained on LibriSpeech, and a human, on LibriSpeech and other datasets.

FIG. 4 depicts the comparative performance of models consistent with disclosed embodiments, conventional supervised models trained on LibriSpeech, and a human, on LibriSpeech and other datasets. As shown, zero-shot models consistent with disclosed embodiments close the gap to human robustness. Despite matching or outperforming a human on LibriSpeech dev-clean, supervised LibriSpeech models make roughly twice as many errors as a human evaluator on other datasets (thus demonstrating the brittleness and lack of robustness of conventional models). The estimated robustness frontier of zero-shot models consistent with disclosed embodiments, however, includes the 95% confidence interval for the human evaluator.

Although the best zero-shot model consistent with disclosed embodiments has a relatively unremarkable LibriSpeech clean-test WER of 2.5, which is roughly the performance of modern supervised baseline or the mid-2019 state of the art, zero-shot models consistent with disclosed embodiments have very different robustness properties than supervised LibriSpeech models and out-perform all benchmarked LibriSpeech models by large amounts on other datasets. Even the smallest zero-shot model consistent with disclosed embodiments, which has only 39 million parameters and a 6.7 WER on LibriSpeech test-clean is roughly competitive with the best supervised LibriSpeech model when evaluated on other datasets. The best zero-shot models consistent with disclosed embodiments roughly match the accuracy and robustness of a human evaluator.

TABLE 2

Detailed comparison of effective robustness across various datasets. Although both models perform within 0.1% of each other on LibriSpeech, a zero-shot model consistent with disclosed embodiments performs much better on other datasets than expected for its LibriSpeech performance and makes 55.2% less errors on average. Results reported in word error rate (WER) for both models after applying a text normalizer.

| Dataset | wav2vec 2.0 Large (no LM) | Exemplary Models Large V2 | RER (%) |
|---|---|---|---|
| LibriSpeech Clean | 2.7 | 2.7 | 0.0 |
| Artie | 24.5 | 6.2 | 74.7 |
| Common Voice | 29.9 | 9.0 | 69.9 |
| Fleurs En | 14.6 | 4.4 | 69.9 |
| Tedlium | 10.5 | 4.0 | 61.9 |
| CHiME6 | 65.8 | 25.5 | 61.2 |
| VoxPopuli En | 17.9 | 7.3 | 59.2 |
| CORAAL | 35.6 | 16.2 | 54.5 |
| AMI IHM | 37.0 | 16.9 | 54.3 |
| Switchboard | 28.3 | 13.8 | 51.2 |
| CallHome | 34.8 | 17.6 | 49.4 |
| WSJ | 7.7 | 3.9 | 49.4 |
| AMI SDM1 | 67.6 | 36.4 | 46.2 |
| LibriSpeech Other | 6.2 | 5.2 | 16.1 |
| Average | 29.3 | 12.8 | 55.2 |

Table 2 compares the performance of the best zero-shot Whisper model with a supervised LibriSpeech model that has the closest performance to it on LibriSpeech test-clean. Despite their similar performance on the reference distribution, the zero-shot Whisper model achieves an average relative error reduction of 55.2% when evaluated on other speech recognition datasets. This finding suggests emphasizing zero-shot and out-of-distribution evaluations of models, particularly when attempting to compare to human performance, to avoid overstating the capabilities of machine learning systems due to misleading comparisons.

Multi-Lingual Speech Recognition

Models consistent with disclosed embodiments were evaluated using two low-data benchmarks: Multilingual LibriSpeech (MLS) and VoxPopuli. The models perform well on Multilingual LibriSpeech, outperforming XLS-R, mSLAM, and Maestro in a zero-shot setting. The use of a text standardizer for this result prevents direct comparison or claims of SOTA performance. On VoxPopuli, however, the evaluated model consistent with disclosed embodiments significantly underperforms prior work and only beats the VP-10K+FT baseline from the original paper. This underperformance could be due to conventional models including this distribution as a major source for their unsupervised pre-training data and the dataset having significantly more supervised data, which benefits fine-tuning. While MLS has 10 hours of training data per language, the average amount of training data per language is roughly 10× higher for VoxPopuli.

TABLE 3

Multilingual speech recognition performance. Zeroshot model consistent with disclosed embodiments improves performance on Multilingual LibriSpeech (MLS) but is still significantly behind both Maestro, XLS-R, and mSLAM on VoxPopuli.

| Model | MLS | VoxPopuli |
|---|---|---|
| VP-10K + FT | — | 15.3 |
| XLS-R (1B) | 10.9 | 10.6 |
| mSLAM-CTC (2B) | 9.7 | 9.1 |
| Maestro | — | 8.1 |
| Zero-Shot Whisper | 7.3 | 13.6 |

These two benchmarks are somewhat narrow since they only include 15 unique languages, almost all of which are in the Indo-European language family and many of which are high-resource languages. These benchmarks only provide limited coverage and room to study the multilingual capabilities of models consistent with disclosed embodiments (given the training of such models using training data for speech recognition in 75 languages). To study the performance of a model consistent with disclosed embodiments, model performance on the Fleurs dataset was also evaluated.

Figure 5:
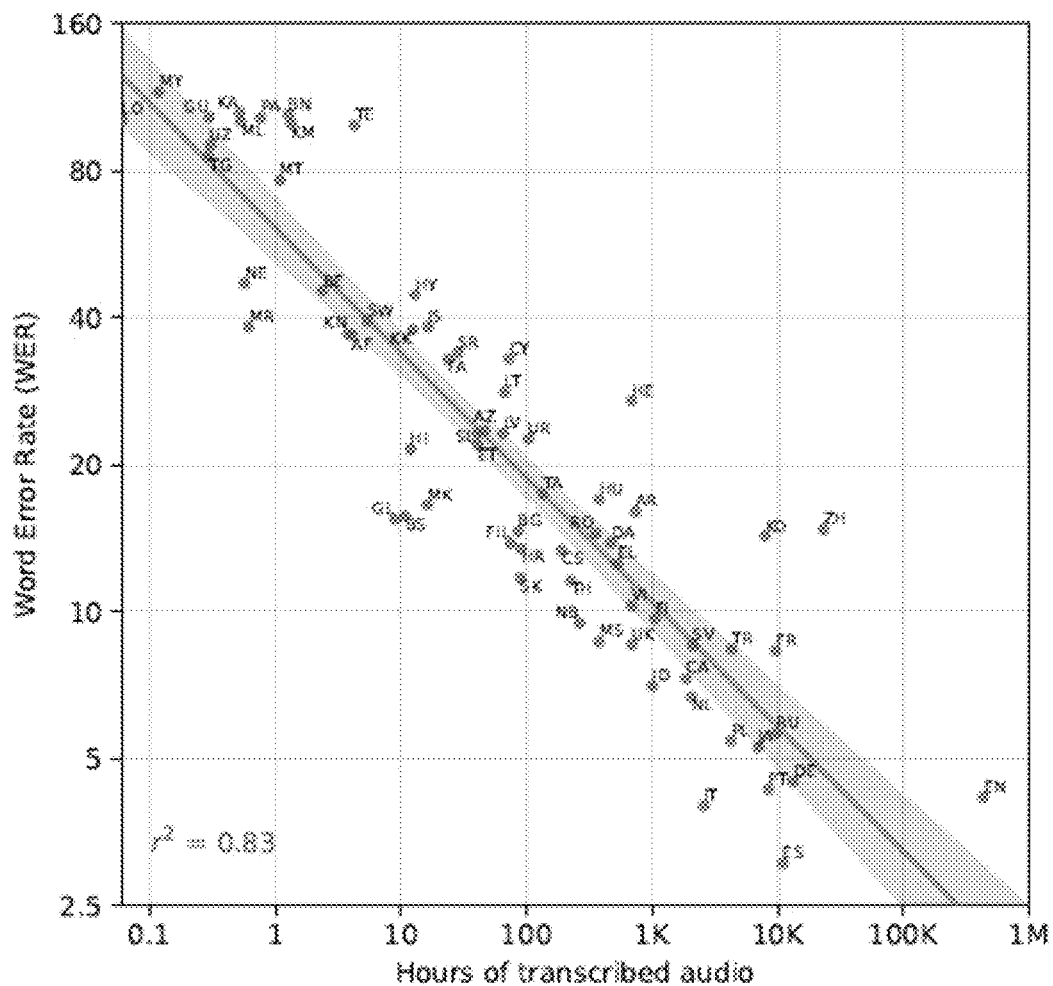
FIG. 5 depicts the relationship between the amount of training data available for a given language and the resulting downstream zero-shot performance for that language.

FIG. 5 depicts the relationship between the amount of training data available for a given language and the resulting downstream zero-shot performance for that language. The amount of pre-training speech recognition data for a given language is very predictive of zero-shot performance on that language in Fleurs.

A strong squared correlation coefficient of 0.83 was found between the log of the word error rate and the log of the amount of training data per language. Checking the regression coefficient for a linear fit to these log-log values results in an estimate that WER halves for every 16× increase in training data. We also observed that many of the largest outliers in terms of worse than expected performance according to this trend are languages that have unique scripts and are more distantly related to the Indo-European languages making up the majority of the training dataset (e.g., Hebrew (HE), Telugu (TE), Chinese (ZH), and Korean (KO)). These differences could be due to a lack of transfer due to linguistic distance, the byte level BPE tokenizer being a poor match for these languages, or variations in data quality.

Translation

The performance of models consistent with disclosed embodiments was evaluated using performance on the X→en subset of CoVoST2. Models consistent with disclosed embodiments were compared with Maestro, mSLAM, and XLS-R, the highest-performing prior work. A new state of the art of 29.1 BLEU zero-shot without using any of the CoVoST2 training data was achieved, potentially due to the 68,000 hours of X→en translation data for these languages in the pre-training dataset which, although noisy, is vastly larger than the 861 hours of training data for X→en translation in CoVoST2. Since evaluation of the models consistent with disclosed embodiments is zero-shot, these models do particularly well on the lowest resource grouping of CoVoST2, improving over mSLAM by 6.7 BLEU. Conversely, the best Whisper model does not improve over Maestro and mSLAM on average for the highest resource languages.

TABLE 4

X → en Speech translation performance. Zero-shot model consistent with disclosed embodiments outperforms existing models on CoVoST2 in the overall, medium, and low resource settings but still moderately under-performs on high-resource languages compared to prior directly supervised work.

| X → English | High | Mid | Low | All |
| --- | --- | --- | --- | --- |
| XMEF-X | 34.2 | 20.2 | 5.9 | 14.7 |
| XLS-R (2B) | 36.1 | 27.7 | 15.1 | 22.1 |
| mSLAM-CTC (2B) | 37.8 | 29.6 | 18.5 | 24.8 |
| Maestro | 38.2 | 31.3 | 18.4 | 25.2 |
| Zero-Shot Whisper | 36.2 | 32.6 | 25.2 | 29.1 |

Fleurs, a speech recognition dataset, was also used as a translation dataset for an additional analysis of translation performance on an even wider set of languages. Since the same sentences are transcribed for every language, the English transcripts were used as reference translations.

Figure 6:
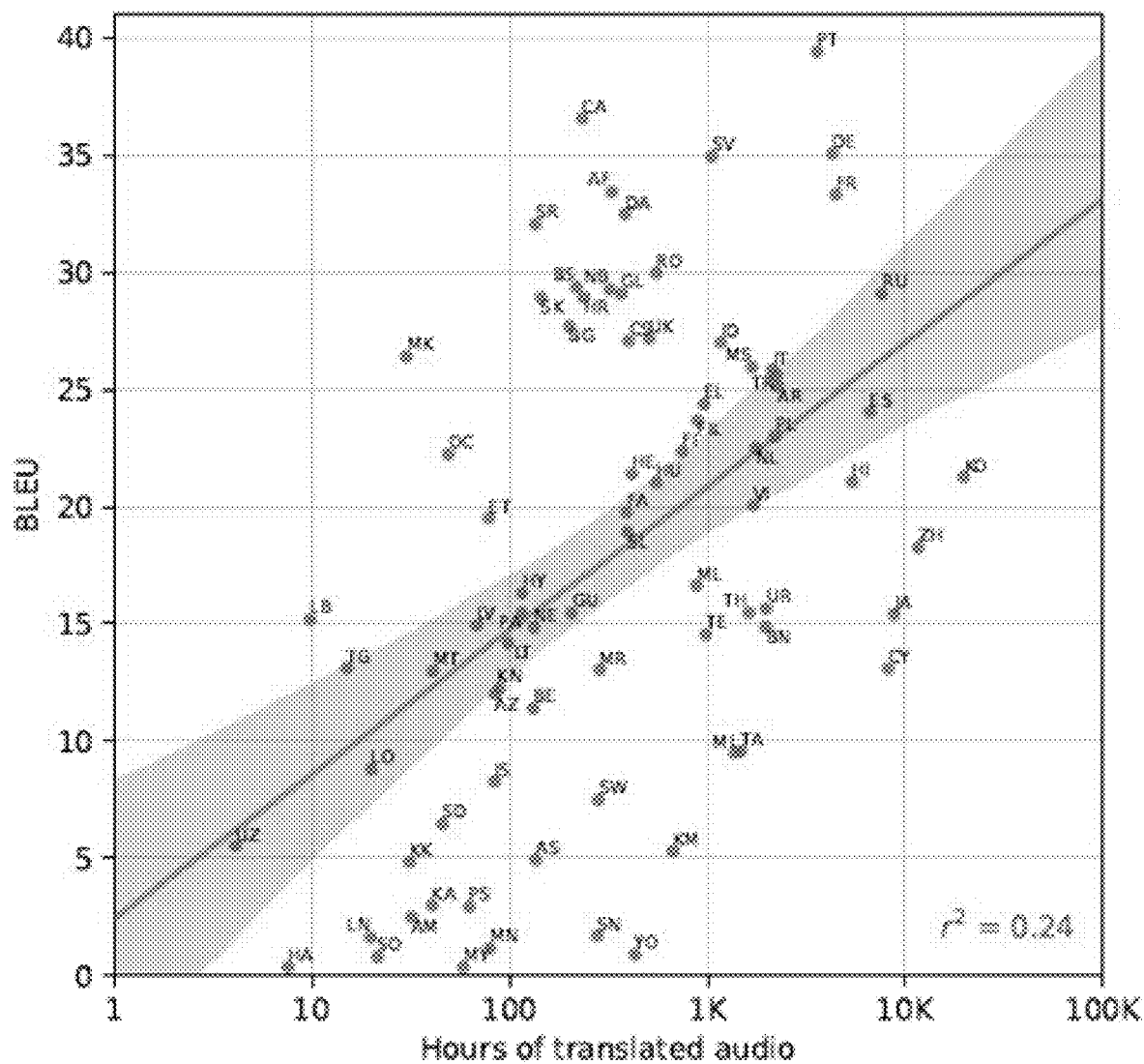
FIG. 6 depicts the correlation of pre-training supervision amount with downstream translation performance.

FIG. 6 depicts the correlation of pre-training supervision amount with downstream translation performance. The amount of pretraining translation data for a given language is only moderately predictive of the zero-shot performance of a model consistent with disclosed embodiments on that language in Fleurs.

While there is a clear trend of improvement with increasing training data, the squared correlation coefficient is much lower than the 0.83 observed for speech recognition and only 0.24. This result may arise from noisier training data due to errors in audio language identification. As an example, Welsh (CY) is an outlier with much worse than expected performance at only 13 BLEU despite supposedly having 9,000 hours of translation data. This large amount of Welsh translation data is surprising, ranking 4th overall for translation data and ahead of some of the most spoken languages in the world like French, Spanish, and Russian. Inspection shows the majority of supposedly Welsh translation data is actually English audio with English captions where the English audio was mis-classified as Welsh by the language identification system, resulting in it being included as translation training data rather transcription data according to the dataset creation rules.

Language Identification

The Fleurs dataset was used to evaluate language identification. The zero-shot performance of a model consistent with disclosed embodiments was not competitive with prior supervised work here and underperforms the supervised SOTA by 13.6%. However, the model was heavily disadvantaged for language identification on Fleurs, since the training dataset contains no training data for 20 of the 102 languages in Fleurs, upperbounding accuracy at 80.4%. On the 82 overlapping languages the best model consistent with disclosed embodiments achieves 80.3% accuracy.

TABLE 5

Language identification performance. Zero-shot accuracy at language identification of a model consistent with disclosed embodiments is not competitive with prior supervised results on Fleurs. This is partially due to the model being heavily penalized for having no training data for 20 of Fleurs languages.

| Language ID | Fleurs |
| --- | --- |
| w2v-bert-51 (0.6B) | 71.4 |
| mSLAM-CTC (2B) | 77.7 |
| Zero-shot Whisper | 64.5 |

Robustness to Additive Noise

The noise robustness of models consistent with disclosed embodiments and 14 LibriSpeech-trained models was evaluated by measuring the WER when either white noise or pub noise from the Audio Degradation Toolbox was added to the audio. The pub noise represents a more natural noisy environment with ambient noise and indistinct chatter typical in a crowded restaurant or a pub. Among the 14 models, twelve are pre-trained and/or fine-tuned on LibriSpeech, and the other two are NVIDIA STT models trained on a mixture dataset similar to prior work like SpeechStew that includes LibriSpeech. The level of additive noise corresponding to a given signal-to-noise ratio (SNR) is calculated based on the signal power of individual examples.

Figure 7:
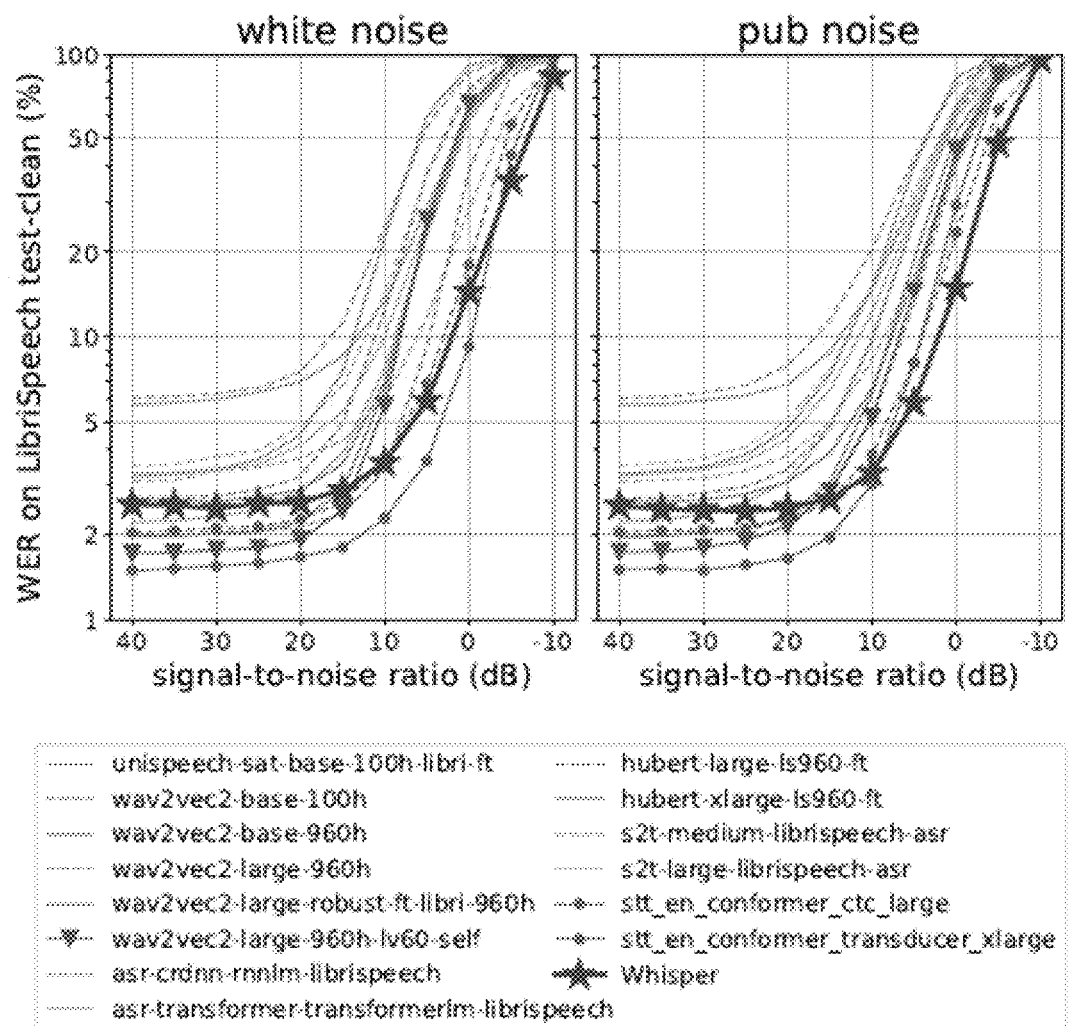
FIG. 7 depicts the degradation of automatic speech recognition performance degrades as additive noise increases.

FIG. 7 depicts the degradation of automatic speech recognition performance degrades as additive noise increases. There are many models that outperform our zero-shot performance under low noise (40 dB SNR), which is unsurprising given those models are trained primarily on LibriSpeech, but all models quickly degrade aa the additive noise increases, performing worse than the model consistent with disclosed embodiments under additive pub noise of SNR below 10 dB. These results showcase the robustness of models consistent with disclosed embodiments to noise, especially under more natural distribution shifts like the pub noise.

Long-Form Transcription

Models consistent with disclosed embodiments are trained on audio samples of predetermined duration. The models cannot consume longer audio inputs at once. This is not a problem with most academic datasets, which include short utterances, but presents challenges in real-world applications, which often require transcribing minutes- or hours-long audio.

Consistent with disclosed embodiments, buffered transcription of long audio can be performed by consecutively transcribing fixed duration segments of audio and shifting the window according to the timestamps predicted by the model. In some embodiments, beam search and temperature scheduling based on the repetitiveness and the log probability of the model predictions can be used to improve the reliability of the transcribed audio.

Long-form transcription performance was evaluated using seven datasets consisting of speech recordings of various lengths and recording conditions. These datasets were selected to cover a diverse data distribution. The datasets included a long-form adaptation of TED-LIUM3 concatenated so that each example is a full-length TED talk, a collection of jargon-laden segments taken from The Late Show with Stephen Colbert sets of videos/podcasts that has been used as ASR benchmarks in online blogs, recordings of earnings calls, and the full-length interviews from the Corpus of Regional African American Language (CORAAL). The performance of models consistent with disclosed embodiments was compared with open-source models and four commercial ASR services.

Figure 8:
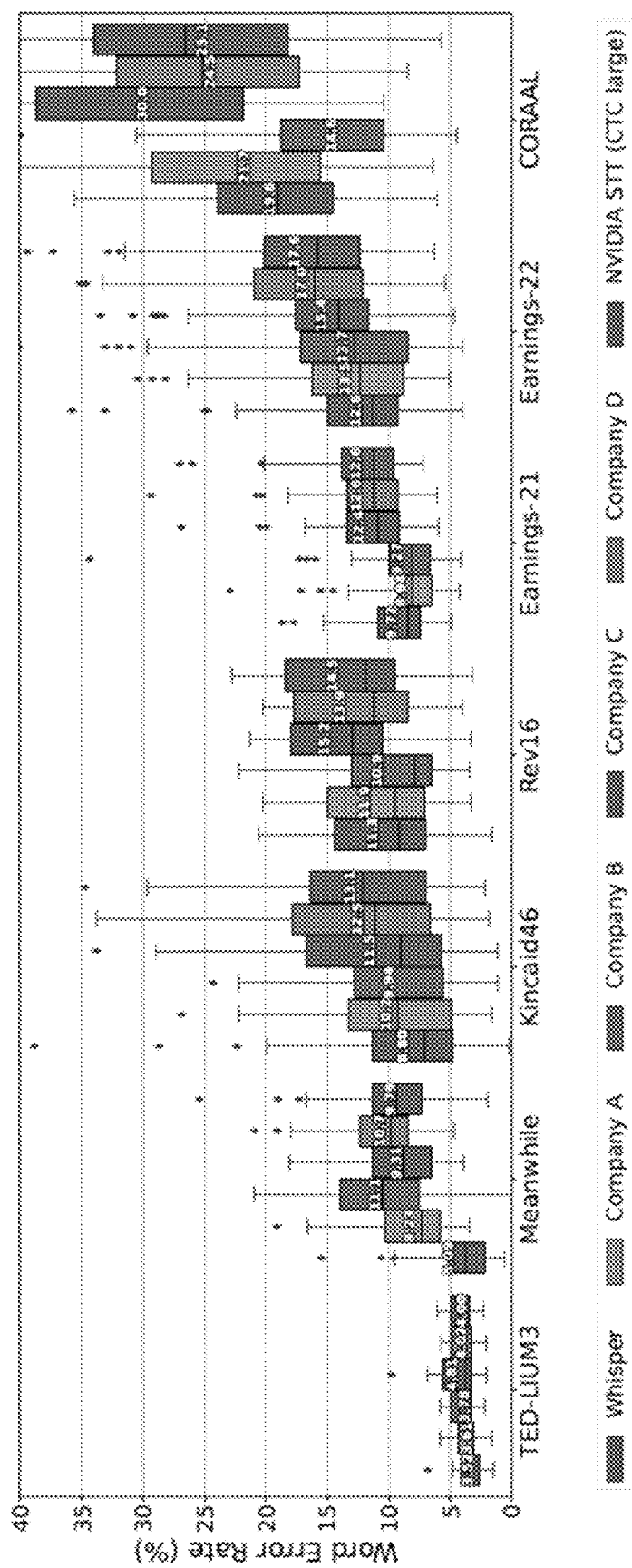
FIG. 8 depicts the distribution of word error rates from a model consistent with disclosed embodiments, the four commercial ASR services, and a best-performing one of three open-source models.

FIG. 8 depicts the distribution of word error rates from a model consistent with disclosed embodiments, the four commercial ASR services, and a best-performing one of the three open-source models (the NVIDIA STT Conformer-CTC Large model from the NeMo toolkit).

All commercial ASR services are queried using their default English transcription settings as of Sep. 1, 2022, and the buffered inference implementation in the FrameBatchASR class was used for the NVIDIA STT model to enable long-form transcription. As shown, the model consistent with disclosed embodiments performed better than the other models on most datasets. In particular, the model consistent with disclosed embodiments performed better than the other models on the Meanwhile dataset, which is heavy with uncommon words. Furthermore, the commercial ASR systems may have been trained on some of these publicly available datasets, and therefore the results may overestimate the robustness of these commercial systems.

Comparison with Human Performance

Because of ambiguous or indistinct speech as well as labeling errors, there may be different levels of irreducible error in each dataset, and with WER metrics from ASR systems alone it is difficult to make sense of how much room for improvement exists in each dataset. To quantify the difference between human performance and the performance of models consistent with disclosed embodiments, twenty-five recordings from the Kincaid46 dataset were selected. Five services were used to obtain transcripts produced by professional transcribers. One of these services provides computer-assisted transcription and the other four are entirely human-transcribed. The selected audio covers various recording conditions, such as meetings and scripted and unscripted broadcast, telephone and VoIP calls.

Figure 9:
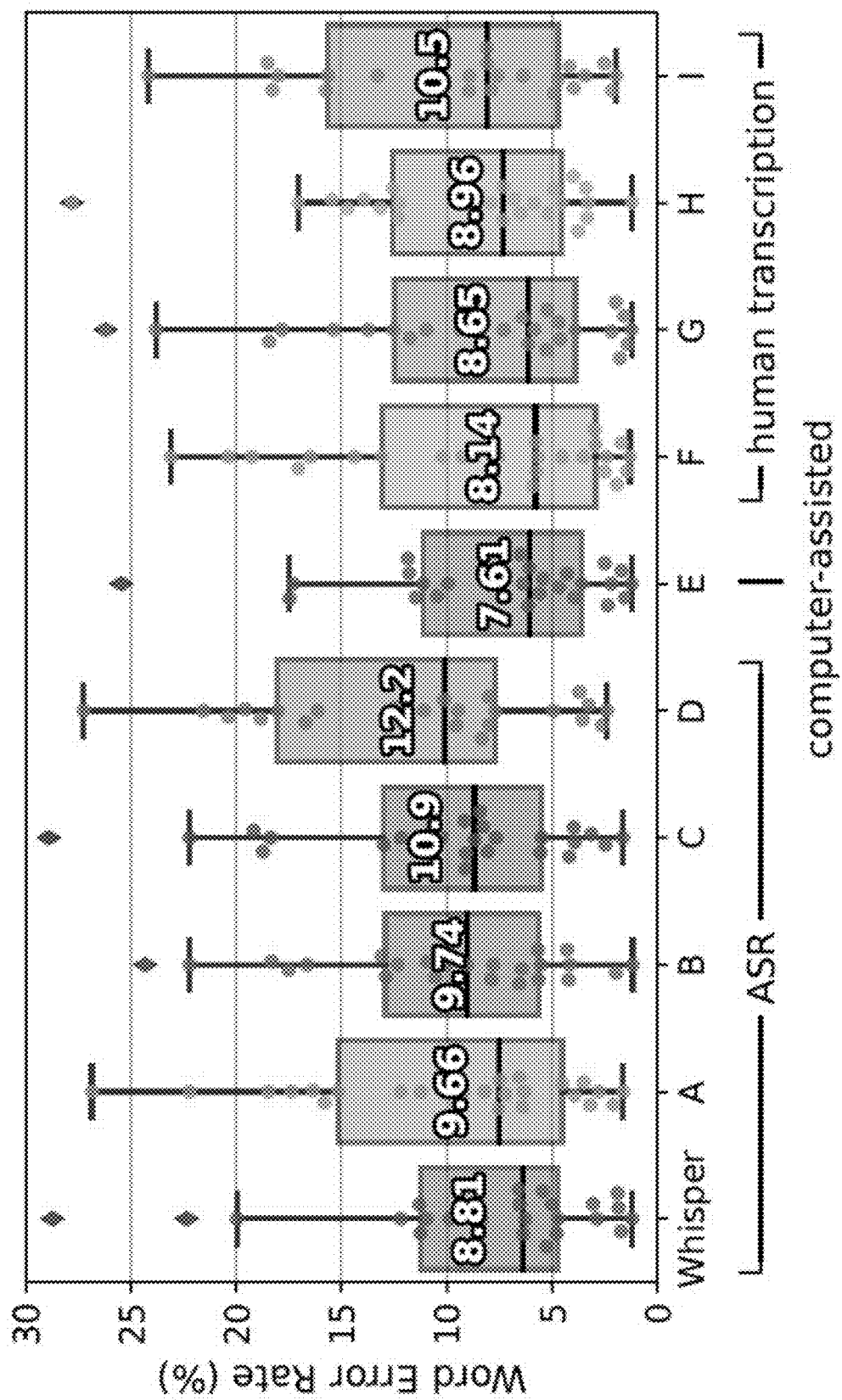
FIG. 9 depicts the distribution of per-example Word Error Rates and aggregate Word Error Rates across twenty-five recordings from the Kincaid46 dataset.

FIG. 9 depicts the distribution of per-example WERs and aggregate WER across the 25 recordings. The computer-assisted service has the lowest aggregate WER (1.15 percentage points better than the model consistent with disclosed embodiments). The pure human performance is only a fraction of a percentage point better than the model consistent with disclosed embodiments. These results indicate that the English ASR performance of the model consistent with disclosed embodiments is not perfect but similar to human-level accuracy.

Analysis and Ablations
Model Scaling

A large amount of the promise in weakly supervised training approaches is their potential to use datasets much larger than those in traditional supervised learning. However, this comes with the cost of using data that is possibly much noisier and lower quality than gold-standard supervision. A concern with this approach is that although it may look promising to begin with, the performance of models trained on this kind of data may saturate at the inherent quality level of the dataset, which could be far below human level. A related concern is that as capacity and compute spent training on the dataset increases, models may learn to exploit the idiosyncrasies of the dataset, and their ability to generalize robustly to out-of-distribution data could even degrade.

Figure 10A:
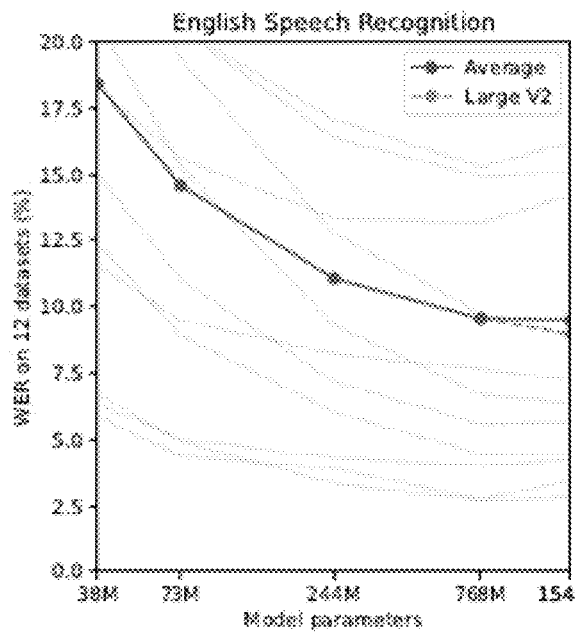
FIGS. 10A to 10D depicts the zero-shot performance of models consistent with disclosed embodiments across tasks and languages with increasing model size.
Figure 10B:
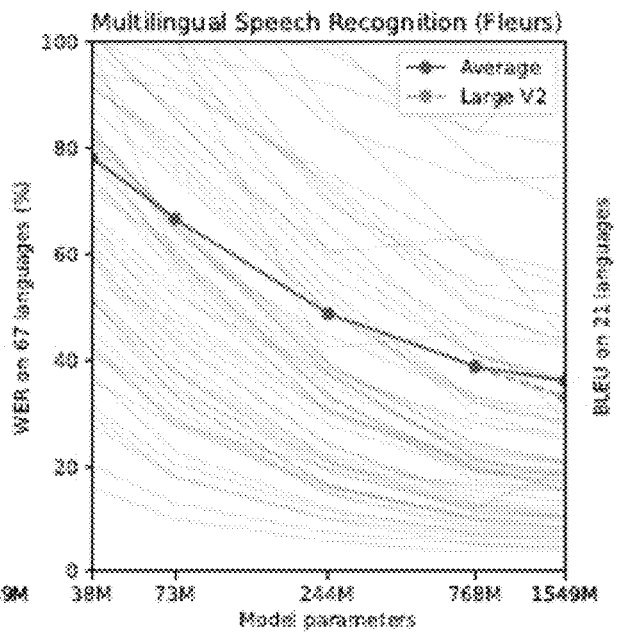
Figure 10C:
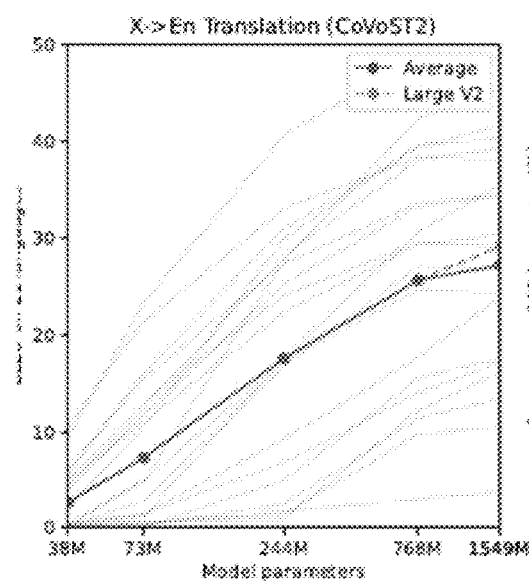
Figure 10D:
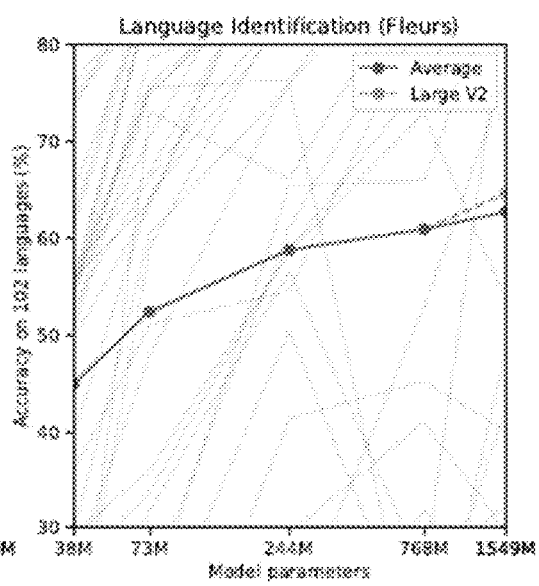

FIGS. 10A to 10D depicts the zero-shot performance of models consistent with disclosed embodiments across tasks and languages with increasing model size. Lightly shaded lines represent individual datasets or languages, showing that performance is more varied than the smooth trends in aggregate performance. The Large V2 model is distinguished with a dashed orange line since it includes several changes that are not present for the smaller models in this analysis. FIG. 10A depicts English speech recognition performance. FIG. 10B depicts multilingual speech recognition performance (using the Fleurs dataset). FIG. 10C depicts translation to English performance (using the CoVoST2 dataset). FIG. 10D depicts language identification performance (using the Fleurs dataset).

With the exception of English speech recognition, performance continues to increase with model size across multilingual speech recognition, speech translation, and language identification. The diminishing returns for English speech recognition could be due to saturation effects from approaching human-level performance.

Dataset Scaling

The effect on dataset size was investigated by training a series of medium sized models on subsampled versions of the dataset which are 0.5%, 1%, 2%, 4%, and 8% of the full dataset size and compared their performance with the same medium-sized model trained on the whole dataset. Early stopping based on the validation loss was used to select model checkpoints for each dataset size. Evaluation was performed on an exponential moving average estimate of the parameters using a smoothing rate of 0.9999 to help reduce the effect of the learning rate not fully decaying to zero for the models trained on the subsampled datasets due to early stopping.

TABLE 6

Performance improves with increasing dataset size. English speech recognition performance refers to an average over 12 datasets while the Multilingual speech recognition reports performance on the overlapping subset of languages in Fleurs and X → en translation reports average BLEU on CoVoST2. Dataset size reported in hours.

| Dataset size | English WER (↓) | Multilingual WER (↓) | X → En BLEU (↑) |
|---|---|---|---|
| 3405 | 30.5 | 92.4 | 0.2 |
| 6811 | 19.6 | 72.7 | 1.7 |
| 13621 | 14.4 | 56.6 | 7.9 |
| 27243 | 12.3 | 45.0 | 13.9 |
| 54486 | 10.9 | 36.4 | 19.2 |
| 681070 | 9.9 | 29.2 | 24.8 |

All increases in the dataset size result in improved performance on all tasks, although we see significant variability in improvement rates across tasks and sizes. Performance improves rapidly on English speech recognition from 3,000 to 13,000 hours and then slows down noticeably between 13,000 and 54,000 hours. Using the full dataset, which corresponds to another 12.5× increase in size results in only a further 1 point drop in WER. This mirrors the diminishing returns observed with model size scaling for English speech recognition and could similarly be explained by saturation effects when approaching human-level performance.

Improvements in WER follow a power-law trend for multilingual speech recognition till 54,000 hours and then deviate from this trend, improving only a further 7 points when increasing to the full dataset size. For X→en translation, performance is practically zero when training on 7,000 hours of audio or less, and then follows a roughly log-linear improvement trend till 54,000 hours before also showing diminishing returns when further scaling to the full dataset size.

The general trend across tasks of diminishing returns when moving from 54,000 hours to the full training dataset size of 680,000 hours could suggest that the current best models consistent with disclosed embodiments are undertrained relative to dataset size and performance could be further improved by a combination of longer training and larger models.

Multitask and Multilingual Transfer

A potential concern with jointly training a single model on many tasks and languages is the possibility of negative transfer where interference between the learning of several tasks results in performance worse than would be achieved by training on only a single task or language. To investigate whether this is occurring, the performance of models trained on just English speech recognition was compared with our standard multitask and multilingual training setup and measured their average performance across our suite of zeroshot English speech recognition benchmarks. An adjustment was made for the amount of FLOPs spent training on the task of English speech recognition, as only 65% of compute is spent on this task in a joint training setup. This adjustment prevents the analysis from being confounded by undertraining on the task when compared to a same-sized English-only model.

Figure 11:
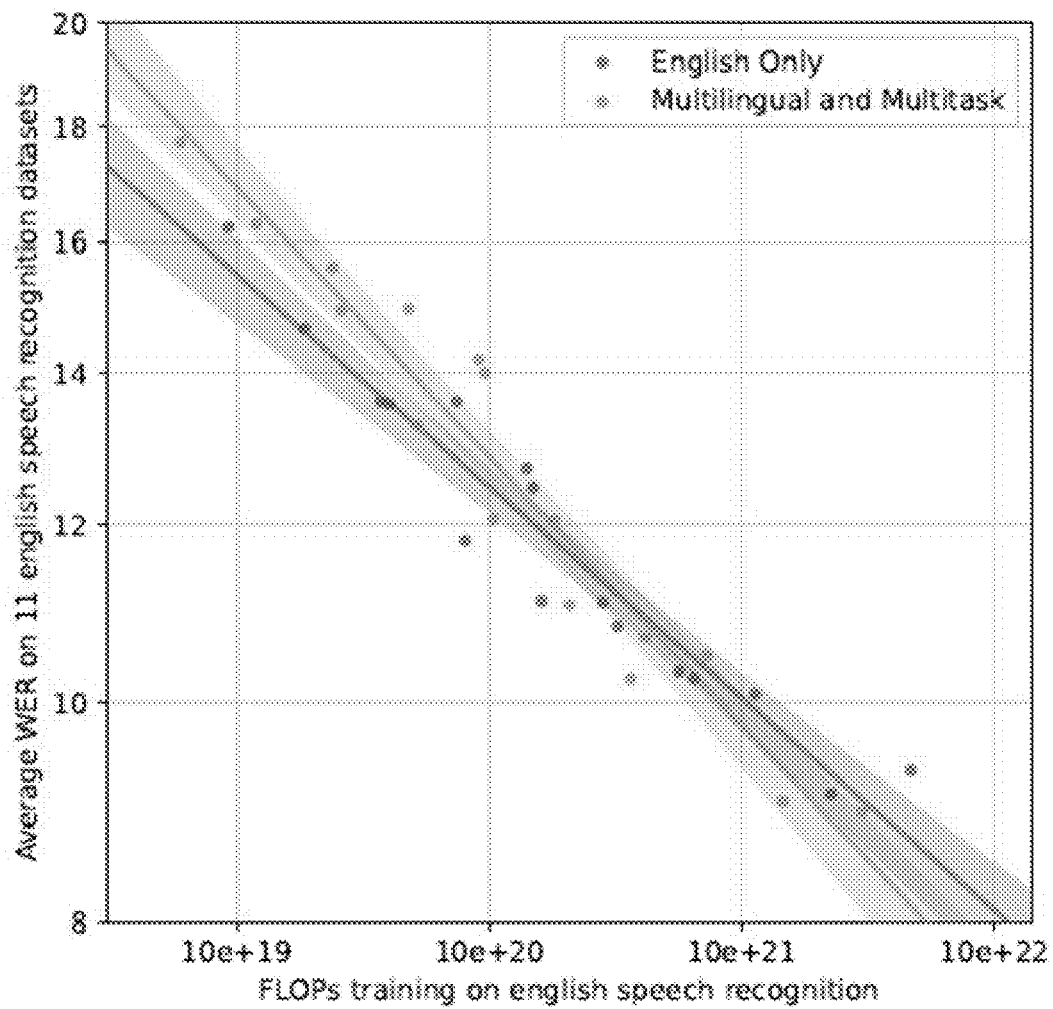
FIG. 11 depicts a relationship between joint training and performance for models of differing sizes.

FIG. 11 depicts a relationship between joint training and performance for models of differing sizes. For small models trained with moderate amounts of compute, there exists negative transfer between tasks and languages: joint models underperform English-only models trained for the same amount of compute. However, multitask and multilingual models scale better (95% bootstrap estimate confidence intervals are shown). For the largest experiments, the multitask and multilingual models outperform their English-only counterparts, demonstrating positive transfer from other tasks. For the largest experiments, joint models also slightly outperform English-only models, even when not adjusting for compute spent per task.

Text Normalization

The disclosed text normalization was developed jointly with the envisioned models to discount innocuous word errors. Therefore, there exists a risk that the normalizer is overfitted to fixing peculiarities of the envisioned models, rather than addressing general variation in transcription.

Figure 12:
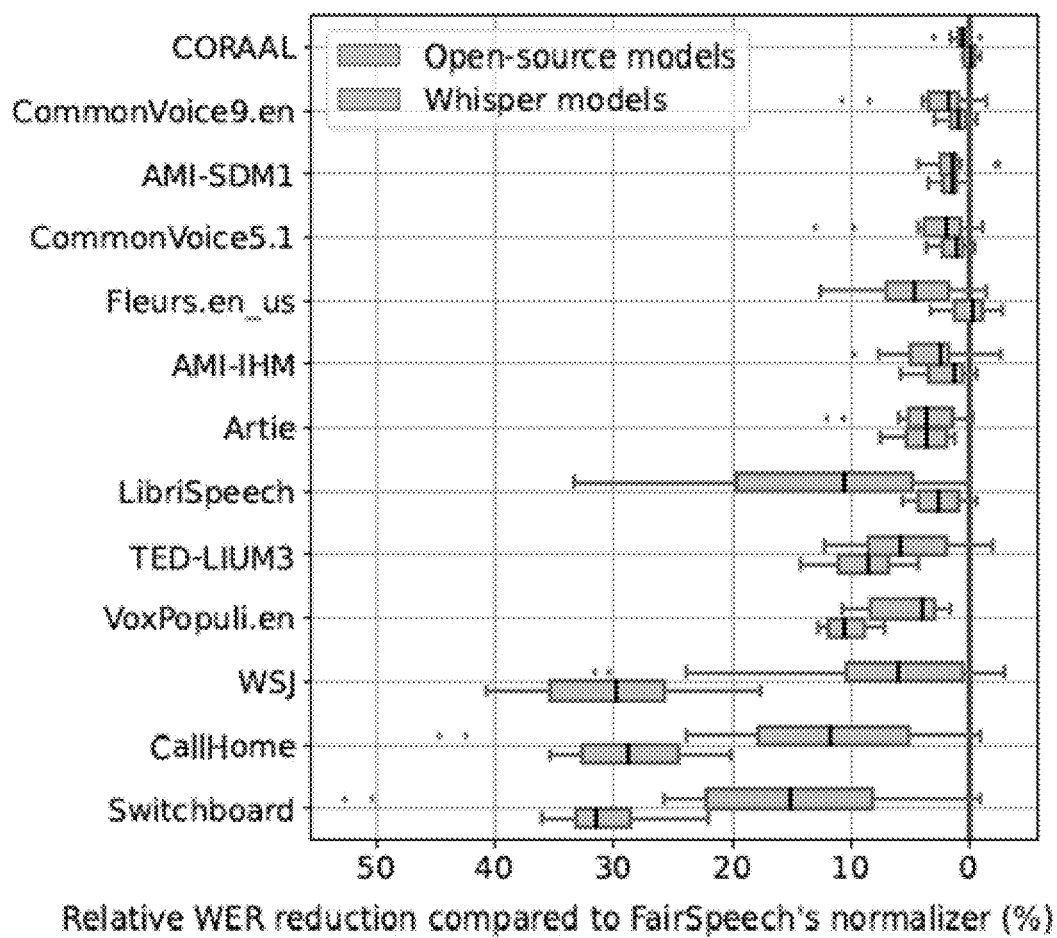
FIG. 12 depicts the effect of using different text normalizers on Word Error Rates achieved by models consistent with disclosed embodiments.

FIG. 12 depicts the effect of using the disclosed text normalizer versus an alternative text normalizer (an independently developed text normalizer from the FairSpeech project). On most datasets, the disclosed text normalizer has similar effect on reducing WERs between models consistent with disclosed embodiments and other open-source models, as compared to the alternative normalizer. For each dataset, the boxplot shows the distribution of relative WER reduction across different models in our eval suite, showing that using the disclosed text normalizer generally results in lower WERs than the alternative normalizer. On a few datasets the disclosed normalizer reduces WER significantly and more so for models consistent with disclosed embodiments, such as CallHome and Switchboard. The difference in reduction can be traced down to different formats used by the ground truth and how the two normalizers are penalizing them. For example, in CallHome and Switchboard, the disclosed text normalizer did not penalize differences in common English contractions such as "you're" versus "you are", and in WSJ, our normalizer standardized the written and spoken forms of numerical and monetary expressions, such as "sixty-eight million dollars" versus "$68 million.

Strategies for Reliable Long-Form Transcription

Transcribing long-form audio using models consistent with disclosed embodiments relies on accurate prediction of the timestamp tokens. These tokens are used to determine the amount to shift the model's fixed-duration audio context window. Inaccurate transcription in one window may therefore negatively impact transcription in the subsequent windows.

Consistent with disclosed embodiments, a set of heuristics can be used to improve long-form transcription. These heuristics can avoid certain failure cases of long-form transcription.

In some embodiments, beam search with multiple beams (e.g., a number of beams greater 2, such as 5 or another suitable number determined by performance consideration) can be used to reduce repetition looping (which can occur more frequently in greedy decoding). The beam search use log probability as the score function.

In some embodiments, the conversion of the decoder outputs to probabilities can be adjusted to improve long-form transcription. In some embodiments, the temperature parameter of the softmax function used to generate these probabilities can be adjusted based on one or more conditions. The beam search can be configured to initially use a softmax function with a low temperature (e.g., always selecting the tokens with the highest probability—equivalent to a temperature of zero) and increase the temperature (e.g., by 0.2 or another suitable value) up to a higher temperature (e.g., 1.0 or another suitable value) when one or more conditions are satisfied. A suitable condition can depend on the average log probability over the generated tokens (e.g., the average log probability is lower than some value, such as −1 or another suitable value). A suitable condition can depend on a gzip compression rate of the generated text (e.g., the generated text has a gzip compression rate higher than some value, such as 2.4 or another suitable value).

In some embodiments, the transcribed text from the preceding window can be provided as previous-text conditioning. In some embodiments, this transcribed text may only be applied when another condition is satisfied. For example, the transcribed text may only be applied when the temperature is below 0.5.

In some embodiments, the probability of the <|nospeech|> token alone is insufficient to identify an audio segment including no speech. However, combining a no-speech probability threshold and an average log-probability threshold can improve the reliability of voice activity detection in models consistent with disclosed embodiments. In some embodiments, the no-speech probability threshold can be 0.6 (or another suitable value). In some embodiments, the average log-probability threshold can be −1 (or another suitable value).

In some embodiments, the initial predicted timestamp token can be constrained to fall within a specified range, to prevent the model from ignoring the first few words in the input. In some embodiments, this range can be between 0.0 and 1.0 second (or more).

TABLE 7

Long-form transcription performance improves incrementally as additional decoding heuristics are employed. Improvements are not evenly achieved across the datasets. These heuristics serve as a workaround for the noisy predictions of the model.

|  | TED-LIUM3 | Meanwhile | Kincaid46 | Rev16 | Earnings-21 | Earnings-22 | CORAAL | Average |
| --- | --- | --- | --- | --- | --- | --- | --- | --- |
| Greedy decoding only | 3.95 | 5.16 | 9.69 | 11.7 | 10.7 | 14.0 | 22.0 | 11.0 |
| +Beam search | 4.16 | 5.71 | 9.42 | 11.5 | 10.2 | 13.4 | 20.0 | 10.6 |
| +Temperature fallback | 4.16 | 5.71 | 9.42 | 11.5 | 10.2 | 13.4 | 20.0 | 10.6 |
| +Voice activity detection | 3.56 | 4.61 | 9.45 | 11.4 | 10.1 | 13.2 | 19.4 | 10.2 |
| +Previous text conditioning | 3.42 | 6.16 | 8.72 | 11.0 | 9.63 | 13.3 | 18.1 | 10.0 |
| +Initial timestamp constraint | 3.51 | 5.26 | 8.41 | 11.5 | 9.73 | 12.6 | 19.1 | 10.0 |

Figure 14:
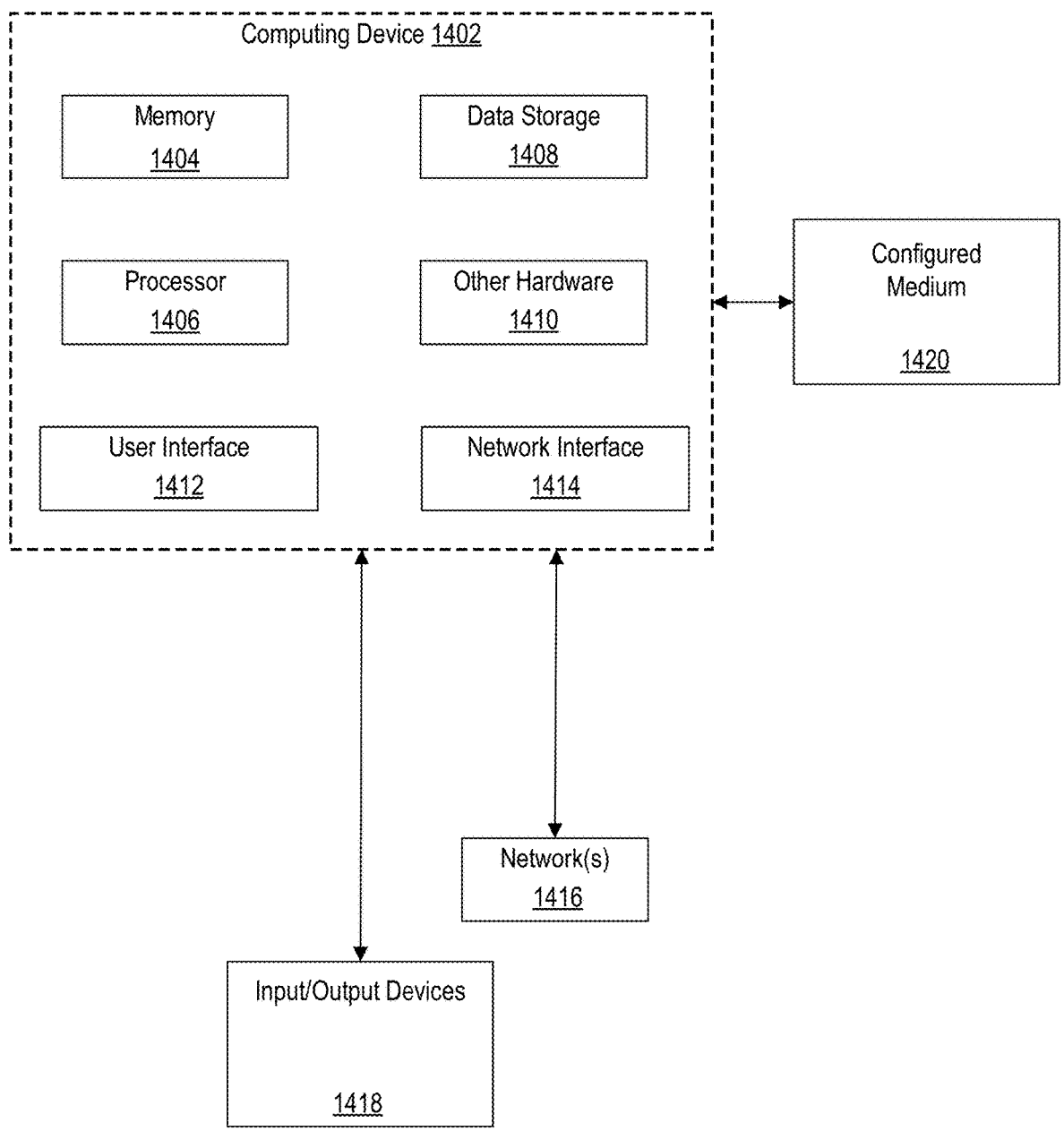
FIG. 14 is a block diagram illustrating an exemplary operating environment for implementing various aspects of this disclosure, according to some embodiments of the present disclosure.

An exemplary operating environment for implementing various aspects of this disclosure is illustrated in FIG. 14. As illustrated in FIG. 14, an exemplary operating environment 1400 may include a computing device 1402 (e.g., a general-purpose computing device) in the form of a computer. In some embodiments, computing device 1402 may be associated with a user. Components of the computing device 1402 may include, but are not limited to, various hardware components, such as one or more processors 1406, data storage 1408, a system memory 1404, other hardware 1410, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 14, an operating environment 1400 for an exemplary embodiment includes at least one computing device 1402. The computing device 1402 may be a uniprocessor or multiprocessor computing device. An operating environment 1400 may include one or more computing devices (e.g., multiple computing devices 1402) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 1402 may be configured for end-users, e.g., with applications, for administrators, as a server, as a distributed processing node, as a special-purpose processing device, or otherwise configured to train machine learning models and/or use machine learning models. In some embodiments, multiple computing devices 1402 (e.g., a network of GPUs) may be configured to train a machine learning model.

One or more users may interact with the computer system comprising one or more computing devices 1402 by using a display, keyboard, mouse, microphone, touchpad, camera, sensor (e.g., touch sensor) and other input/output devices 1418, via typed text, touch, voice, movement, computer vision, gestures, and/or other forms of input/output. An input/output device 1418 may be removable (e.g., a connectable mouse or keyboard) or may be an integral part of the computing device 1402 (e.g., a touchscreen, a built-in microphone). A user interface 1412 may support interaction between an embodiment and one or more users. A user interface 1412 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touchscreen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 1418 and computing device 1402, based on input received from at user interface 1412 and/or from network(s) 1416. As used throughout, "based on" may refer to being established or founded upon a use of (e.g., "using"), changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 1402 in other embodiments, depending on their detachability from the processor(s) 1406. Other computerized devices and/or systems not shown in FIG. 14 may interact in technological ways with computing device 1402 or with another system using one or more connections to a network 1416 via a network interface 1414, which may include network interface equipment, such as a physical network interface controller (NIC) or a virtual network interface (VIF).

Computing device 1402 includes at least one logical processor 1406. The at least one logical processor 1406 may include circuitry and transistors configured to execute instructions from memory (e.g., memory 1404). For example, the at least one logical processor 1406 may include one or more central processing units (CPUs), arithmetic logic units (ALUs), Floating Point Units (FPUs), and/or Graphics Processing Units (GPUs). The computing device 1402, like other suitable devices, also includes one or more computer-readable storage media, which may include, but are not limited to, memory 1404 and data storage 1408. In some embodiments, memory 1404 and data storage 1408 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 1420 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 1402, making its content accessible for interaction with and use by processor(s) 1406. The removable configured medium 1420 is an example of a computer-readable storage medium. Some other examples of computer-readable storage media include built-in random access memory (RAM), read-only memory (ROM), hard disks, and other memory storage devices which are not readily removable by users (e.g., memory 1404).

The configured medium 1420 may be configured with instructions (e.g., binary instructions) that are executable by a processor 1406; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 1420 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 1410 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 1406, memory 1404, data storage 1408, and screens/displays, an operating environment 1400 may also include other hardware 1410, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 1418 such as human user input/output devices (screen, keyboard, mouse, tablet, microphone, speaker, motion sensor, etc.) will be present in operable communication with one or more processors 1406 and memory.

In some embodiments, the system includes multiple computing devices 1402 connected by network(s) 1416. Networking interface equipment can provide access to network(s) 1416, using components (which may be part of a network interface 1414) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 1402 may operate in a networked or cloud-computing environment using logical connections to one or more remote devices (e.g., using network(s) 1416), such as a remote computer (e.g., another computing device 1402). The remote computer may include one or more of a personal computer, a server, a router, a network PC, or a peer device or other common network node, and may include any or all of the elements described above relative to the computer. The logical connections may include one or more LANs, WANS, and/or the Internet.

When used in a networked or cloud-computing environment, computing device 1402 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 1402 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 1408 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 1408 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 14, an operating environment 1400 may include at least one computing device 1402, the at least one computing device 1402 including at least one processor 1406, at least one memory 1404, at least one data storage 1408, and/or any other component discussed above with respect to FIG. 14.

Figure 15:
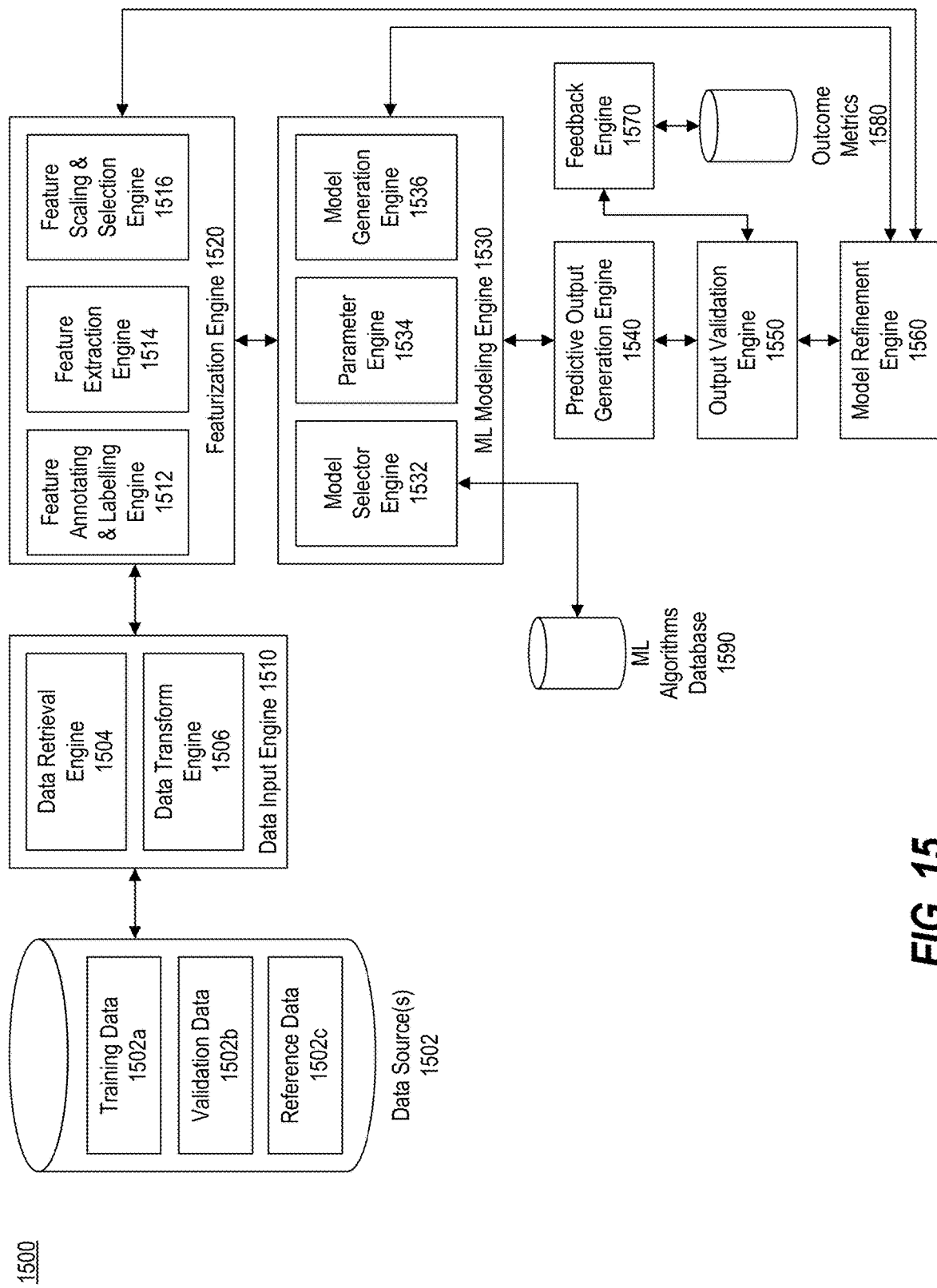
FIG. 15 is a block diagram illustrating an exemplary machine learning platform for implementing various aspects of this disclosure, according to some embodiments of the present disclosure.

FIG. 15 is a block diagram illustrating an exemplary machine learning platform for implementing various aspects of this disclosure, according to some embodiments of the present disclosure.

System 1500 may include data input engine 1510 that can further include data retrieval engine 1504 and data transform engine 1506. Data retrieval engine 1504 may be configured to access, access, interpret, request, or receive data, which may be adjusted, reformatted, or changed (e.g., to be interpretable by other engine, such as data input engine 1510). For example, data retrieval engine 1504 may request data from a remote source using an API. Data input engine 1510 may be configured to access, interpret, request, format, re-format, or receive input data from data source(s) 1502. For example, data input engine 1510 may be configured to use data transform engine 1506 to execute a re-configuration or other change to data, such as a data dimension reduction. Data source(s) 1502 may exist at one or more memories 1404 and/or data storages 1408. In some embodiments, data source(s) 1502 may be associated with a single entity (e.g., organization) or with multiple entities. Data source(s) 1502 may include one or more of training data 1502*a* (e.g., input data to feed a machine learning model as part of one or more training processes), validation data 1502*b* (e.g., data against which at least one processor may compare model output with, such as to determine model output quality), and/or reference data 1502*c*. In some embodiments, data input engine 1510 can be implemented using at least one computing device (e.g., computing device 1402). For example, data from data sources 1502 can be obtained through one or more I/O devices and/or network interfaces. Further, the data may be stored (e.g., during execution of one or more operations) in a suitable storage or system memory. Data input engine 1510 may also be configured to interact with data storage 1408, which may be implemented on a computing device that stores data in storage or system memory. System 1500 may include featurization engine 1520. Featurization engine 1520 may include feature annotating & labeling engine 1512 (e.g., configured to annotate or label features from a model or data, which may be extracted by feature extraction engine 1514), feature extraction engine 1514 (e.g., configured to extract one or more features from a model or data), and/or feature scaling and selection engine 1516. Feature scaling and selection engine 1516 may be configured to determine, select, limit, constrain, concatenate, or define features (e.g., AI features) for use with AI models. System 1500 may also include machine learning (ML) modeling engine 1530, which may be configured to execute one or more operations on a machine learning model (e.g., model training, model re-configuration, model validation, model testing), such as those described in the processes described herein. For example, ML modeling engine 1530 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 1502*a*) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 1530 may include model selector engine 1532 (e.g., configured to select a model from among a plurality of models, such as based on input data), parameter selector engine 1534 (e.g., configured to add, remove, and/or change one or more parameters of a model), and/or model generation engine 1536 (e.g., configured to generate one or more machine learning models, such as according to model input data, model output data, comparison data, and/or validation data). Similar to data input engine 1510, featurization engine 1520 can be implemented on a computing device. In some embodiments, model selector engine 1532 may be configured to receive input and/or transmit output to ML algorithms database 1590 (e.g., a data storage 1408). Similarly, featurization engine 1520 can utilize storage or system memory for storing data and can utilize one or more I/O devices or network interfaces for transmitting or receiving data. ML algorithms database 1590 (or other data storage 1408) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 1500 can further include predictive output generation engine 1540, output validation engine 1550 (e.g., configured to apply validation data to machine learning model output), feedback engine 1570 (e.g., configured to apply feedback from a user and/or machine to a model), and model refinement engine 1560 (e.g., configured to update or re-configure a model). In some embodiments, feedback engine 1570 may receive input and/or transmit output (e.g., output from a trained, partially trained, or untrained model) to outcome metrics database 1580. Outcome metrics database 1580 may be configured to store output from one or more models and may also be configured to associate output with one or more models. In some embodiments, outcome metrics database 1580, or other device (e.g., model refinement engine 1560 or feedback engine 1570) may be configured to correlate output, detect trends in output data, and/or infer a change to input or model parameters to cause a particular model output or type of model output. In some embodiments, model refinement engine 1560 may receive output from predictive output generation engine 1540 or output validation engine 1550. In some embodiments, model refinement engine 1560 may transmit the received output to featurization engine 1520 or ML modelling engine 1530 in one or more iterative cycles.

Any or each engine of system 1500 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 1500 may be split across multiple computing devices to allow for distributed processing of the data, which may improve output speed and reduce computational load on individual devices. In some embodiments, system 1500 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 1500 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

Appendix A: Evaluation Datasets

Short-Form English-Only Datasets:
  LibriSpeech: test-clean and test-other splits from the LibriSpeech ASR corpus.
  TED-LIUM 3: test split of TED-LIUM Release 3, using the segmented manual transcripts included in the release.
  Common Voice 5.1: the English subset of Common Voice Corpus 5.1 from the official website.
  Artie bias corpus: a subset of the Common Voice dataset.
  CallHome and Switchboard: two corpora from LDC2002S09 and LDC2002T43.
  WSJ: We used LDC93S6B and LDC94S13B and followed the s5 recipe to preprocess the dataset.
  CORAAL: the 231 interviews from CORAAL and used the preprocessing script from the FairSpeech project.
  ChiME-6: stage 0 of the s5 track1 recipe was used to create the ChiME-6 dataset from the ChiME-5 dataset by fixing synchronization. The binaural recordings and the corresponding transcripts were then used.
  AMI-IHM and AMI-SDM1: The AMI Corpus was pre-processed by following the stage 0 ad 2 of the s5b recipe Long-Form English-Only Datasets:
  TED-LIUM 3: Eleven full-length TED talks from the test split of TED-LIUM Release 3, slicing the source audio files between the beginning of the first labeled segment and the end of the last labeled segment of each talk. The concatenated text was used as the label.
  Meanwhile: Sixty four segments from The Late Show with Stephen Colbert. The YouTube video ID and the corresponding start and end timestamps are available as part of the code release. The labels are collected from the closed-caption data for each video and corrected with manual inspection.
  Rev16: A subset of 16 files from the 30 podcast episodes in Rev.AI's Podcast Transcription Benchmark, after finding that there are multiple cases where a significant portion of the audio and the labels did not match, mostly on the parts introducing the sponsors. The selected 16 episodes that do not have this error have the file numbers: 3 4 9 10 11 14 17 18 20 21 23 24 26 27 29 32.
  Kincaid46: This dataset consists of 46 audio files and the corresponding transcripts compiled in the blog article-!Which automatic transcription service is the most accurate-2018. The 46 audio files and reference transcripts from the Airtable widget in the article were used. A subset of 25 examples from this data were used for the human transcription benchmark in the paper. The "Ref ID"s of these examples are: 2 4 5 8 9 10 12 13 14 16 19 21 23 25 26 28 29 30 33 35 36 37 42 43 45.
  Earnings-21 and Earnings-22: The files available in the speech-datasets repository, as of the 202206 version, were used.
  CORAAL: We used the 231 full-length interviews and transcripts.

Multilingual Datasets
  Multilingual LibriSpeech: the test splits from each language in the Multilingual LibriSpeech (MLS) corpus were used.

Fleurs: Audio files and transcripts were collected using the implementation available as HuggingFace datasets. To use as a translation dataset, the numerical utterance IDs were matched to find the corresponding transcript in English.

VoxPopuli: The get_asr_data.py script from the official repository was used to collect the ASR data in 16 languages, including English.

Common Voice 9: The Common Voice Corpus 9 was obtained from the official website.

CoVOST 2: the X into English data was collected using the official repository.

Appendix B: Compared Models

For comparison, the following models from Hugging-Face, downloaded as of September 2022 using version 4.21.0 of the transformers library, were used:
facebook/wav2vec2-large-960h-lv60-self
facebook/wav2vec2-large-robust-ft-libri-960h
facebook/wav2vec2-base-100h
facebook/wav2vec2-base-960h
facebook/wav2vec2-large-960h
facebook/hubert-large-ls960-ft
facebook/hubert-xlarge-ls960-ft
facebook/s2t-medium-librispeech-asr
facebook/s2t-large-librispeech-asr
microsoft/unispeech-sat-base-100h-libri-ft
nvidia/stt_en_conformer_ctc_large
nvidia/stt_en_conformer_transducer_xlarge
speechbrain/asr-crdnn-rnnlm-librispeech
speechbrain/asr-transformer-transformerlm-librispeech The retrieved models are entirely or partly trained on LibriSpeech.

Appendix C: Text Standardization

Models consistent with disclosed embodiments may output any UTF-8 string rather than a restricted set of graphemes. Accordingly, text standardization may require more intricate and comprehensive rules than those defined on e.g., ASCII characters. Standardization of transcripts (e.g., for dataset generation of zero-shot evaluation) can include one or more of the following tasks to normalize English transcripts:

Remove any phrases between matching brackets ([,]).
Remove any phrases between matching parentheses ((,)).
Remove any of the following words: hmm, mm, mhm, mmm, uh, um.
Remove whitespace characters that comes before an apostrophe '.
Convert standard or informal contracted forms of English into the original form.
Remove commas (,) between digits.
Remove periods (.) not followed by numbers.
Remove symbols as well as diacritics from the text, where symbols are the characters with the Unicode category starting with M, S, or P, except period, percent, and currency symbols that may be detected in the next step.
Detect any numeric expressions of numbers and currencies and replace with a form using Arabic numbers, e.g., "Ten thousand dollars"→"$10000".
Convert British spellings into American spellings.
Remove remaining symbols that are not part of any numeric expressions.
Replace any successive whitespace characters with a space.

One or more of these tasks can be performed to increase the likelihood that penalties are assessed during training for word errors arising from mis-transcription of a word, as opposed to formatting or punctuation differences. As may be appreciated, this list of tasks is not intended to be exhaustive: other tasks or additional tasks can be performed.

Standardization of transcripts (e.g., for dataset generation of zero-shot evaluation) can include one or more of the following tasks to normalize non-English transcripts:

Remove any phrases between matching brackets ([,]).
Remove any phrases between matching parentheses ((,)).
Replace any markers, symbols, and punctuation characters with a space, i.e., when the Unicode category of each character in the NFKC-normalized string starts with M, S, or P.
Make the text lowercase.
Replace any successive whitespace characters with a space.

As with the normalization of English texts, one or more of these tasks can be performed to increase the likelihood that penalties are assessed during training for word errors arising from mis-transcription of a word, as opposed to formatting or punctuation differences. As may be appreciated, this list of tasks is not intended to be exhaustive: other tasks or additional tasks can be performed.

Additionally, consistent with disclosed embodiments, a space can be added between every letter for the languages that do not use spaces to separate words, namely Chinese, Japanese, Thai, Lao, and Burmese, effectively causing the training to depend on the character error rate.

Appendix D: Raw Performance Tables

English Transcription
Greedy Decoding

TABLE 8

English transcription WER (%) with greedy decoding

| Model | LibriSpeech.test-clean | LibriSpeech.test-other | TED-LRIM3 | WSJ | CallHome | Switchbound | CommonVoice5.1 |
|---|---|---|---|---|---|---|---|
| Whisper tiny.en | 5.6 | 14.6 | 6.0 | 5.0 | 24.1 | 17.8 | 26.3 |
| Whisper tiny | 7.6 | 16.9 | 7.0 | 6.7 | 30.0 | 22.8 | 29.6 |
| Whisper base.en | 4.2 | 10.2 | 4.9 | 4.6 | 20.9 | 15.2 | 19.0 |
| Whisper base | 5.0 | 12.4 | 5.5 | 5.1 | 23.0 | 16.8 | 21.6 |
| Whisper small.en | 3.1 | 7.4 | 4.0 | 3.3 | 18.2 | 15.7 | 13.1 |
| Whisper small | 3.4 | 7.6 | 4.3 | 4.0 | 17.5 | 14.5 | 13.5 |
| Whisper medium.en | 3.1 | 6.3 | 4.1 | 3.3 | 16.2 | 14.1 | 10.6 |
| Whisper medium | 2.9 | 5.9 | 3.8 | 2.9 | 16.4 | 14.0 | 10.3 |
| Whisper large | 2.7 | 5.6 | 4.0 | 3.1 | 15.8 | 13.1 | 9.5 |
| Whisper Large-v2 | 2.7 | 5.2 | 4.0 | 3.9 | 17.6 | 13.8 | 9.0 |

TABLE 8-continued

English transcription WER (%) with greedy decoding

| | | | | | | | |
|---|---|---|---|---|---|---|---|
| wav2vec2-base-100h | 6.0 | 13.4 | 17.8 | 13.9 | 46.9 | 40.2 | 47.4 |
| wav2vec2-base-960h | 3.3 | 8.5 | 12.8 | 8.9 | 40.6 | 32.9 | 36.4 |
| wav2vec2-large-960h-lv60-self | 1.8 | 3.8 | 7.4 | 4.4 | 29.1 | 22.2 | 19.9 |
| wav2vec2-large-960h | 2.7 | 6.2 | 10.5 | 7.7 | 34.8 | 28.3 | 29.9 |
| wav2vec2-large-robust-ft-libri-960h | 2.6 | 5.3 | 9.2 | 6.1 | 23.4 | 19.8 | 20.3 |
| asr-crdnn-rnnlm-librispeech | 3.0 | 9.7 | 17.7 | 10.7 | 59.7 | 56.1 | 43.7 |
| asr-transformer-transformerlm-librispeech | 2.1 | 5.4 | 11.9 | 7.4 | 38.9 | 33.0 | 30.6 |
| hubert-large-ls960-ft | 2.0 | 4.1 | 8.4 | 5.4 | 29.6 | 22.8 | 20.8 |
| hubert-xlarge-ls960-ft | 1.9 | 3.5 | 8.3 | 5.4 | 29.3 | 22.2 | 19.8 |
| s2t-large-librispeech-asr | 3.3 | 8.1 | 14.9 | 9.4 | 54.5 | 40.3 | 38.1 |
| s2t-medium-librispeech-asr | 3.6 | 8.2 | 15.7 | 9.7 | 58.1 | 42.4 | 39.3 |
| stt_en_conformer_ctc_large | 2.1 | 4.2 | 4.4 | 2.1 | 11.3 | 7.4 | 7.4 |
| stt_en_conformer_transducer_xlarge | 1.5 | 2.8 | 4.3 | 1.2 | 12.0 | 40.0 | 4.3 |
| unispeech-sat-base-100h-libri-ft | 5.7 | 13.8 | 17.7 | 13.6 | 46.5 | 40.2 | 45.3 |

| Model | Artie | CORAAL | CHiME6 | AMI-IHM | AMI-SOMI | VoxPopuli.en | Fleurs.en_us |
|---|---|---|---|---|---|---|---|
| Whisper tiny.en | 20.0 | 23.9 | 41.3 | 23.7 | 50.3 | 11.7 | 11.6 |
| Whisper tiny | 23.9 | 31.0 | 49.6 | 27.6 | 58.1 | 12.7 | 13.7 |
| Whisper base.en | 13.4 | 22.6 | 36.4 | 20.5 | 46.7 | 10.0 | 7.6 |
| Whisper base | 16.9 | 26.0 | 40.2 | 22.0 | 49.9 | 10.0 | 10.1 |
| Whisper small.en | 9.7 | 20.2 | 27.6 | 17.5 | 38.0 | 8.1 | 6.0 |
| Whisper small | 10.3 | 18.1 | 29.3 | 19.0 | 39.6 | 8.3 | 6.6 |
| Whisper medium.en | 7.6 | 17.5 | 25.3 | 16.4 | 37.2 | 7.4 | 5.0 |
| Whisper medium | 7.2 | 16.6 | 26.4 | 16.6 | 36.0 | 7.4 | 5.4 |
| Whisper large | 6.7 | 19.4 | 25.6 | 16.4 | 36.9 | 7.3 | 4.6 |
| Whisper Large-v2 | 6.2 | 16.2 | 25.5 | 16.9 | 36.4 | 7.3 | 4.4 |
| wav2vec2-base-100h | 40.8 | 47.0 | 79.9 | 48.1 | 81.2 | 28.9 | 23.1 |
| wav2vec2-base-960h | 30.9 | 39.9 | 68.5 | 40.2 | 71.9 | 21.4 | 17.4 |
| wav2vec2-large-960h-lv60-self | 15.8 | 29.2 | 56.3 | 30.8 | 57.0 | 13.0 | 10.2 |
| wav2vec2-large-960h | 24.5 | 35.6 | 65.8 | 37.0 | 67.6 | 17.9 | 14.6 |
| wav2vec2-large-robust-ft-libri-960h | 16.2 | 29.4 | 58.1 | 31.7 | 61.6 | 15.1 | 11.8 |
| asr-crdnn-rnnlm-librispeech | 33.3 | 83.8 | 81.0 | 57.2 | 85.8 | 30.6 | 32.4 |
| asr-transformer-transformerlm-librispeech | 23.5 | 44.9 | 79.5 | 44.5 | 75.4 | 17.8 | 17.0 |
| hubert-large-ls960-ft | 16.0 | 32.0 | 60.0 | 33.7 | 59.1 | 14.4 | 10.9 |
| hubert-xlarge-ls960-ft | 14.8 | 31.5 | 58.5 | 33.3 | 58.9 | 14.2 | 10.5 |
| s2t-large-librispeech-asr | 30.7 | 50.2 | 79.2 | 53.4 | 79.5 | 21.6 | 18.0 |
| s2t-medium-librispeech-asr | 31.3 | 52.6 | 79.8 | 60.3 | 85.3 | 22.9 | 19.7 |
| stt_en_conformer_ctc_large | 38.6 | 13.5 | 30.5 | 15.9 | 39.9 | 29.8 | 8.2 |
| stt_en_conformer_transducer_xlarge | 40.8 | 19.9 | 36.8 | 20.5 | 48.6 | 28.9 | 6.3 |
| unispeech-sat-base-100h-libri-ft | 30.9 | 44.7 | 74.8 | 47.8 | 77.7 | 21.4 | 22.4 |

Beam Search with Temperature Fallback

TABLE 9

English transcription WER (%) with beam search and temperature fallback

| Model | LibriSpeech.test-clean | LibriSpeech.test-other | TED-LIUM3 | WSJ | CallHome | Switchboard | CommonVoice5.1 |
|---|---|---|---|---|---|---|---|
| Whisper tiny.en | 5.4 | 12.8 | 5.4 | 4.6 | 21.4 | 16.0 | 23.5 |
| Whisper tiny | 6.7 | 15.0 | 6.3 | 5.9 | 24.8 | 18.3 | 26.1 |
| Whisper base.en | 4.1 | 9.6 | 4.6 | 4.0 | 18.3 | 14.2 | 17.5 |
| Whisper base | 4.9 | 11.0 | 5.0 | 4.4 | 20.5 | 15.6 | 19.4 |
| Whisper small.en | 3.2 | 6.7 | 4.3 | 3.0 | 17.2 | 13.4 | 12.6 |
| Whisper small | 3.3 | 7.2 | 4.3 | 3.9 | 17.1 | 13.3 | 12.8 |
| Whisper medium.en | 3.0 | 5.7 | 4.3 | 2.8 | 14.7 | 12.4 | 10.3 |
| Whisper medium | 2.7 | 5.6 | 4.0 | 2.7 | 15.3 | 13.2 | 9.7 |
| Whisper large | 2.8 | 5.7 | 4.3 | 3.5 | 16.2 | 14.2 | 8.9 |
| Whisper large-v2 | 2.5 | 4.9 | 3.7 | 2.6 | 16.4 | 13.6 | 8.2 |

TABLE 9-continued

English transcription WER (%) with beam search and temperature fallback

| Model | Artie | CORAAL | CHiME6 | AMI-IHM | AMI-SDM1 | VoxPopuli.en | Fleurs.en_us |
|---|---|---|---|---|---|---|---|
| Whisper tiny.en | 18.4 | 21.4 | 42.0 | 22.7 | 54.3 | 10.9 | 10.0 |
| Whisper tiny | 20.8 | 25.1 | 48.0 | 25.6 | 57.3 | 11.6 | 12.4 |
| Whisper base.en | 13.2 | 18.5 | 35.2 | 21.1 | 49.0 | 9.3 | 7.1 |
| Whisper base | 15.3 | 20.5 | 40.0 | 21.5 | 50.0 | 9.5 | 8.9 |
| Whisper small.en | 9.2 | 17.5 | 29.5 | 17.9 | 42.5 | 8.1 | 5.3 |
| Whisper small | 9.3 | 16.4 | 30.9 | 19.2 | 43.5 | 8.2 | 6.1 |
| Whisper medium.en | 7.4 | 15.3 | 27.0 | 17.1 | 39.4 | 7.8 | 4.5 |
| Whisper medium | 6.7 | 14.9 | 27.6 | 17.6 | 43.0 | 7.6 | 4.4 |
| Whisper large | 6.4 | 15.1 | 25.2 | 17.6 | 37.1 | 7.2 | 4.5 |
| Whisper large-v2 | 5.7 | 14.2 | 24.9 | 17.4 | 39.9 | 7.0 | 4.2 |

Multilingual Transcription
Multilingual Librispeech

TABLE 10

WER (%) on MLS

| Model | Dutch | English | French | German | Italian | Polish | Portuguese | Spanish |
|---|---|---|---|---|---|---|---|---|
| Whisper tiny | 39.4 | 15.7 | 36.8 | 24.9 | 41.7 | 34.2 | 31.3 | 19.2 |
| Whisper base | 28.4 | 11.7 | 26.6 | 17.7 | 31.1 | 22.8 | 21.9 | 12.8 |
| Whisper small | 17.2 | 8.3 | 16.2 | 10.5 | 21.4 | 11.2 | 13.0 | 7.8 |
| Whisper medium | 11.7 | 6.8 | 8.9 | 7.4 | 16.0 | 6.5 | 9.0 | 5.3 |
| Whisper large | 10.2 | 6.3 | 8.9 | 6.6 | 14.3 | 6.6 | 9.2 | 5.4 |
| Whisper large-v2 | 9.3 | 6.2 | 7.3 | 5.5 | 13.8 | 5.0 | 6.8 | 4.2 |

Common Voice 9

TABLE 11

WER (%) on Common Voice9

| Model | Arabic | Bulgarian | Bengali | Catalan | Czech | Welsh | Danish | German |
|---|---|---|---|---|---|---|---|---|
| Whisper tiny | 90.9 | 79.3 | 104.1 | 79.7 | 21.4 | 101.8 | 77.2 | 34.5 |
| Whisper base | 84.4 | 68.1 | 103.7 | 63.1 | 24.8 | 93.8 | 57.5 | 24.5 |
| Whisper small | 66.4 | 44.8 | 118.6 | 34.1 | 18.3 | 65.4 | 32.1 | 13.0 |
| Whisper medium | 60.3 | 26.7 | 124.7 | 18.8 | 15.3 | 43.6 | 19.3 | 8.5 |
| Whisper large | 56.0 | 24.1 | 106.0 | 17.1 | 16.2 | 40.3 | 18.3 | 7.7 |
| Whisper large-v2 | 53.8 | 19.9 | 103.4 | 13.5 | 16.4 | 34.2 | 14.4 | 6.4 |

| Model | Greek | English | Spanish | Estonian | Persian | Finish | French | Hindi |
|---|---|---|---|---|---|---|---|---|
| Whisper tiny | 61.9 | 28.8 | 30.3 | 102.1 | 120.1 | 68.5 | 49.7 | 108.3 |
| Whisper base | 51.5 | 21.9 | 19.6 | 88.1 | 99.0 | 52.9 | 37.3 | 106.5 |
| Whisper small | 31.7 | 14.5 | 10.3 | 67.2 | 71.9 | 30.5 | 22.7 | 43.6 |
| Whisper medium | 20.0 | 11.2 | 6.9 | 45.6 | 49.9 | 18.8 | 16.0 | 31.5 |
| Whisper large | 18.3 | 10.1 | 6.4 | 41.4 | 44.8 | 17.0 | 14.7 | 25.0 |
| Whisper large-v2 | 16.0 | 9.4 | 5.6 | 35.1 | 39.4 | 14.4 | 13.9 | 21.9 |

| Model | Hungarian | Indonesian | Italian | Japanese | Lithuanian | Lithuanian | Latvian | Malayalam |
|---|---|---|---|---|---|---|---|---|
| Whisper tiny | 87.0 | 49.6 | 44.5 | 36.1 | 103.5 | 103.5 | 87.8 | 102.7 |
| Whisper base | 71.9 | 36.1 | 30.5 | 24.2 | 91.3 | 91.3 | 78.0 | 122.9 |
| Whisper small | 44.4 | 18.4 | 16.0 | 14.0 | 72.8 | 72.8 | 54.6 | 104.8 |
| Whisper medium | 26.9 | 11.6 | 9.4 | 10.5 | 49.4 | 49.4 | 37.2 | 137.8 |
| Whisper large | 23.5 | 10.6 | 8.1 | 9.4 | 43.9 | 43.9 | 34.8 | 107.1 |
| Whisper large-v2 | 19.7 | 8.5 | 7.1 | 9.1 | 35.2 | 35.2 | 25.5 | 103.2 |

| Model | Mongolian | Dutch | Polish | Portuguese | Romanian | Russian | Slovak | Slovenian |
|---|---|---|---|---|---|---|---|---|
| Whisper tiny | 123.0 | 43.6 | 45.3 | 35.2 | 68.2 | 40.6 | 104.0 | 82.0 |
| Whisper base | 137.0 | 29.5 | 32.8 | 23.7 | 55.9 | 28.8 | 87.2 | 70.3 |
| Whisper small | 225.8 | 14.2 | 16.9 | 12.5 | 33.2 | 15.0 | 60.4 | 45.5 |
| Whisper medium | 113.4 | 8.0 | 10.1 | 8.1 | 21.5 | 9.3 | 42.0 | 29.8 |
| Whisper large | 117.4 | 7.1 | 9.0 | 7.1 | 19.8 | 8.2 | 37.9 | 25.1 |
| Whisper large-v2 | 128.4 | 5.8 | 7.6 | 6.3 | 15.8 | 7.1 | 31.9 | 20.6 |

TABLE 11-continued

| | | | WER (%) on Common Voice9 | | | | | |
|---|---|---|---|---|---|---|---|---|
| Model | Serbian | Swedish | Tamil | Thai | Turkish | Urdu | Vietnamese | Chinese |
| Whisper tiny | 106.1 | 58.2 | 105.7 | 55.9 | 53.6 | 74.7 | 69.3 | 52.4 |
| Whisper base | 103.0 | 42.4 | 49.5 | 32.1 | 38.6 | 58.6 | 51.6 | 44.9 |
| Whisper small | 101.3 | 22.1 | 28.7 | 18.1 | 23.7 | 39.1 | 33.3 | 29.4 |
| Whisper medium | 85.6 | 13.7 | 19.6 | 10.5 | 17.7 | 29.9 | 24.4 | 23.2 |
| Whisper large | 87.4 | 12.4 | 17.6 | 8.8 | 16.6 | 28.1 | 19.9 | 29.1 |
| Whisper large-v2 | 70.5 | 10.6 | 16.1 | 8.0 | 14.5 | 24.2 | 18.2 | 26.8 |

VoxPopuli

TABLE 12

| | | | WER (%) on VoxPopuli | | | | | |
|---|---|---|---|---|---|---|---|---|
| Model | Czech | German | English | en_accented | Spanish | Estonian | Finnish | French | Croatian |
| Whisper tiny | 73.5 | 27.4 | 11.6 | 18.8 | 19.7 | 99.2 | 54.1 | 32.9 | 72.4 |
| Whisper base | 54.7 | 20.6 | 9.5 | 17.5 | 14.4 | 83.0 | 39.7 | 249 | 53.6 |
| Whisper small | 28.8 | 14.8 | 8.2 | 19.2 | 11.1 | 59.2 | 24.9 | 15.7 | 33.7 |
| Whisper medium | 18.4 | 12.4 | 7.6 | 19.1 | 9.6 | 38.2 | 16.6 | 12.2 | 23.9 |
| Whisper large | 15.9 | 11.9 | 7.2 | 20.8 | 8.8 | 33.3 | 15.5 | 11.0 | 19.0 |
| Whiper large-v2 | 12.6 | 11.2 | 7.0 | 18.6 | 8.2 | 28.7 | 12.4 | 11.4 | 16.1 |

| Model | Hungarian | Italian | Lithuanian | Dutch | Polish | Romanian | Slovak | Slovenian |
|---|---|---|---|---|---|---|---|---|
| Whisper tiny | 74.5 | 40.5 | 93.1 | 41.9 | 31.4 | 65.9 | 78.7 | 81.9 |
| Whisper base | 52.6 | 30.8 | 82.1 | 29.4 | 22.3 | 49.3 | 63.7 | 70.5 |
| Whisper small | 31.3 | 22.9 | 60.1 | 18.8 | 13.3 | 28.6 | 37.3 | 50.8 |
| Whisper medium | 19.3 | 19.7 | 39.3 | 14.9 | 10.1 | 18.4 | 23.0 | 36.3 |
| Whisper large | 16.8 | 18.4 | 35 | 14.0 | 9.0 | 17.0 | 19.1 | 31.3 |
| Whiper large-v2 | 13.8 | 19.0 | 33.2 | 12.9 | 7.8 | 14.4 | 15.4 | 27.9 |

Fleurs

TABLE 13

| | | | WER (%) on Fleurs | | | |
|---|---|---|---|---|---|---|
| Model | Afrikaans | Amharic | Arabic | Assamese | Azerbaijani | Belarusian | Bulgarian |
| Whisper tiny | 91.2 | 122.9 | 63.4 | 102.0 | 93.1 | 94.0 | 81.0 |
| Whisper base | 81.5 | 196.8 | 48.8 | 102.0 | 76.4 | 91.3 | 65.1 |
| Whisper small | 61.1 | 120.2 | 30.6 | 108.0 | 49.1 | 75.1 | 37.3 |
| Whisper medium | 44.9 | 229.3 | 20.4 | 102.3 | 33.1 | 60.4 | 21.4 |
| Whisper large | 42.6 | 129.3 | 18.1 | 105.6 | 28.7 | 56.6 | 18.4 |
| Whisper large-v2 | 36.7 | 140.3 | 16.0 | 106.2 | 23.4 | 45.4 | 14.6 |

| Model | Bengali | Bosnian | Catalan | Chinese | Czech | Welsh | Danish |
|---|---|---|---|---|---|---|---|
| Whisper tiny | 101.6 | 82.1 | 42.8 | 40.5 | 82.8 | 101.3 | 82.0 |
| Whisper base | 100.6 | 66.7 | 29.0 | 34.1 | 66.0 | 85.3 | 57.6 |
| Whisper small | 104.4 | 39.4 | 16.2 | 20.8 | 37.6 | 59.3 | 32.8 |
| Whisper medium | 100.6 | 23.9 | 9.6 | 12.1 | 21.3 | 40.8 | 19.5 |
| Whisper large | 104.9 | 20.7 | 8.0 | 19.6 | 17.4 | 36.6 | 16.8 |
| Whisper large-v2 | 104.1 | 15.7 | 7.3 | 14.7 | 13.3 | 33.0 | 13.8 |

| Model | German | Greek | English | Spanish | Estonian | Persian | Finish |
|---|---|---|---|---|---|---|---|
| Whisper tiny | 27.8 | 67.4 | 12.4 | 15.9 | 94.8 | 101.8 | 59.5 |
| Whisper base | 17.9 | 53.5 | 8.9 | 9.9 | 77.9 | 86.1 | 43.1 |
| Whisper small | 10.2 | 30.8 | 6.1 | 5.6 | 51.3 | 55.8 | 24.0 |
| Whisper medium | 6.5 | 19.0 | 4.4 | 3.6 | 29.8 | 41.0 | 13.9 |
| Whisper large | 5.5 | 18.7 | 4.5 | 3.5 | 25.5 | 36.1 | 12.2 |
| Whisper large-v2 | 4.5 | 12.5 | 4.2 | 3.0 | 21.9 | 32.9 | 9.7 |

| Model | Tagalog | French | Galician | Gujarati | Hausa | Hebrew | Hindi |
|---|---|---|---|---|---|---|---|
| Whisper tiny | 65.6 | 41.4 | 54.8 | 101.2 | 100.2 | 71.6 | 102.3 |
| Whisper base | 45.8 | 28.5 | 47.4 | 101.4 | 98.6 | 61.7 | 101.1 |
| Whisper small | 27.7 | 15.0 | 30.2 | 106.4 | 90.1 | 44.4 | 38.4 |
| Whisper medium | 19.1 | 8.7 | 21.2 | 104.8 | 106.6 | 33.1 | 26.8 |

TABLE 13-continued

| WER (%) on Fleurs | | | | | | | |
|---|---|---|---|---|---|---|---|
| Whisper large | 15.8 | 7.7 | 19.0 | 103.9 | 87.0 | 30.2 | 26.9 |
| Whisper large-v2 | 13.8 | 8.3 | 15.4 | 102.7 | 88.9 | 27.1 | 21.5 |
| Model | Croatian | Hungarian | Armenian | Indonesian | Icelandic | Italian | Japanese |
| Whisper tiny | 79.0 | 83.8 | 118.6 | 53.7 | 113.3 | 29.8 | 107.3 |
| Whisper base | 59.1 | 65.0 | 126.3 | 33.1 | 95.5 | 17.9 | 89.5 |
| Whisper small | 33.4 | 38.9 | 86.6 | 16.3 | 72.6 | 9.8 | 88.6 |
| Whisper medium | 19.3 | 24.3 | 60.1 | 10.2 | 49.9 | 5.2 | 67.9 |
| Whisper large | 16.7 | 21.0 | 53.7 | 8.5 | 43.0 | 4.2 | 87.0 |
| Whisper large-v2 | 13.4 | 17.0 | 44.6 | 7.1 | 38.2 | 4.0 | nan |
| Model | Javanese | Georgian | Kazakh | Khmer | Kanada | Korean | Luxembourgish |
| Whisper tiny | 101.6 | 123.0 | 165.2 | 100.6 | 100.7 | 36.1 | 99.1 |
| Whisper base | 100.6 | 114.7 | 109.2 | 101.6 | 107.2 | 27.8 | 100.7 |
| Whisper small | 104.4 | 118.3 | 70.3 | 104.4 | 100.4 | 19.6 | 100.1 |
| Whisper medium | 100.6 | 117.3 | 48.8 | 98.9 | 77.7 | 16.4 | 90.0 |
| Whisper large | 104.9 | 100.5 | 43.8 | 96.0 | 69.8 | 15.2 | 86.5 |
| Whisper large-v2 | 104.1 | 105.0 | 37.7 | 99.7 | 37.0 | 14.3 | 88.0 |
| Model | Lingala | Lao | Lithuanian | Latvian | Māori | Macedonian | Malayalam |
| Whisper tiny | 105.4 | 115.1 | 98.5 | 91.6 | 94.5 | 73.3 | 101.5 |
| Whisper base | 96.7 | 105.1 | 87.3 | 79.8 | 77.5 | 59.9 | 107.4 |
| Whisper small | 91.3 | 102.2 | 65.6 | 53.2 | 59.5 | 36.9 | 100.9 |
| Whisper medium | 83.2 | 101.4 | 41.1 | 32.0 | 77.8 | 22.0 | 101.1 |
| Whisper large | 76.8 | 101.6 | 35.2 | 28.3 | 45.7 | 20.6 | 101.4 |
| Whisper large-v2 | 75.6 | 101.5 | 28.1 | 23.1 | 38.5 | 16.5 | 100.7 |
| Model | Mongolian | Marathi | Malay | Maltese | Myanmar | Norwegian | Nepali |
| Whisper tiny | 113.7 | 100.3 | 51.2 | 100.8 | 124.8 | 62.0 | 101.8 |
| Whisper base | 125.7 | 100.3 | 35.1 | 97.6 | 122.6 | 44.0 | 102.4 |
| Whisper small | 144.2 | 60.2 | 18.9 | 92.2 | 110.1 | 24.2 | 69.5 |
| Whisper medium | 103.7 | 63.2 | 12.2 | 83.2 | 123.0 | 12.9 | 54.4 |
| Whisper large | 106.2 | 43.7 | 10.2 | 80.5 | 124.5 | 11.4 | 52.2 |
| Whisper large-v2 | 110.5 | 38.3 | 8.7 | 76.6 | 115.7 | 9.5 | 47.1 |
| Model | Dutch | Occitan | Punjabi | Polish | Pashto | Portuguese | Romanian |
| Whisper tiny | 49.0 | 95.9 | 102.6 | 45.6 | 105.6 | 20.1 | 74.7 |
| Whisper base | 33.0 | 82.9 | 101.5 | 30.8 | 99.0 | 13.0 | 56.0 |
| Whisper small | 16.4 | 87.3 | 103.6 | 14.7 | 92.9 | 7.3 | 29.8 |
| Whisper medium | 9.9 | 79.5 | 102.0 | 8.0 | 119.4 | 5.0 | 20.0 |
| Whisper large | 8.3 | 75.9 | 102.8 | 7.2 | 92.7 | 4.8 | 15.4 |
| Whisper large-v2 | 6.7 | 75.3 | 102.4 | 5.4 | 93.7 | 4.3 | 14.4 |
| Model | Russian | Sindhi | Slovak | Slovenian | Shona | Somali | Serbian |
| Whisper tiny | 31.1 | 105.8 | 77.2 | 87.2 | 128.1 | 105.6 | 83.7 |
| Whisper base | 20.5 | 103.9 | 60.6 | 74.6 | 126.0 | 109.6 | 64.3 |
| Whisper small | 11.4 | 131.7 | 33.3 | 49.3 | 140.0 | 105.3 | 42.2 |
| Whisper medium | 7.2 | 147.0 | 17.3 | 31.9 | 143.9 | 104.0 | 44.9 |
| Whisper large | 6.4 | 177.9 | 15.7 | 27.8 | 130.0 | 103.5 | 29.2 |
| Whisper large-v2 | 5.6 | 156.5 | 11.7 | 23.1 | 121.0 | 102.9 | 33.9 |
| Model | Swedish | Swahili | Tamil | Talugu | Tajik | Thai | Turkish |
| Whisper tiny | 52.7 | 100.9 | 99.9 | 105.1 | 101.7 | 58.8 | 42.5 |
| Whisper base | 37.4 | 92.5 | 58.7 | 105.2 | 109.3 | 38.2 | 27.5 |
| Whisper small | 20.8 | 73.7 | 35.2 | 98.2 | 84.3 | 21.9 | 15.9 |
| Whisper medium | 11.2 | 52.8 | 23.1 | 82.8 | 74.0 | 15.4 | 10.4 |
| Whisper large | 10.5 | 47.9 | 20.6 | 100.6 | 74.5 | 13.2 | 9.4 |
| Whisper large-v2 | 8.5 | 39.3 | 17.5 | 99.0 | 85.8 | 11.5 | 8.4 |
| Model | Ukrainian | Urdu | Uzbek | Vietnamese | Yoruba | | |
| Whisper tiny | 51.2 | 65.2 | 105.2 | 60.0 | 106.4 | | |
| Whisper base | 37.7 | 52.0 | 114.0 | 40.5 | 101.8 | | |
| Whisper small | 19.3 | 37.3 | 107.7 | 21.2 | 116.4 | | |
| Whisper medium | 11.6 | 28.2 | 109.6 | 12.7 | 105.1 | | |
| Whisper large | 10.3 | 25.0 | 93.3 | 10.7 | 111.7 | | |
| Whisper large-v2 | 8.6 | 22.6 | 90.2 | 10.3 | 94.8 | | |

Speech Translation
Fleurs

TABLE 14

| BLEU scores on Fleurs | | | | | | | |
|---|---|---|---|---|---|---|---|
| Model | Afrikaans | Amharic | Arabic | Assamese | Azerbaijani | Belarusian | Bulgarian |
| Whisper tiny | 1.6 | 0.1 | 0.1 | 0.4 | 0.1 | 0.8 | 0.4 |
| Whisper base | 4.4 | 0.3 | 1.0 | 0.4 | 0.8 | 3.3 | 2.7 |
| Whisper small | 18.1 | 0.2 | 10.6 | 1.2 | 5.8 | 7.1 | 14.8 |
| Whisper medium | 29.5 | 0.9 | 19.9 | 3.5 | 11.7 | 9.8 | 23.9 |
| Whisper large | 31.6 | 1.1 | 23.8 | 3.9 | 13.1 | 11.0 | 26.2 |
| Whisper large-v2 | 34.1 | 1.9 | 25.5 | 5.4 | 13.7 | 11.7 | 28.5 |
| Model | Bengali | Bosnian | Catalan | Chinese | Czech | Welsh | Danish |
| Whisper tiny | 0.4 | 0.4 | 5.2 | 0.6 | 0.6 | 0.6 | 0.7 |
| Whisper base | 0.7 | 4.1 | 13.1 | 1.9 | 2.7 | 0.7 | 5.0 |
| Whisper small | 2.7 | 16.8 | 25.1 | 9.3 | 14.2 | 1.3 | 18.1 |
| Whisper medium | 10.6 | 26.0 | 31.9 | 15.1 | 23.6 | 8.4 | 28.6 |
| Whisper large | 12.0 | 28.0 | 33.7 | 16.8 | 25.6 | 11.2 | 31.6 |
| Whisper large-v2 | 13.2 | 29.7 | 34.2 | 18.4 | 27.8 | 13.0 | 32.7 |
| Model | German | Greek | English | Spanish | Estonian | Persian | Finish |
| Whisper tiny | 5.2 | 0.1 | 68.6 | 7.7 | 0.1 | 0.1 | 0.2 |
| Whisper base | 13.7 | 0.7 | 73.3 | 12.4 | 0.3 | 0.2 | 0.5 |
| Whisper small | 25.9 | 11.6 | 77.3 | 18.2 | 3.6 | 5.8 | 7.3 |
| Whisper medium | 31.4 | 19.9 | 79.2 | 21.4 | 13.5 | 15.0 | 18.5 |
| Whisper large | 34.3 | 21.7 | 77.8 | 22.8 | 15.9 | 17.6 | 20.6 |
| Whisper large-v2 | 34.6 | 23.7 | 80.2 | 23.3 | 18.7 | 19.6 | 22.1 |
| Model | Tagalog | French | Galician | Gujarati | Hausa | Hebrew | Hindi |
| Whisper tiny | 0.8 | 4.7 | 4.0 | 0.7 | 0.1 | 0.2 | 1.0 |
| Whisper base | 2.1 | 13.1 | 10.5 | 1.5 | 0.0 | 0.6 | 3.4 |
| Whisper small | 12.0 | 23.5 | 17.5 | 3.9 | 0.3 | 5.4 | 11.1 |
| Whisper medium | 20.5 | 28.6 | 24.7 | 12.8 | 0.5 | 15.9 | 19.4 |
| Whisper large | 22.7 | 31.6 | 26.0 | 14.8 | 0.5 | 19.6 | 20.7 |
| Whisper large-v2 | 24.4 | 32.2 | 27.9 | 16.2 | 0.4 | 21.8 | 22.0 |
| Model | Croatian | Hungarian | Armenian | Indonesian | Icelandic | Italian | Japanese |
| Whisper tiny | 0.6 | 0.1 | 0.1 | 0.3 | 0.4 | 5.3 | 0.2 |
| Whisper base | 3.7 | 0.2 | 0.1 | 2.6 | 0.4 | 11.3 | 1.5 |
| Whisper small | 14.6 | 4.8 | 0.7 | 16.4 | 1.8 | 17.8 | 9.6 |
| Whisper medium | 23.0 | 15.5 | 10.4 | 24.1 | 6.8 | 21.6 | 14.9 |
| Whisper large | 25.4 | 18.3 | 13.2 | 27.2 | 6.6 | 23.5 | 17.0 |
| Whisper large-v2 | 27.0 | 21.2 | 16.0 | 29.1 | 9.1 | 23.6 | 18.9 |
| Model | Javanese | Georgian | Kazakh | Khmer | Kanada | Korean | Luxembourgish |
| Whisper tiny | 0.2 | 0.1 | 0.1 | 0.1 | 0.8 | 0.5 | 0.8 |
| Whisper base | 0.2 | 0.2 | 0.2 | 0.1 | 0.9 | 3.7 | 1.7 |
| Whisper small | 1.4 | 0.2 | 0.8 | 0.5 | 2.3 | 12.2 | 5.7 |
| Whisper medium | 5.0 | 1.3 | 4.3 | 3.3 | 8.5 | 19.2 | 13.6 |
| Whisper large | 5.1 | 2.7 | 6.3 | 5.2 | 9.9 | 20.0 | 15.4 |
| Whisper large-v2 | 6.2 | 2.4 | 5.4 | 6.1 | 11.6 | 21.3 | 16.8 |
| Model | Lingala | Iao | Lithuanian | Latvian | Māori | Macedonian | Malayalam |
| Whisper tiny | 0.1 | 0.2 | 0.1 | 0.2 | 0.3 | 1.0 | 0.8 |
| Whisper base | 0.1 | 0.3 | 0.3 | 0.4 | 1.0 | 5.4 | 1.4 |
| Whisper small | 0.5 | 2.0 | 1.9 | 1.5 | 3.9 | 15.3 | 5.7 |
| Whisper medium | 0.9 | 8.1 | 9.6 | 10.0 | 8.5 | 23.5 | 13.8 |
| Whisper large | 1.2 | 9.3 | 12.0 | 12.5 | 9.4 | 26.4 | 16.5 |
| Whisper large-v2 | 1.0 | 11.0 | 14.0 | 14.3 | 10.2 | 27.7 | 16.7 |
| Model | Mongolian | Marathi | Malay | Maltese | Myanmar | Norwegian | Nepali |
| Whisper tiny | 0.1 | 0.2 | 0.3 | 0.6 | 0.1 | 1.4 | 0.1 |
| Whisper base | 0.1 | 0.9 | 2.1 | 1.4 | 0.1 | 8.4 | 0.3 |
| Whisper small | 0.1 | 3.8 | 14.1 | 4.9 | 0.0 | 22.0 | 2.9 |
| Whisper medium | 0.5 | 10.9 | 23.2 | 11.2 | 0.2 | 29.1 | 12.7 |
| Whisper large | 1.0 | 13.1 | 25.5 | 12.8 | 0.5 | 30.5 | 12.9 |
| Whisper large-v2 | 1.0 | 12.9 | 27.3 | 13.5 | 0.4 | 31.4 | 16.1 |

TABLE 14-continued

BLEU scores on Fleurs

| Model | Dutch | Occitan | Punjabi | Polish | Pashto | Portuguese | Romanian |
|---|---|---|---|---|---|---|---|
| Whisper tiny | 2.7 | 1.7 | 0.3 | 0.8 | 0.3 | 12.1 | 1.0 |
| Whisper base | 7.5 | 4.2 | 1.1 | 5.1 | 0.4 | 22.4 | 4.9 |
| Whisper small | 15.9 | 9.5 | 4.4 | 14.0 | 0.8 | 31.2 | 18.3 |
| Whisper medium | 21.6 | 15.9 | 12.8 | 19.0 | 2.1 | 35.9 | 26.6 |
| Whisper large | 22.8 | 16.8 | 14.6 | 21.4 | 3.7 | 37.4 | 29.1 |
| Whisper large-v2 | 24.0 | 20.2 | 15.7 | 22.3 | 3.4 | 38.1 | 31.5 |

| Model | Russian | Sindhi | Slovak | Slovenian | Shona | Somali | Serbian |
|---|---|---|---|---|---|---|---|
| Whisper tiny | 3.1 | 0.5 | 0.7 | 0.3 | 0.1 | 0.0 | 0.6 |
| Whisper base | 12.1 | 0.7 | 4.6 | 1.3 | 0.3 | 0.1 | 5.4 |
| Whisper small | 19.7 | 2.0 | 14.4 | 6.9 | 0.6 | 0.1 | 19.3 |
| Whisper medium | 24.8 | 5.5 | 22.7 | 14.0 | 1.4 | 0.4 | 27.7 |
| Whisper large | 26.7 | 5.9 | 25.1 | 16.9 | 1.8 | 0.5 | 30.5 |
| Whisper large-v2 | 27.8 | 5.7 | 26.1 | 17.0 | 1.8 | 0.7 | 32.5 |

| Model | Turkish | Ukrainian | Urdu | Uzbek | Vietnamese | Yoruba |
|---|---|---|---|---|---|---|
| Whisper tiny | 0.2 | 1.2 | 0.4 | 0.0 | 0.1 | 0.2 |
| Whisper base | 2.4 | 6.9 | 1.5 | 0.2 | 0.9 | 0.5 |
| Whisper small | 15.7 | 18.7 | 8.8 | 0.5 | 8.5 | 0.5 |
| Whisper medium | 22.9 | 25.8 | 14.9 | 3.8 | 16.6 | 0.9 |
| Whisper large | 25.7 | 28.0 | 16.3 | 5.8 | 19.5 | 1.2 |
| Whisper large-v2 | 26.6 | 29.4 | 17.2 | 6.0 | 20.4 | 1.4 |

CoVoST 2

TABLE 15

BLEU scores on CoVoST2

| Model | Arabic | Catalan | Welsh | German | Spanish | Estonian | Persian |
|---|---|---|---|---|---|---|---|
| Whisper tiny | 0.2 | 4.9 | 0.4 | 4.0 | 10.5 | 0.2 | 0.1 |
| Whisper base | 1.2 | 11.0 | 0.5 | 11.7 | 21.3 | 0.3 | 0.1 |
| Whisper small | 17.7 | 22.3 | 1.0 | 25.3 | 33.0 | 2.4 | 4.9 |
| Whisper medium | 30.6 | 29.2 | 12.1 | 33.2 | 38.4 | 11.4 | 15.5 |
| Whisper large | 35.5 | 30.3 | 16.1 | 34.3 | 38.0 | 13.4 | 17.5 |
| Whisper large-v2 | 39.7 | 31.8 | 21.5 | 36.3 | 40.1 | 15.0 | 19.3 |

| Model | French | Indonesian | Italian | Japanese | Latvian | Mongolian | Dutch |
|---|---|---|---|---|---|---|---|
| Whisper tiny | 6.1 | 0.3 | 5.1 | 0.3 | 0.1 | 0.1 | 4.3 |
| Whisper base | 15.4 | 4.9 | 13.0 | 4.9 | 0.5 | 0.1 | 12.4 |
| Whisper small | 27.3 | 27.6 | 24.0 | 17.3 | 1.4 | 0.2 | 28.1 |
| Whisper medium | 33.6 | 42.3 | 29.5 | 24.6 | 9.7 | 0.2 | 38.1 |
| Whisper large | 34.4 | 45.4 | 29.1 | 24.2 | 10.5 | 0.3 | 39.3 |
| Whisper large-v2 | 36.4 | 48.1 | 30.9 | 26.1 | 13.9 | 0.1 | 41.2 |

| Model | Portuguese | Russian | Slovenian | Swedish | Tamil | Turkish | Chinese |
|---|---|---|---|---|---|---|---|
| Whisper tiny | 9.5 | 5.7 | 0.4 | 2.0 | 0.1 | 0.2 | 0.4 |
| Whisper base | 23.2 | 16.1 | 1.4 | 10.5 | 0.4 | 2.8 | 1.4 |
| Whisper small | 40.6 | 30.9 | 9.2 | 29.9 | 1.7 | 16.8 | 6.3 |
| Whisper medium | 48.7 | 39.4 | 17.7 | 39.5 | 2.9 | 27.0 | 14.0 |
| Whisper large | 48.6 | 41.6 | 23.9 | 40.3 | 3.7 | 26.7 | 17.1 |
| Whisper large-v2 | 51.6 | 43.3 | 21.6 | 42.9 | 4.2 | 28.3 | 18.0 |

Long-Form Transcription

TABLE 16

Long-form English transcription WER (%)

| Model | TED-LIUM3 | Meanwhile | Kincaid46 | Rev16 | Earnings-21 | Earnings-22 | CORAAL |
|---|---|---|---|---|---|---|---|
| Whisper tiny.en | 5.5 | 12.8 | 13.8 | 15.1 | 17.0 | 22.0 | 30.3 |
| Whisper tiny | 6.8 | 15.5 | 16.7 | 17.0 | 18.7 | 24.4 | 33.1 |
| Whisper base.en | 4.6 | 9.4 | 11.2 | 13.2 | 12.5 | 16.6 | 25.2 |
| Whisper base | 4.8 | 12.2 | 12.2 | 14.5 | 13.5 | 18.4 | 26.9 |

TABLE 16-continued

Long-form English transcription WER (%)

| Model | TED-LIUM3 | Meanwhile | Kincaid46 | Rev16 | Earnings-21 | Earnings-22 | CORAAL |
|---|---|---|---|---|---|---|---|
| Whisper small.en | 4.6 | 6.0 | 9.4 | 12.0 | 10.8 | 14.0 | 21.9 |
| Whisper small | 4.2 | 6.9 | 10.1 | 12.1 | 11.1 | 14.3 | 22.3 |
| Whisper medium.en | 3.6 | 5.2 | 8.9 | 11.9 | 10.2 | 13.3 | 20.6 |
| Whisper medium | 3.8 | 5.4 | 8.6 | 11.4 | 10.3 | 13.4 | 20,3 |
| Whisper large | 3.8 | 5.3 | 8.8 | 11.0 | 10.3 | 13.4 | 20.4 |
| Whisper large-v2 | 3.5 | 5.1 | 8.8 | 11.3 | 9.7 | 12.6 | 19.6 |
| wav2vec2-base-100h | 17.6 | 27.7 | 39.3 | 35.2 | 45.7 | 57.1 | 55.4 |
| wav2vec2-base-960h | 12.8 | 19.7 | 32.9 | 32.9 | 37.3 | 46.8 | 49.1 |
| wav2vec2-large-960h-lv60-self | 7.2 | 11.4 | 21.1 | 21.1 | 21.7 | 28.0 | 36.7 |
| wav2vec2-large-960h | 10.1 | 16.4 | 27.4 | 27.4 | 30.4 | 40.1 | 43.5 |
| wav2vec2-large-robust-ft-libri-960h | 8.8 | 15.2 | 22.9 | 23.4 | 23.0 | 31.0 | 36.8 |
| hubert-large-ls960-ft | 8.1 | 12.9 | 22.4 | 23.4 | 23.0 | 30.6 | 37.9 |
| hubert-xlarge-ls960-ft | 8.1 | 12.5 | 22.9 | 23.2 | 23.1 | 31.3 | 38.1 |
| stt_en_conformer_ctc_large | 4.0 | 9.8 | 13.1 | 14.5 | 12.6 | 17.6 | 25.1 |
| stt_en_conformer_transducer_xlarge | 5.3 | 10.6 | 17.1 | 19.8 | 16.2 | 19.7 | 38.9 |

Appendix E: Training Dataset Statistics

Figure 13:
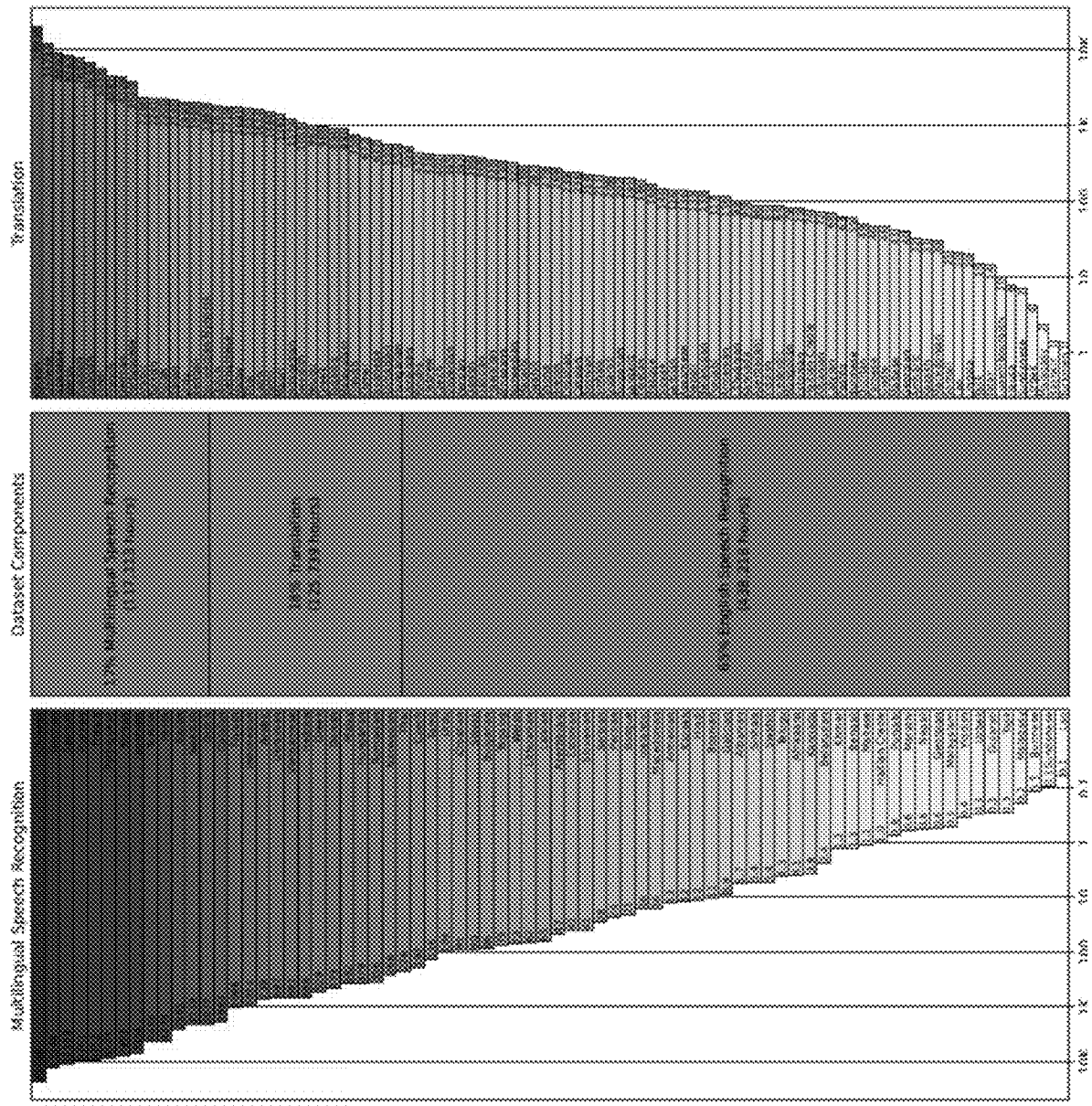
FIG. 13 depicts the composition of the training dataset.

FIG. 13 depicts the composition of the training dataset. The stacked bar chart on the left shows the number of hours of multi-lingual speech recognition audio available for each language. The stacked bar chart on the right shows the number of hours of audio available with English transcripts (translation audio) for each language. The center stack bar shows the proportion of the total hours in the training dataset available for each of multi-lingual speech recognition, translation, and English speech recognition.

Appendix F: Hyperparameters

TABLE 17

Whisper training hyperparameters

| Hyperparameter | Value |
|---|---|
| Updates | 1048576 |
| Batch Size | 256 |
| Warmup Updates | 2048 |
| Max grad norm | 1.0 |
| Optimizer | AdamW |
| $\beta_1$ | 0.9 |
| $\beta_2$ | 0.98 |
| $\epsilon$ | $10^{-6}$ |
| Weight Decay | 0.1 |
| Weight Init | Gaussian Fan-In |
| Learning Rate Schedule | Linear Decay |
| Speechless audio subsample factor | 10x |
| Condition on prior text rate | 50% |

TABLE 18

Hyperparameters changed for Whisper Large V2.

| Hyperparameter | Value |
|---|---|
| Updates | 655360 |
| Batch Size | 1024 |
| BPE Dropout | 0.1 |
| Stochastic Depth | 0.1 |
| SpecAugment Policy | LibriSpeech Basic |

TABLE 19

Whisper model learning rates.

| Model | Max Learning Rate |
|---|---|
| Tiny | $1.5 \times 10^{-3}$ |
| Base | $1 \times 10^{-3}$ |
| Small | $5 \times 10^{-4}$ |
| Medium | $2.5 \times 10^{-4}$ |
| Large | $1.76 \times 10^{-4}$ |
| Large V2 | $2.0 \times 10^{-4}$ |

What is claimed is:

1. A system comprising:
at least one memory storing instructions; and
at least one processor configured to execute the instructions to perform operations for multi-language, multi-task speech recognition, the operations comprising:
obtaining a transformer model including an encoder and a decoder, the transformer model trained to transcribe or translate audio data in multiple languages using labeled audio data, the labeled audio data including first audio segments associated with first same-language transcripts of the first audio segments and second audio segments associated with second different-language transcripts of the second audio segments; and
generating an output transcript from an input audio segment using the transformer model, generation including:
configuring a decoder input with an autoregressively generated token that specifies a task, an autoregressively generated token that specifies an input language, or an autoregressively generated token that specifies an absence of speech.

2. The system of claim 1, wherein configuring the decoder input comprises additionally configuring the decoder input with an assigned transcribe token or an assigned translate token.

3. The system of claim 1, wherein configuring the decoder input comprises configuring the decoder input with an autoregressively generated input language token corresponding to the first language and an assigned translate token; and
generating the output transcript further includes:
autoregressively configuring the decoder input with a textual token predicted using the assigned translate token and the autoregressively generated input language token, the textual token associated with the second language differing from the first language.

4. The system of claim 1, wherein the decoder is configured with a vocabulary including timestamp tokens.

5. The system of claim 1, wherein generating the output transcript includes:
autoregressively configuring the decoder input with a token that specifies an absence of speech, followed by an end of transcript token.

6. The system of claim 1, wherein the transformer model is configured to perform inverse text normalization.

7. The system of claim 1, wherein generating the output transcript further includes:
applying a first subsegment of the input audio segment to generate one or more predicted timestamp tokens for the first subsegment; and
generating a second subsegment of the input audio segment using the one or more predicted timestamp tokens for the first subsegment.

8. The system of claim 1, wherein generating the output transcript further includes performing a beam search using an output softmax temperature dependent on at least one of:
log probabilities of previously generated tokens of the output transcript; or
a compression rate of the previously generated tokens of the output transcript.

9. The system of claim 1, wherein generating the output transcript further includes prepending a transcript generated for a preceding input audio segment to the decoder input.

10. A method for multi-language, multi-task speech recognition, comprising:
obtaining a transformer model including an encoder and a decoder, the transformer model trained to transcribe or translate audio data in multiple languages using labeled audio data, the labeled audio data including first audio segments associated with first same-language transcripts of the first audio segments and second audio segments associated with second different-language transcripts of the second audio segments; and
generating an output transcript from an input audio segment using the transformer model, generation including:
configuring a decoder input with an autoregressively generated token that specifies a task, an autoregressively generated token that specifies an input language, or an autoregressively generated token that specifies an absence of speech.

11. The method of claim 10, wherein configuring the decoder input further comprises configuring the decoder input with an assigned transcribe token or an assigned translate token.

12. The method of claim 10, wherein configuring the decoder input comprises configuring the decoder input with an autoregressively generated input language token corresponding to the first language and an assigned translate token; and
generating the output transcript further includes:
autoregressively configuring the decoder input with a textual token predicted using the assigned translate token and the autoregressively generated input language token, the textual token associated with the second language differing from the first language.

13. The method of claim 10, wherein the decoder is configured with a vocabulary including timestamp tokens.

14. The method of claim 10, wherein generating the output transcript includes:
autoregressively configuring the decoder input with a token that specifies an absence of speech, followed by an end of transcript token.

15. The method of claim 10, wherein the transformer model is configured to perform inverse text normalization.

16. The method of claim 10, wherein generating the output transcript further includes:
applying a first subsegment of the input audio segment to generate one or more predicted timestamp tokens for the first subsegment; and
generating a second subsegment of the input audio segment using the one or more predicted timestamp tokens for the first subsegment.

17. The method of claim 10, wherein generating the output transcript further includes:
performing a beam search using an output softmax temperature dependent on at least one of:
log probabilities of previously generated tokens of the output transcript; or
a compression rate of the previously generated tokens of the output transcript; or
prepending a transcript generated for a preceding input audio segment to the decoder input.

18. A non-transitory computer-readable medium including instructions that are executable by one or more processors to perform operations comprising:
obtaining a transformer model including an encoder and a decoder, the transformer model trained to transcribe or translate audio data in multiple languages using labeled audio data, the labeled audio data including first audio segments associated with first same-language transcripts of the first audio segments and second audio segments associated with second different-language transcripts of the second audio segments; and
generating an output transcript from an input audio segment using the transformer model, generation including:
configuring a decoder input an autoregressively generated token that specifies a task, an autoregressively generated token that specifies an input language, or an autoregressively generated token that specifies an absence of speech.

* * * * *